US 12,091,194 B2

(12) United States Patent
Wang et al.

(10) Patent No.: US 12,091,194 B2
(45) Date of Patent: Sep. 17, 2024

(54) UNMANNED AERIAL VEHICLE AIRPORT, UNMANNED AERIAL VEHICLE SYSTEM, TOUR INSPECTION SYSTEM AND UNMANNED AERIAL VEHICLE CRUISE SYSTEM

(71) Applicant: BEIJING JINGDONG QIANSHI TECHNOLOGY CO., LTD., Beijing (CN)

(72) Inventors: Zhao Wang, Beijing (CN); Chengbin Liu, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 254 days.

(21) Appl. No.: 17/772,063

(22) PCT Filed: Sep. 18, 2020

(86) PCT No.: PCT/CN2020/116198
§ 371 (c)(1),
(2) Date: Apr. 26, 2022

(87) PCT Pub. No.: WO2021/082794
PCT Pub. Date: May 6, 2021

(65) Prior Publication Data
US 2022/0396373 A1 Dec. 15, 2022

(30) Foreign Application Priority Data

Oct. 28, 2019 (CN) .......................... 201911031815.5
Dec. 17, 2019 (CN) .......................... 201911303904.0
Apr. 2, 2020 (CN) .......................... 202010253900.2

(51) Int. Cl.
*B64F 1/222* (2024.01)
*B60L 53/30* (2019.01)
(Continued)

(52) U.S. Cl.
CPC .............. *B64F 1/222* (2013.01); *B60L 53/30* (2019.02); *B64C 39/024* (2013.01); *B64F 1/362* (2013.01);
(Continued)

(58) Field of Classification Search
CPC .......... B64F 1/222; B64F 1/362; B64F 1/005; B64F 1/007; B64F 1/125; B60L 53/30;
(Continued)

(56) References Cited

U.S. PATENT DOCUMENTS 5,842,667 A 12/1998 Jones
10,526,094 B2 * 1/2020 Cheng ................... B64U 80/70
(Continued)

FOREIGN PATENT DOCUMENTS

CN 106143938 A 11/2016
CN 206313481 U 7/2017
(Continued)

OTHER PUBLICATIONS

"First Office Action and English language translation", CN Application No. 201911031815.5, Jun. 2, 2021, 18 pp.
(Continued)

*Primary Examiner* — Valentina Xavier
(74) *Attorney, Agent, or Firm* — Myers Bigel, P.A.

(57) ABSTRACT

An unmanned aerial vehicle airport, an unmanned aerial vehicle system, a tour inspection system and an unmanned aerial vehicle cruise system. The unmanned aerial vehicle airport comprises a support base, a parking apron, a protective cover and a protective cover opening and closing driving device. The parking apron is installed on the top of the support base; the protective cover covers the top of the apron; the protective cover opening and closing driving device is installed between the support base and the protective cover, and the protective cover opening and closing
(Continued)

driving device is configured to cause a bar linkage mechanism to drive the protective cover to switch between an open position and a closed position. The unmanned aerial vehicle airport is provided with the protective cover for the parking apron. If the protective cover is open, the unmanned aerial vehicle is parked on the parking apron, and takes off from the parking apron.

18 Claims, 19 Drawing Sheets

(51) Int. Cl.
*B64C 39/02* (2023.01)
*B64F 1/36* (2017.01)
*E05F 15/00* (2015.01)
*G05D 1/00* (2006.01)
*B64U 50/19* (2023.01)
*B64U 80/00* (2023.01)
*H01M 10/42* (2006.01)

(52) U.S. Cl.
CPC .............. *E05F 15/00* (2013.01); *G05D 1/101* (2013.01); *B60L 2200/10* (2013.01); *B64U 50/19* (2023.01); *B64U 80/00* (2023.01); *B64U 2201/20* (2023.01); *E05Y 2201/656* (2013.01); *E05Y 2201/668* (2013.01); *E05Y 2201/686* (2013.01); *E05Y 2201/71* (2013.01); *E05Y 2999/00* (2024.05); *H01M 10/4257* (2013.01); *H01M 2220/20* (2013.01)

(58) Field of Classification Search
CPC ........ B64C 39/024; E05F 15/00; E05F 15/63; B64U 50/19; B64U 80/00; B64U 50/37; B64U 70/90; B64U 80/25; B64U 80/70; B64U 10/14; B64U 70/97; B64U 2101/00; E05D 15/46; E04H 6/44
See application file for complete search history.

(56) References Cited

U.S. PATENT DOCUMENTS

| | | | |
|---|---|---|---|
| 2016/0311329 | A1 | 10/2016 | Rodriguez |
| 2017/0275025 | A1 | 9/2017 | Johnson et al. |
| 2019/0002128 | A1 | 1/2019 | Raz et al. |
| 2019/0100330 | A1* | 4/2019 | Cheng .................. B64U 80/70 |
| 2019/0337407 | A1 | 11/2019 | Wang |

FOREIGN PATENT DOCUMENTS

| | | |
|---|---|---|
| CN | 206602409 U | 10/2017 |
| CN | 206829740 U | 1/2018 |
| CN | 108033031 A | 5/2018 |
| CN | 108255163 A | 7/2018 |
| CN | 108502201 A | 9/2018 |
| CN | 108657455 A | 10/2018 |
| CN | 108698521 A | 10/2018 |
| CN | 108698709 A | 10/2018 |
| CN | 108702008 A | 10/2018 |
| CN | 108945502 A | 12/2018 |
| CN | 109018347 A | 12/2018 |
| CN | 208181446 U | 12/2018 |
| CN | 208198853 U | 12/2018 |
| CN | 208278348 U | 12/2018 |
| CN | 109204858 A | 1/2019 |
| CN | 109542114 A | 3/2019 |
| CN | 208852282 U | 5/2019 |
| CN | 209051602 U | 7/2019 |
| CN | 209225414 U | 8/2019 |
| CN | 110196594 A | 9/2019 |
| CN | 110282143 A | 9/2019 |
| CN | 110380606 A | 10/2019 |
| CN | 110531780 A | 12/2019 |
| CN | 110884674 A | 3/2020 |
| CN | 111026156 A | 4/2020 |
| CN | 111422081 A | 7/2020 |
| CN | 109946998 B | 8/2020 |
| CN | 111776237 A | 10/2020 |
| CN | 108698709 B | 3/2022 |
| WO | 2015108588 A2 | 7/2015 |

OTHER PUBLICATIONS

"First Office Action and English language translation", CN Application No. 202010253900.2, Sep. 29, 2020, 20 pp.
"First Office Action and English language translation", CN Application No. 201911303904.0, Oct. 14, 2020, 48 pp.
"International Search Report and Written Opinion of the International Searching Authority with English translation", International Application No. PCT/CN2020/116198, Dec. 1, 2020, 22 pp.
"Rejection Decision", CN Application No. 201911303904.0, Apr. 6, 2021, 13 pp.
"Rejection Decision", CN Application No. 202010253900.2, Jul. 15, 2021, 6 pp.
"Second Office Action and English language translation", CN Application No. 201911303904.0, Jan. 6, 2021, 44 pp.
"Second Office Action and English language translation", CN Application No. 202010253900.2, Jan. 12, 2021, 32 pp.
"Third Office Action and English language translation", CN Application No. 202010253900.2, Apr. 14, 2021, 15 pp.
"Notice of Reasons for Refusal" with English language translation, JP Application No. 2022-525066, Apr. 1, 2024, 8 pp.

* cited by examiner

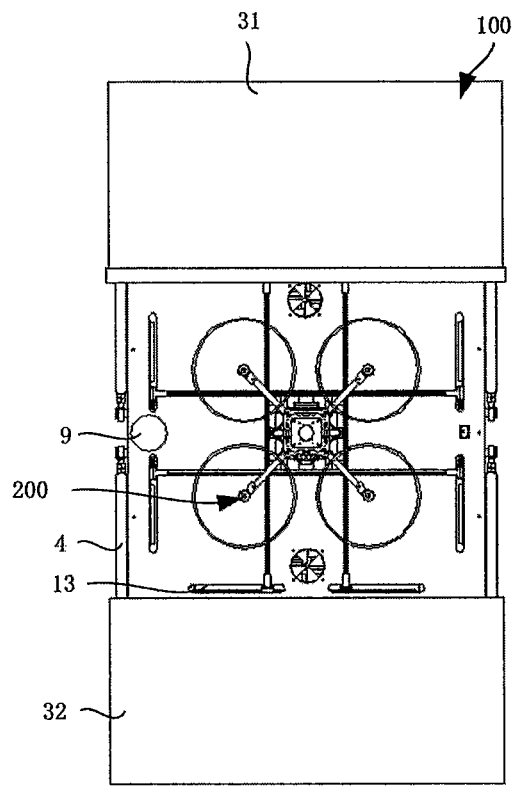
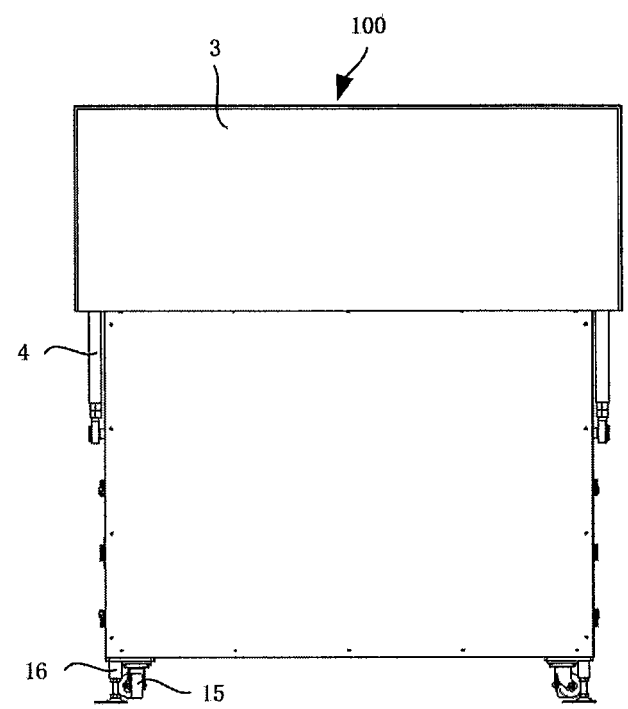
Figure 3
Figure 4
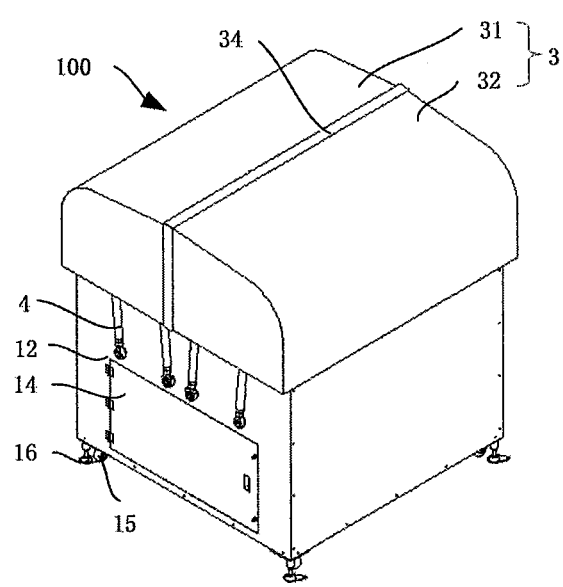
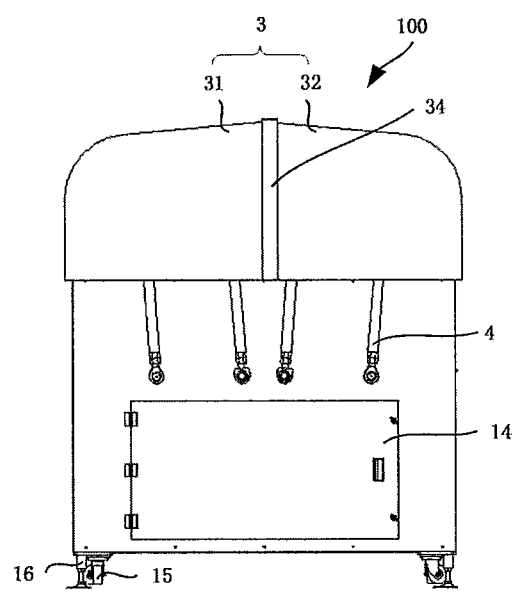
Figure 5
Figure 6

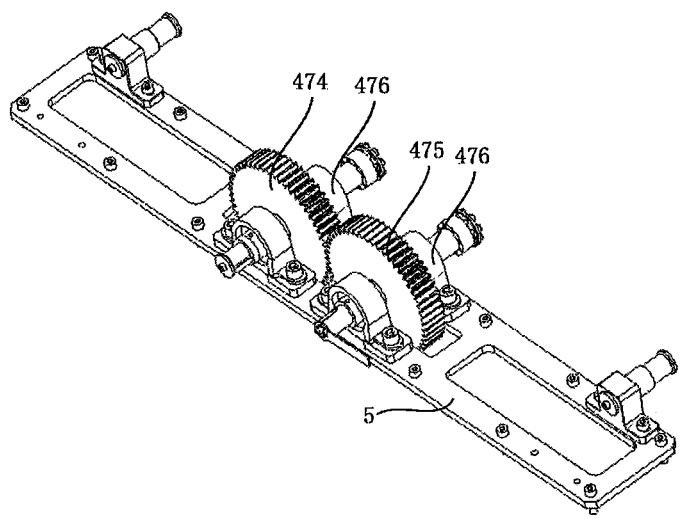
Figure 17
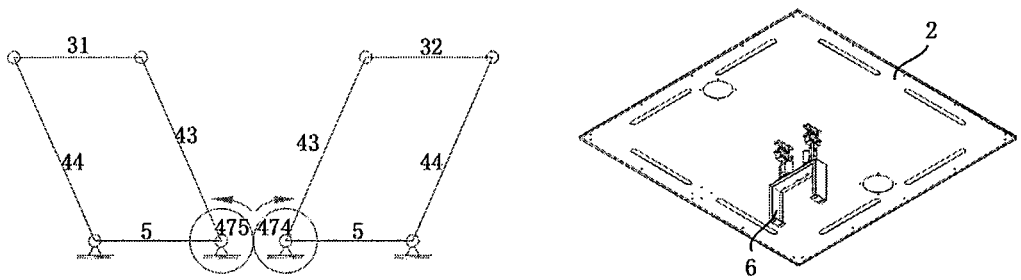
Figure 18
Figure 19
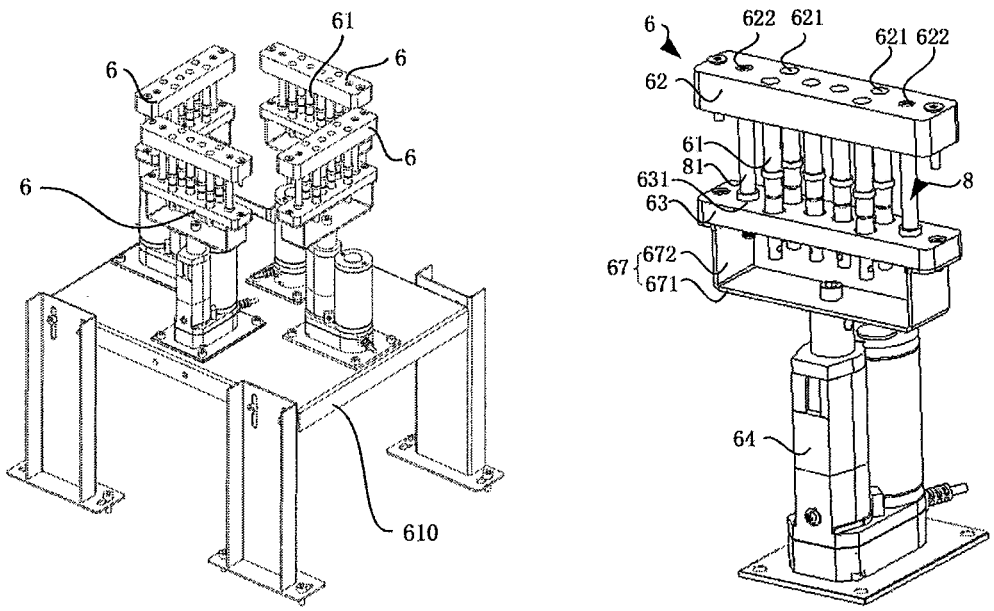
Figure 20
Figure 21

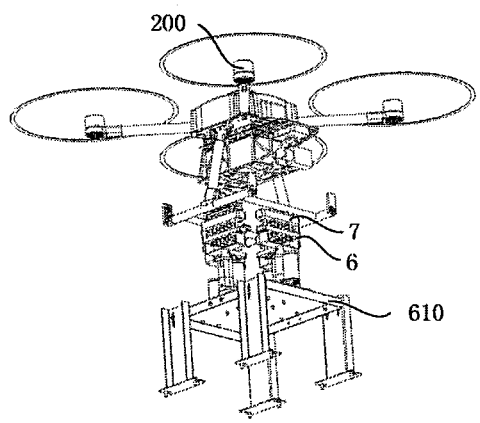
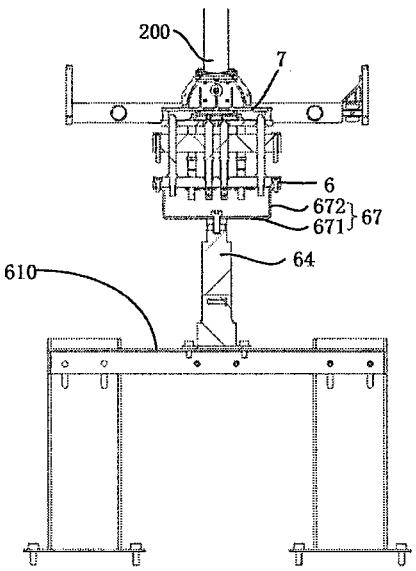
Figure 26                               Figure 27
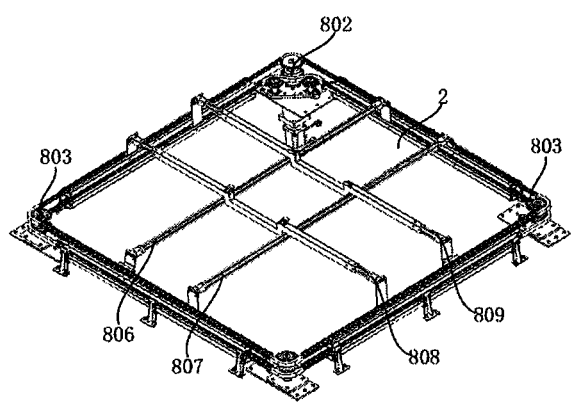
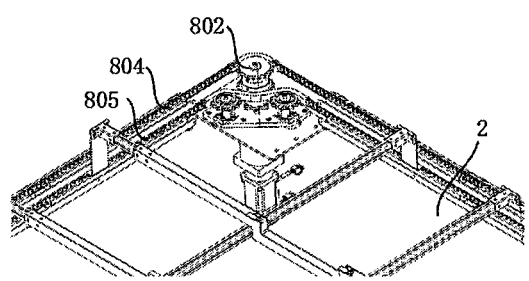
Figure 28                               Figure 29
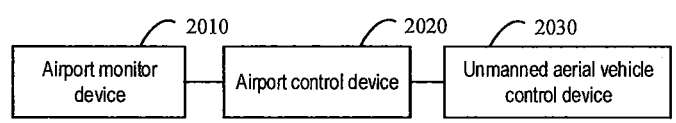
Figure 30

UNMANNED AERIAL VEHICLE AIRPORT, UNMANNED AERIAL VEHICLE SYSTEM, TOUR INSPECTION SYSTEM AND UNMANNED AERIAL VEHICLE CRUISE SYSTEM

CROSS-REFERENCE TO RELATED APPLICATIONS

The present application is a U.S. National Stage Application under 35 U.S.C. § 371 of International Patent Application No. PCT/CN2020/116198, filed on Sep. 18, 2020, which is based on and claims priority to Chinese Patent Application No. 201911031815.5, filed on Oct. 28, 2019, Chinese Patent Application No. 201911303904.0, filed on Dec. 17, 2019, and Chinese Patent Application No. 202010253900.2, filed on Apr. 2, 2020, the disclosures of all of which are hereby incorporated by reference in their entireties.

FIELD OF THE INVENTION

The present disclosure relates to the field of unmanned aerial vehicles, and in particular to an unmanned aerial vehicle airport, an unmanned aerial vehicle system, a tour inspection system, a tour inspection method, a control device, an apparatus, a storage medium, and an unmanned aerial vehicle cruise system.

DESCRIPTION OF RELATED ART

Unmanned aerial vehicles are unmanned aircrafts operated by a radio remote control apparatus and a self-contained program control device, or fully or intermittently autonomously operated by a vehicle-mounted computer. According to the application field, the unmanned aerial vehicles are divided into military unmanned aerial vehicles and civilian unmanned aerial vehicles. The military unmanned aerial vehicles are divided into reconnaissance aircrafts and target aircrafts. In the civilian field, the unmanned aerial vehicles are used in many specific industries, such as aerial photography, agriculture, plant protection, miniature selfie, express transportation, disaster rescue, observation of wildlife, monitoring of infectious diseases, surveying and mapping, news reporting, industrial tour inspection, disaster relief, film and television shooting and other fields.

Inventors found that there are at least the following problems in the related art: a ground handling system of the unmanned aerial vehicle is still relatively backward at present, and is mainly formed by a runway/parking apron and the radio remote control apparatus. The runway is suitable for the unmanned aerial vehicles that take off and land in a rolling manner, and the parking apron is suitable for the unmanned aerial vehicles that take off and land vertically. In such airports equipped with the parking apron, after landing, the unmanned aerial vehicles are easily wetted and damaged in rainy and snowy weather.

SUMMARY OF THE INVENTION

The present disclosure provides an unmanned aerial vehicle airport, an unmanned aerial vehicle system, a tour inspection system, a tour inspection method, a control device, an apparatus, a storage medium, and an unmanned aerial vehicle cruise system, which are configured to optimize a structure of the unmanned aerial vehicle airport.

Some embodiments of the present disclosure provide an unmanned aerial vehicle airport, comprising:
a support base;
a parking apron installed on the top of the support base;
a protective covering the top of the parking apron; and
a protective cover opening and closing driving device installed between the support base and the protective cover, the protective cover opening and closing driving device being configured to cause a bar linkage mechanism to drive the protective cover to switch between an open position and a closed position.

Some embodiments of the present disclosure also provide an unmanned aerial vehicle system, comprising the unmanned aerial vehicle airport according to any one of the technical solutions of the present disclosure.

The unmanned aerial vehicle airport according to the above embodiment is provided with the protective cover for the parking apron. The protective cover is open when in the open position, and the unmanned aerial vehicle is parked on the parking apron and take off from the parking apron. The protective cover is closed when in the closed position, and thus plays a protective role on the unmanned aerial vehicle and prevents the unmanned aerial vehicle from the damage and pollution of external rain, impurities and the like. In addition, the protective cover opening and closing driving device uses the bar linkage mechanism to drive the protective cover to switch between the open position and the closed position. The bar linkage mechanism has reliable movement and small occupied space, which better meets the opening and closing requirements of the protective cover of the unmanned aerial vehicle airport.

Some embodiments of the present disclosure provide a tour inspection system, a tour inspection method, a control device, an apparatus, and a storage medium to realize automatic tour inspection of the unmanned aerial vehicle without manual control, thereby saving labor costs.

Some embodiments of the present disclosure provide a tour inspection system comprising: an airport monitor device, an airport control device and an unmanned aerial vehicle control device;
wherein the airport control device is configured to: when receiving an unmanned aerial vehicle start instruction sent by the airport monitor device, detect whether the unmanned aerial vehicle meets a preset tour inspection condition, and when detecting that the unmanned aerial vehicle meets the preset tour inspection condition, send a tour inspection request message to the airport monitor device; when receiving a tour inspection instruction sent by the airport monitor device based on the tour inspection request message, trigger the unmanned aerial vehicle control device to detect whether the unmanned aerial vehicle meets a preset takeoff condition; and
the unmanned aerial vehicle control device is configured to: when detecting that the unmanned aerial vehicle meets the preset takeoff condition, send a takeoff request message to the airport control device, and when receiving a takeoff instruction sent by the airport control device based on the takeoff request message, control the unmanned aerial vehicle to take off and perform tour inspection based on a preset tour inspection route.

Some embodiments of the present disclosure further provide a tour inspection method, which is applied to an airport control device and comprises:

when receiving an unmanned aerial vehicle start instruction sent by an airport monitor device, detecting whether an unmanned aerial vehicle meets a preset tour inspection condition;

when detecting that the unmanned aerial vehicle meets the preset tour inspection condition, sending a tour inspection request message to the airport monitor device;

when receiving a tour inspection instruction sent by the airport monitor device based on the tour inspection request message, triggering an unmanned aerial vehicle control device to detect whether the unmanned aerial vehicle meets a preset takeoff condition, so that the unmanned aerial vehicle control device sends a takeoff request message to the airport control device when detecting that the preset takeoff condition is met; and when receiving the takeoff request message, detecting whether an unmanned aerial vehicle airport meets a preset quasi-flying condition, and when detecting that the unmanned aerial vehicle airport meets the preset quasi-flying condition, sending a takeoff instruction to the unmanned aerial vehicle control device, so that the unmanned aerial vehicle control device controls the unmanned aerial vehicle to take off and perform tour inspection based on a preset tour inspection route.

Some embodiments of the present disclosure further provide a tour inspection method, which is applied to an unmanned aerial vehicle control device and comprises:

when detecting a trigger operation of an airport control device, detecting whether an unmanned aerial vehicle meets a preset takeoff condition;

when detecting that the unmanned aerial vehicle meets the preset takeoff condition, sending a takeoff request message to the airport control device; and when receiving a takeoff instruction sent by the airport control device based on the takeoff request message, controlling the unmanned aerial vehicle to take off and perform tour inspection based on a preset tour inspection route.

Some embodiments of the present disclosure further provide an airport control device, comprising:

a first detection module configured to, when receiving an unmanned aerial vehicle start instruction sent by an airport monitor device, detect whether an unmanned aerial vehicle meets a preset tour inspection condition;

a tour inspection request message sending module configured to, when detecting that the unmanned aerial vehicle meets the preset tour inspection condition, send a tour inspection request message to the airport monitor device;

a trigger module configured to, when receiving a tour inspection instruction sent by the airport monitor device based on the tour inspection request message, trigger the unmanned aerial vehicle control device to detect whether the unmanned aerial vehicle meets a preset takeoff condition, so that the unmanned aerial vehicle control device sends a takeoff request message to the airport control device when detecting that the preset takeoff condition is met; and a takeoff instruction sending module configured to, when receiving the takeoff request message, detect whether an unmanned aerial vehicle airport meets a preset quasi-flying condition, and when detecting that the unmanned aerial vehicle airport meets the preset quasi-flying condition, send a takeoff instruction to the unmanned aerial vehicle control device, so that the unmanned aerial vehicle control device controls the unmanned aerial vehicle to take off and perform tour inspection based on a preset tour inspection route.

Some embodiments of the present disclosure further provide an unmanned aerial vehicle control device, comprising:

a second detection module configured to, when detecting a trigger operation of an airport control device, detect whether an unmanned aerial vehicle meets a preset takeoff condition;

a takeoff request message sending module configured to, when detecting that the unmanned aerial vehicle meets the preset takeoff condition, send a takeoff request message to the airport control device; and a tour inspection control module configured to, when receiving a takeoff instruction sent by the airport control device based on the takeoff request message, control the unmanned aerial vehicle to take off and perform tour inspection based on a preset tour inspection route.

Some embodiments of the present disclosure further provide an apparatus, comprising:

one or more processors; and a memory for storing one or more programs; wherein the one or more programs, when executed by the one or more processors, enable the one or more processors to implement the tour inspection method according to the second aspect or third aspect.

Some embodiments of the present disclosure further provide a computer-readable storage medium, storing a computer program thereon, wherein the program, when executed by a processor, implements the tour inspection method according to the second aspect or third aspect.

The above embodiments of the invention have the following advantages or beneficial effects:

The automatic tour inspection process of the unmanned aerial vehicle is realized by using the airport monitor device, the airport control device and the unmanned aerial vehicle control device. In some embodiments, the airport control device detects whether the unmanned aerial vehicle meets the preset tour inspection condition when receiving the unmanned aerial vehicle start instruction sent by the airport monitor device, and sends the tour inspection request message to the airport monitor device when detecting that the unmanned aerial vehicle meets the preset tour inspection condition; when receiving the tour inspection instruction sent by the airport monitor device based on the tour inspection request message, the unmanned aerial vehicle control device is triggered to detect whether the unmanned aerial vehicle meets the preset takeoff condition. When detecting that the unmanned aerial vehicle meets the preset takeoff condition, the unmanned aerial vehicle control device sends the takeoff request message to the airport control device, and when receiving the takeoff instruction sent by the airport control device based on the takeoff request message, the unmanned aerial vehicle is controlled to take off and perform tour inspection based on the preset tour inspection route. There is no need to manually control the unmanned aerial vehicle during the entire tour inspection process, thus realizing the automatic tour inspection of the unmanned aerial vehicle, saving labor costs.

The present disclosure provides an unmanned aerial vehicle cruise system, which realizes the cruise continuing operation of the unmanned aerial vehicle during the cruise process of the unmanned aerial vehicle and expands a cruise range of the unmanned aerial vehicle.

Some embodiments of the present disclosure provide an unmanned aerial vehicle cruise system, comprising: an unmanned aerial vehicle and a plurality of cruise control apparatuses; wherein the plurality of cruise control apparatuses are preset according to a cruise route of the unmanned aerial vehicle;

the unmanned aerial vehicle cruises to each cruise control apparatus in sequence according to a preset cruise route;

when the unmanned aerial vehicle arrives at any cruise control apparatus, the unmanned aerial vehicle establishes a connection with the cruise control apparatus; and the cruise control apparatus performs a cruise continuing operation on the unmanned aerial vehicle.

The unmanned aerial vehicle cruise system according to some embodiments of the present disclosure comprises the unmanned aerial vehicle and the plurality of cruise control apparatuses preset in the cruise route of the unmanned aerial vehicle, the unmanned aerial vehicle cruises to each cruise control apparatus in sequence according to the preset cruise route, when the unmanned aerial vehicle arrives at any cruise control apparatus, the unmanned aerial vehicle establishes a connection with the cruise control apparatus, and the cruise continuing operation is performed on the unmanned aerial vehicle through the cruise control apparatus, so that the unmanned aerial vehicle does not need to return back to the previous cruise control apparatus for charging or other cruise continuing operations, the unmanned aerial vehicle continues the tour inspection work to further cruise destinations, and the automatic cruise range of the unmanned aerial vehicle is expanded.

BRIEF DESCRIPTION OF THE DRAWINGS

FIG. 3 is a schematic top-view structural diagram of a protective cover of an unmanned aerial vehicle airport in an open state according to some embodiments of the present disclosure.

FIG. 4 is a schematic side-view structural diagram of a protective cover of an unmanned aerial vehicle airport in an open state according to some embodiments of the present disclosure.

FIG. 5 is a schematic three-dimensional structural diagram of a protective cover of an unmanned aerial vehicle airport in a closed position according to some embodiments of the present disclosure.

FIG. 6 is a schematic front-view structural diagram of a protective cover of an unmanned aerial vehicle airport in a closed position according to some embodiments of the present disclosure.

FIG. 17 is a schematic three-dimensional structural diagram of part of a protective cover opening and closing driving device of an unmanned aerial vehicle airport according to some embodiments of the present disclosure.

FIG. 18 is a schematic diagram of a principle of a four-bar linkage mechanism of an unmanned aerial vehicle airport according to some embodiments of the present disclosure.

FIG. 19 is a schematic diagram of a first charge device of an unmanned aerial vehicle airport located below a parking apron according to some embodiments of the present disclosure.

FIG. 20 is a schematic three-dimensional structural diagram of four first charge devices defining a rectangle of an unmanned aerial vehicle airport according to some embodiments of the present disclosure.

FIG. 21 is a schematic three-dimensional structural diagram of a first charge device of an unmanned aerial vehicle airport in a non-charging state according to some embodiments of the present disclosure.

FIG. 26 is a schematic three-dimensional structural diagram of a first charge device and a second charge device of an unmanned aerial vehicle system in a charging state according to some embodiments of the present disclosure.

FIG. 27 is a schematic cross-sectional structural diagram of a first charge device and a second charge device of an unmanned aerial vehicle system in a charging state according to some embodiments of the present disclosure.

FIG. 28 is a schematic three-dimensional structural diagram of a guiding device of a parking apron of an unmanned aerial vehicle system according to some embodiments of the present disclosure.

FIG. 29 is a partially enlarged schematic structural diagram of a guiding device of a parking apron of an unmanned aerial vehicle system according to some embodiments of the present disclosure.

FIG. 30 is a schematic structural diagram of a tour inspection system according to some embodiments of the present disclosure.

DESCRIPTION OF THE INVENTION

Figure 1:
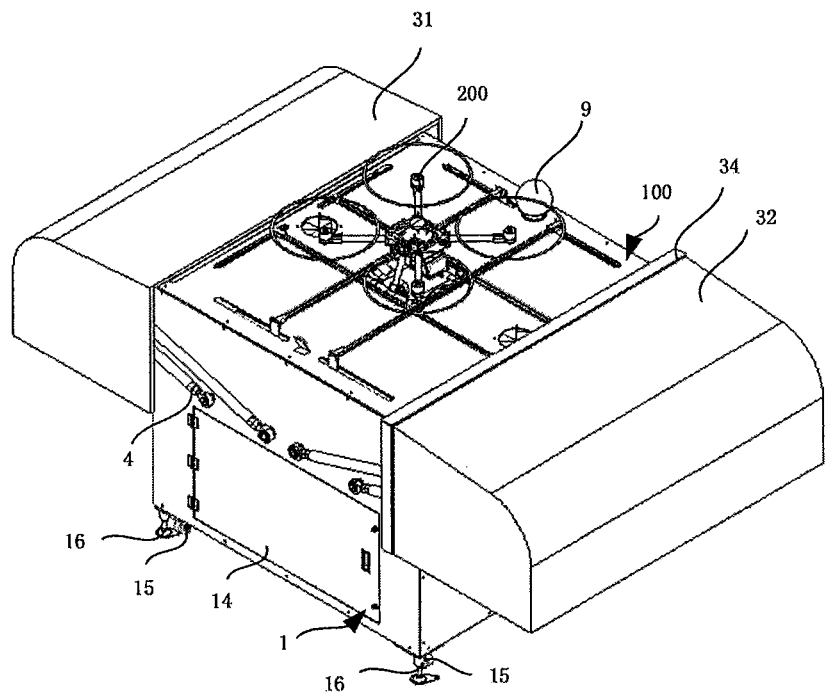
FIG. 1 is a schematic three-dimensional structural diagram of a protective cover of an unmanned aerial vehicle airport in an open state according to some embodiments of the present disclosure.
Figure 2:
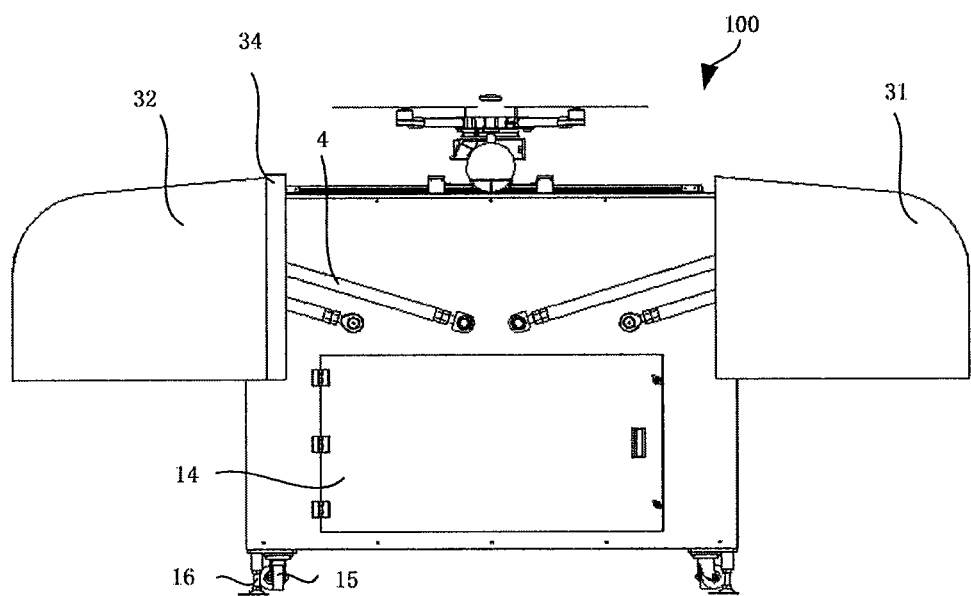
FIG. 2 is a schematic front-view structural diagram of a protective cover of an unmanned aerial vehicle airport in an open state according to some embodiments of the present disclosure.
Figure 7:
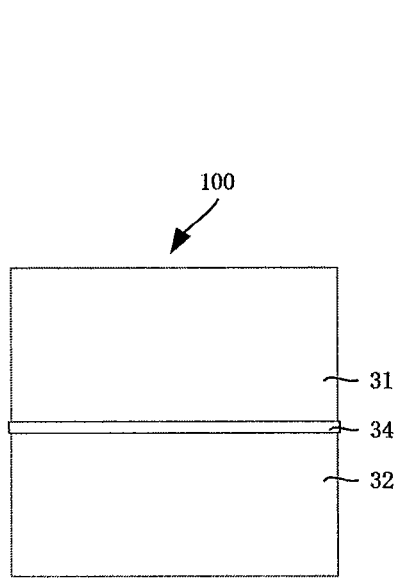
FIG. 7 is a schematic top-view structural diagram of a protective cover of an unmanned aerial vehicle airport in a closed position according to some embodiments of the present disclosure.

The technical solutions provided by the present disclosure are described in more detail below in conjunction with FIG. 1 to FIG. 54.

Referring to FIG. 1 to FIG. 29, an unmanned aerial vehicle 200 is configured to execute a specific task. After completing the work, the unmanned aerial vehicle 200 flies back to an unmanned aerial vehicle airport 100 for maintenance and charging, in order to execute the next task. The unmanned aerial vehicle airport 100 according to some embodiments of the present disclosure has a protective cover 3 which is opened and closed automatically. When the aircraft flies back to a set position above a parking apron 2, the protective cover 3 is opened to wait for the unmanned aerial vehicle 200 to land in place, and then the protective cover 3 is closed to protect the unmanned aerial vehicle 200.

In some of the following embodiments, the unmanned aerial vehicle 200 is automatically charged when parked at the unmanned aerial vehicle airport 100. That is, the unmanned aerial vehicle 200 is charged in the protective cover 3. Considering the problem of heat dissipation during the charging process, in some embodiments, an air conditioner 17 is also installed on the unmanned aerial vehicle airport 100, and the air conditioner 17 is configured to dissipate heat from an apparatus in charging; the air conditioner 17 is also matched with a fan 13 described in detail later for use to improve the heat dissipation effect.

The specific implementation of the unmanned aerial vehicle airport 100 according to some embodiments of the present disclosure will be described in detail below.

Referring to FIGS. 1 to 7, some embodiments of the present disclosure provide an unmanned aerial vehicle airport 100, which comprises a support base 1, a parking apron 2, a protective cover 3, and a protective cover opening and closing driving device 4.

The support base 1 is a basic frame of the entire unmanned aerial vehicle airport 100. On one hand, the support base 1 carries the unmanned aerial vehicle 200, and also provides a basis for the installation of other components; on the other hand, the support base 1 is disposed to realize modularization of the entire unmanned aerial vehicle airport 100, and the unmanned aerial vehicle airport 100 is disposed in any desired location in actual use.

In some embodiments, walking devices are installed on the support base 1. The walking device are, for example, casters 15 described later, or universal wheels, or crawlers. The walking devices are disposed, so that the support base 1 is easily displaced, and the support base 1 is easily disposed in any required occasion.

In some embodiments, referring to FIG. 5, in order to facilitate the movement of the support base 1 of the unmanned aerial vehicle airport 100, the bottom of a rack 11 is provided with the casters 15. The casters 15 are fixed on four corners of the bottom of the rack 11, so that the support base 1 forms a walkable apparatus. When the unmanned aerial vehicle airport 100 needs to move, the unmanned aerial vehicle airport 100 is pushed to walk.

Referring to FIG. 5, in order to facilitate the fixation of the support base 1 of the unmanned aerial vehicle airport 100, the bottom of the rack 11 is provided with foot cups 16. The foot cups 16 are also fixed on the four corners of the bottom of the rack 11. The foot cups 16 are adjacent to the casters 15 and play a role of supporting the support base 1 mentioned above. When the unmanned aerial vehicle airport 100 moves to a designated position and needs to be fixed, heights of the foot cups 16 are adjusted, so that the foot cups 16 fall to the ground and the casters 15 leave the ground. In some embodiments, the foot cups 16 are fixed to the ground by expansion bolts.

Referring to FIGS. 5 to 8, in some embodiments, the support base 1 comprises the rack 11 and a panel 12, the panel 12 is located on the side surface of the rack 11, the parking apron 2 is installed on the top of the rack 11, and the unmanned aerial vehicle 200 is parked on the top of the parking apron 2. For example, the rack 11 adopts an aluminum alloy structure, specifically a frame structure formed by splicing aluminum profiles, which is strong in structure and light in weight. The rigidity and strength of the entire rack 11 meet the requirements, and the weight is very light.

Figure 8:
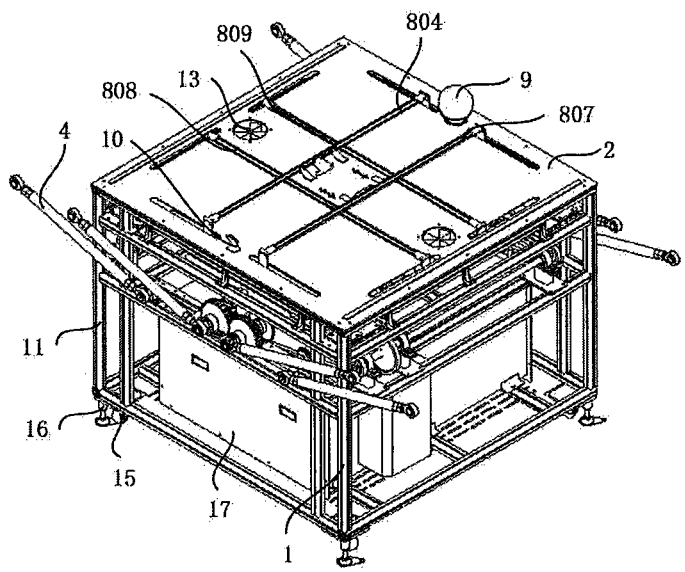
FIG. 8 is a schematic three-dimensional structural diagram of an unmanned aerial vehicle airport without a protective cover according to some embodiments of the present disclosure.
Figure 9:
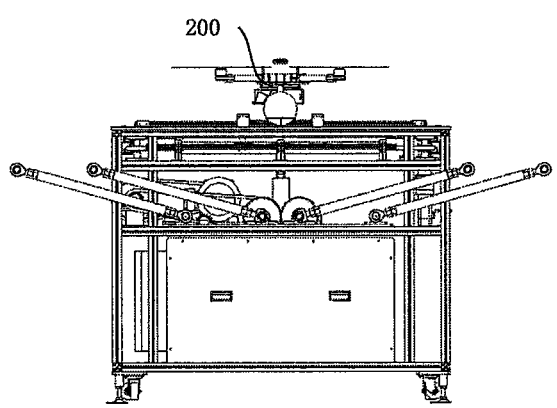
FIG. 9 is a schematic front-view structural diagram of an unmanned aerial vehicle airport without a protective cover according to some embodiments of the present disclosure.
Figure 10:
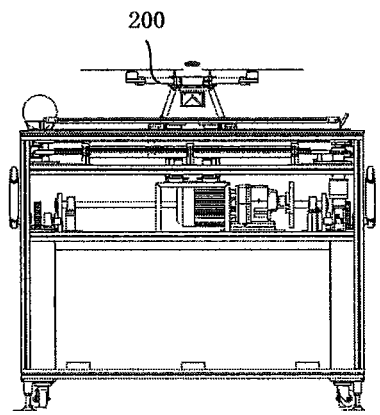
FIG. 10 is a schematic side-view structural diagram of an unmanned aerial vehicle airport without a protective cover according to some embodiments of the present disclosure.
Figure 11:
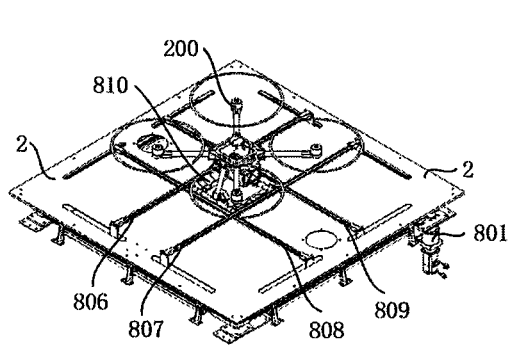
FIG. 11 is a schematic three-dimensional structural diagram of parking an unmanned aerial vehicle on a parking apron of an unmanned aerial vehicle airport according to some embodiments of the present disclosure.

Referring to FIGS. 5 and 8, the panel 12 covers all side surfaces of the rack 11. The panel 12 is made of, for example, a stainless steel plate, an aluminum alloy plate and other anti-corrosion and moisture-proof materials, and the panel 12 plays a protective role for the components located inside the rack 11. The panel 12 is provided with an access door 14. The access door 14 is installed on the panel 12 with a hinge, is located below the protective cover 3, and is connected to the panel 12 by a door lock. The access door 14 is opened when maintenance is required inside the airport.

A specific structure of the parking apron 2 is introduced below.

Referring to FIGS. 1 and 8, the parking apron 2 is installed on the top of the support base 1. The parking apron 2 is a component where the unmanned aerial vehicle 200 is landed and stopped, and has various implementations, such as a flat plate made of stainless steel or aluminum alloy and other non-magnetic materials, and the parking apron 2 is fixedly installed on the top of the rack 11.

Referring to FIG. 8, and FIGS. 11 to 13, in order to facilitate the unmanned aerial vehicle 200 to be in place after parking, the unmanned aerial vehicle 200 is neatly stacked according to a set direction, in some embodiments, the top of the parking apron 2 is provided with a guiding device 80. The guiding device 80 pushes the unmanned aerial vehicle 200 to move to a set position through linear movement of respective correcting rods. In some embodiments, the guiding device 80 adopts existing structures.

Referring to FIG. 8 and FIGS. 11 to 13, the guiding device 80 comprises a plurality of correcting rods. The correcting rods are installed on the parking apron 2, and the guiding device 80 is configured to clamp the unmanned aerial vehicle 200 by linearly moving the plurality of correcting rods, so as to cause the unmanned aerial vehicle 200 is reached at the set position of the parking apron 2.

Specifically, the guiding device 80 comprises four correcting rods, and the four correcting rods are parallel in pairs and define a rectangular frame. The four correcting rods move toward each other at the same time, so that a side length of the rectangular frame is shortened to a size of clamping the unmanned aerial vehicle 200, and the unmanned aerial vehicle 200 located in the rectangular frame will be moved by the correcting rods subsequently. The four correcting rods move opposite to each other at the same time, so that the side length of the rectangular frame is lengthened to the size of clamping the unmanned aerial vehicle 200, the unmanned aerial vehicle 200 located in the rectangular frame is unlocked, and the unmanned aerial vehicle 200 flies away subsequently.

Referring to FIG. 8 and FIGS. 11 to 13, the guiding device further comprises a locking portion 810, and the locking portion 810 is fixed to the correcting rods in a manner such as bolting or welding. When the unmanned aerial vehicle 200 is landed at the set position of the parking apron 2, the locking portion 810 presses a landing gear 201 of the unmanned aerial vehicle 200. The locking portion 810 is specifically a sheet-like structure, and two or three locking sheets are disposed on one correcting rod at intervals. The pressing sheets on the two opposite correcting rods are disposed opposite to each other, and jointly press the landing gear 201 of the unmanned aerial vehicle 200.

Referring to FIG. 8 and FIGS. 11 to 13, the guiding device 80 comprises a motor 801, an active sprocket group 802, passive sprocket groups 803, a first correcting chain 804, a second correcting chain 805, a first correcting rod 806, a second correcting rod 807, a third correcting rod 808 and a fourth correcting rod 809. The main body structure is installed under the parking apron 2, and the correcting rods are exposed out of the parking apron 2 and are located above the top of the parking apron 2.

Figure 12:
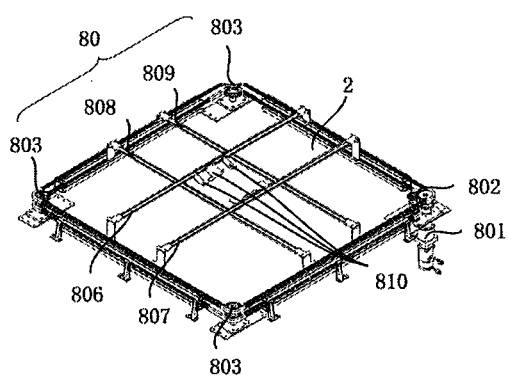
FIG. 12 is a schematic three-dimensional structural diagram of a parking apron of an unmanned aerial vehicle airport according to some embodiments of the present disclosure.
Figure 13:
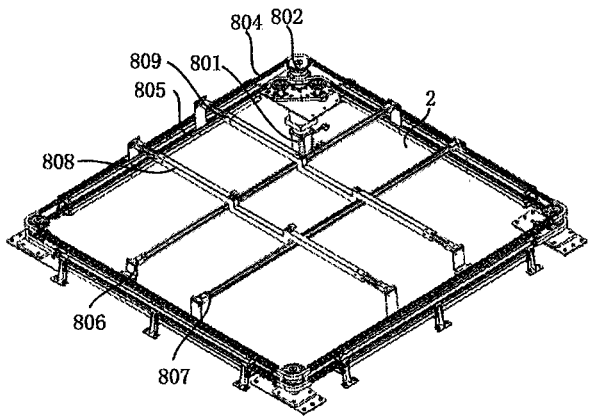
FIG. 13 is a schematic three-dimensional structural diagram of one of first charge devices on a parking apron of an unmanned aerial vehicle airport in a raised state according to some embodiments of the present disclosure.

Referring to FIGS. 12 and 13, the active sprocket group 802 and the three groups of passive sprocket groups 803 are installed on the rack 11 and are located at four corners of the rack 11. The active sprocket group 802 comprises a first active sprocket, a second active sprocket, first passive sprockets, and the like. The first active sprocket and the second active sprocket are installed and fixed on the same vertical shaft, the first active sprocket is on the upper layer, the second active sprocket is on the lower layer, and the relative positions of the two active sprockets are fixed. The two first passive sprockets are installed on the other two shafts, are at the positions on the same plane as the second active sprocket, and are arranged in a triangle. The passive sprocket group 803 mainly has two second passive sprockets, which are installed on the same vertical shaft, one second passive sprocket is on the upper layer, and the other second passive sprocket is on the lower layer.

Referring to FIGS. 12 and 13, the first correcting chain 804 respectively bypasses the first active sprocket and the second passive sprockets on the upper layers of the other three passive sprocket groups 803, and connects them together. The second correcting chain 805 respectively bypasses the second active sprocket, the two first passive sprockets and the second passive sprockets on the lower layers of the other three passive sprocket groups 803 and connects them together.

Referring to FIGS. 12 and 13, both the first correcting chain 804 and the second correcting chain 805 are closed to form a rectangle, which is consistent with the shape of the parking apron 2.

The first correcting chain 804 and the second correcting chain 805 bypass the sprockets in opposite directions, so that when the active motor 801 drives the active sprockets to rotate, the active sprocket bypassed by the first correcting chain 804 and the active sprocket bypassed by the second correcting chain 805 have the same rotation direction and the same rotation speed. At the same time, the first correcting chain 804 and the second correcting chain 805 have the same linear velocity, and opposite traveling directions.

One end of the first correcting rod 806 is installed and fixed on the first correcting chain 804, and the other end is installed and fixed on the second correcting chain 805 on the opposite side of the rectangle. One end A of the second correcting rod 807 parallel to the first correcting rod 806 is installed and fixed on the second correcting chain 805, and the other end B is installed and fixed on the first correcting chain 804 on the opposite side of the rectangle.

One end of the third correcting rod 808, which is perpendicular to both the first correcting rod 806 and the second correcting rod 807, is installed and fixed on the second correcting chain 805, and the other end is installed and fixed on the first correcting chain 804 on the opposite side of the rectangle. One end of the fourth correcting rod 809 parallel to the third correcting rod 808 is installed and fixed on the first correcting chain 804, and the other end is installed and fixed on the second correcting chain 805 on the opposite side of the rectangle.

Due to the connection manner above: when the first correcting chain 804 and the second correcting chain 805 move, the first correcting rod 806, the second correcting rod 807, the third correcting rod 808, the fourth correcting rod 809 have the same linear velocity and synchronous movement. The first correcting rod 806 and the second correcting rod 807 move in opposite directions, and the third correcting rod 808 and the fourth correcting rod 809 move in opposite directions. When the first correcting rod 806 and the second correcting rod 807 move towards each other, and the third correcting rod 808 and the fourth correcting rod 809 move towards each other, the unmanned aerial vehicle 200 landed on the parking apron 2 and having at least one of position declination and offset is corrected to a fixed position in the middle of the parking apron 2. When the first correcting rod 806 and the second correcting rod 807 move in opposite directions, and the third correcting rod 808 and the fourth correcting rod 809 move in opposite directions, the correcting rods are opened, and then the unmanned aerial vehicle 200 takes off from the parking apron 2.

Referring to FIGS. 1 to 7 and FIGS. 14 to 18, the specific implementation of the protective cover 3 is described below.

The protective cover 3 covers the top of the parking apron 2. The protective cover 3 is a cover body that is arched upward, the cover body has a concave area, and the parking apron 2 and the unmanned aerial vehicle 200 and other parts located on the parking apron 2 are located below the concave area.

Referring to FIGS. 1 to 7, in some embodiments, the protective cover 3 comprises a first cover body 31 and a second cover body 32. The first cover body 31 is located on the top of the parking apron 2, and the second cover body 32 is located on the top of the parking apron 2. The first cover body 31 is drivingly connected to the protective cover opening and closing driving device 4. The second cover body 32 is drivingly connected to the protective cover opening and closing driving device 4. When the first cover body 31 and the second cover body 32 move toward each other to mutual contact positions, the protective cover 3 is closed; when the first cover body 31 and the second cover body 32 move to the farthest positions relative to each other, the protective cover 3 is opened.

The first cover body 31 and the second cover body 32 are driven by separate driving structures, or by a set of driving mechanisms. In some embodiments, the first cover body 31 and the second cover body 32 are each driven independently and move synchronously. On one hand, due to this structure, the opening and closing operations of the protective cover 3 are more efficient, and the first cover body 31 and the second cover body 32 also move synchronously, so that the two easily form an airtight protective cover 3.

Referring to FIGS. 1 to 9, in some embodiments, the first cover body 31 is installed on an active rod 43 and rotates along with the active rod 43. The second cover body 32 is installed on a passive rod 44 and rotates along with the passive rod 44. When both the first cover body 31 and the second cover body 32 move to upper positions, the protective cover 3 is closed to form a closed space above the parking apron 2, so as to protect the parking apron 2 from rain and snow. When both the active rod 43 and the passive lever 44 rotate, the first cover body 31 and the second cover body 32 both move to lower positions, the first cover body 31 and the second cover body 32 are separated, and the protective cover 3 is opened and is stopped at both sides of the parking apron 2, so that the parking apron 2 is exposed, and the unmanned aerial vehicle 200 takes off and land at this time.

A sealing strip 33 is installed between the first cover body 31 and the second cover body 32, and the sealing strip 33 is installed on any one or both of the first cover body 31 and the second cover body 32. When the protective cover 3 is closed, the sealing strip 33 enhances the sealing effect and effectively prevent, external rainwater and ash layers from entering the protective cover 3.

Referring to FIGS. 1 to 6, the second cover body 32 has a protective plate 34, part of which extends outward. When the first cover body 31 and the second cover body 32 are closed, the protective plate of the second cover body 32 will cover part of the first cover body 31 to form a crossing effect and enhance the sealing effect.

In the above solution, the protective cover 3 adopts a two-half structure, and completely exposes the top of the parking apron 2 when in the open state, which is convenient for parking the unmanned aerial vehicle 200. After closing, the first cover body 31 and the second cover body 32 abut against each other, and the sealing is tight.

Referring to FIGS. 14 to 17, the protective cover opening and closing driving device 4 for driving the protective cover 3 to open and close is described in the following.

The protective cover opening and closing driving device 4 is installed between the support base 1 and the protective cover 3, and the protective cover opening and closing driving device 4 is configured to drive the protective cover 3 to switch between an open position and a closed position.

The protective cover opening and closing driving device 4 adopts, for example, a bar linkage structure, a linear movement mechanism, or other implementations.

Figure 15:
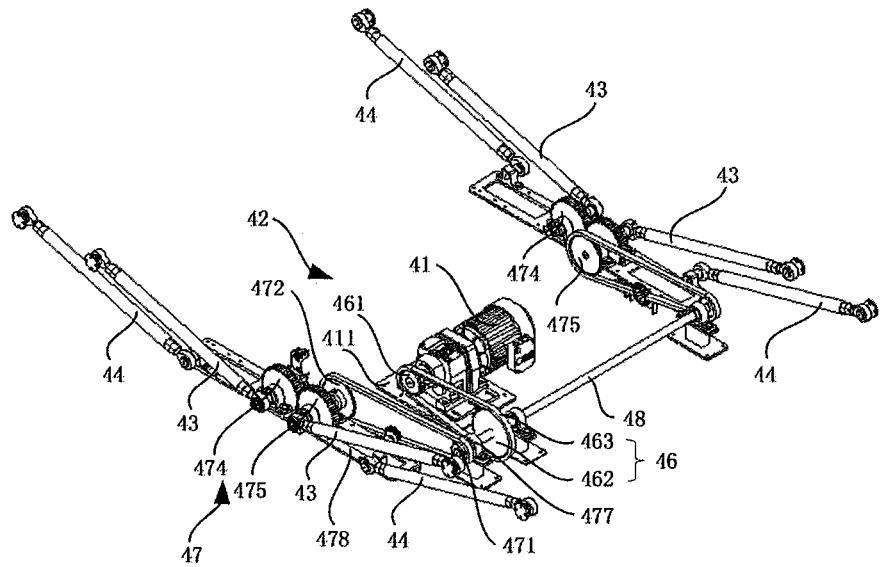
FIG. 15 is a schematic three-dimensional structural diagram of a protective cover opening and closing driving device of an unmanned aerial vehicle airport according to some embodiments of the present disclosure.

Referring to FIG. 15, in some embodiments, the protective cover opening and closing driving device 4 comprises a driving source 41, a synchronous transmission mechanism 42 and a plurality of active rods 43. For example, there are four active rods 43, each half of the cover body is provided with two active rods 43, and the two active rods 43 are located on both sides of the cover body, so that the movement of this part of cover body is more stable and reliable. The driving source 41 is configured to provide rotational power, and the driving source is, for example, a deceleration motor. An input end of the synchronous transmission mechanism 42 is drivingly connected to an output end of the driving source 41. A first end of each active rod 43 is rotatably connected to the synchronous transmission mechanism 42; a second end of each active rod 43 is rotatably connected to the protective cover 3.

Referring to FIG. 15, in some embodiments, the unmanned aerial vehicle airport 100 further comprises a plurality of passive rods 44, a first end of each passive rod 44 is rotatably connected to the support base 1, and a second end of each passive rod 44 is rotatably connected to the protective cover 3. Each half of the cover body is connected to the active rod 43 and the passive rod 44 at the same time, which makes the movement of each half of the cover body more stable, and also facilitates the fixation of each half of the cover body in a required position.

Figure 16:
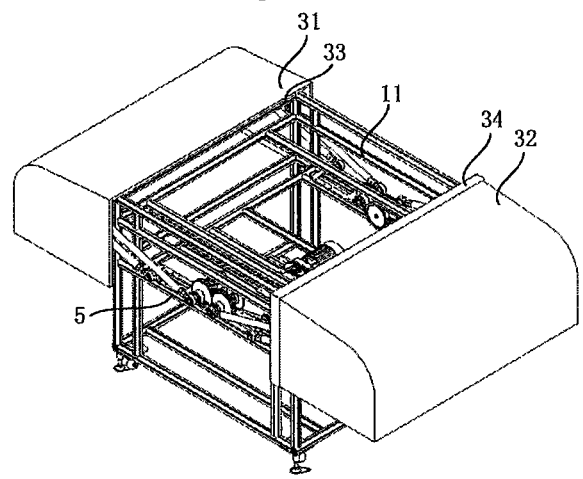
FIG. 16 is a schematic three-dimensional structural diagram of an unmanned aerial vehicle airport without a parking apron according to some embodiments of the present disclosure.

Referring to FIGS. 15 and 16, in order to facilitate the installation of the components such as the protective cover opening and closing driving device 4, the unmanned aerial vehicle airport 100 also comprises a base plate 5, the base plate 5 is fixed to the support base 1, and the driving source 41, the synchronous transmission mechanism 42 and the passive rods 44 are all supported by the base plate 5. The base plate 5, one passive rod 44, one active rod 43 and the protective cover 3 form a parallel four-bar linkage mechanism.

Figure 14:
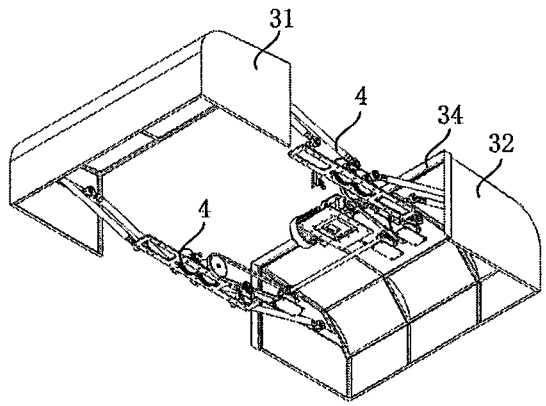
FIG. 14 is a schematic diagram of a connection relationship between a protective cover and a protective cover opening and closing driving device of an unmanned aerial vehicle airport according to some embodiments of the present disclosure.

Referring to FIGS. 14 to 16, the parallel four-bar linkage mechanisms are symmetrically disposed on both sides of a symmetry axis of the first cover body 31 and the second cover body 32. Each half of the cover body is driven by two active rods 43, and the force of each cover body during the opening and closing process is more balanced.

Referring to FIGS. 14 to 16, the synchronous transmission mechanism 42 comprises a first driving assembly 46 and a second driving assembly 47. The first driving assembly 46 is drivingly connected to the driving source 41. The second driving assembly 47 is drivingly connected to the first driving assembly 46 and is configured to drive the active rods 43.

In some embodiments shown in FIG. 15, there is one set of the first driving assembly 46 and two sets of the second driving assemblies 47. Both sets of the second driving assemblies 47 are drivingly connected to the first driving assembly 46 through a connecting shaft 48. Each set of second driving assemblies 47 is connected to two active rods 43 and two passive rods 44.

Referring to FIGS. 14 to 16, the first driving assembly 46 comprises a first sprocket 461, a second sprocket 462, and a first chain 463. The first sprocket 461 is configured to drive connected to the driving source 41. The second sprocket 462 is drivingly connected to the second driving assembly 47. The first chain 463 is wound on the outer sides of the first sprocket 461 and the second sprocket 462. The first sprocket 461 drives the second sprocket 462 through the first chain 463. The first driving assembly with the above structure has reliable transmission and compact structure.

Referring to FIG. 15, in some embodiments, the second driving assembly 47 comprises third sprockets 471, a fourth sprocket 472, a first gear 475, and a second chain 473. The third sprockets 471 are drivingly connected to the second sprocket 462. The second chain 473 is wound on the outer sides of the third sprockets 471 and the fourth sprocket 472. The third sprockets 471 is configured to drive the fourth sprocket 472 through the second chain 473. The first gear and the fourth sprocket 472 are coaxially installed and coaxially rotate. The first gear 475 is drivingly connected to the first end of one active rod 43, and the second end of the active rod 43 is drivingly connected to the first cover body 31.

Continuing to refer to FIG. 15, in some embodiments, the second driving assembly 47 further comprises a second gear 474, which is engaged with and has the same number of teeth as the first gear 475. The second gear 474 is drivingly connected to another active rod 43, and the second end of this active rod 43 is drivingly connected to the second cover body 32.

Referring to FIG. 1 and FIG. 15, a specific implementation of the protective cover opening and closing driving device 4 will be described as a whole below.

The driving source 41 adopts the deceleration motor, the deceleration motor is installed on a motor installation plate 411, and the motor installation plate 411 is fixed on the rack 11. The deceleration motor provides power to open and close the protective cover 3 through a transmission device.

In FIG. 15, the first sprocket 461 is installed and fixed on a shaft end of the motor, the second sprocket 462 is installed and fixed on the connecting shaft 48, the connecting shaft 48 is supported by a connecting bearing seat 477, the connecting bearing seat 477 is installed and fixed on a motor installation plate 411, and the motor installation plate 411 is fixed on the rack 11. At the same time, the first sprocket 461 and the second sprocket 462 are connected together by the first chain 463, so that when rotating, the deceleration motor drives the first sprocket 461 to rotate, which further drives the second sprocket 462 to rotate, and further drives the connecting shaft 48 to rotate.

There are two third sprockets 471, which are respectively installed and fixed on both ends of the connecting shaft 48. The fourth sprocket 472 is installed and fixed on a shaft end of a synchronous gear set on both sides of the rack 11. At the same time, the third sprockets 471 and the fourth sprocket 472 are connected together by the second chain 473, so that when rotating, the connecting shaft 48 drives the third sprockets 471 to rotate, which further drives the fourth sprocket 472 to rotate, and further drives the synchronous gear set to rotate.

The second driving assembly 47 is installed and fixed on the rack 11. A fixing plate 478 of the second driving assembly 47 is fixed on the rack 11, four groups of first bearing seats are installed on the middle part, and a fourth shaft is installed in every two first bearing seats 476 respectively. The second gear 474 and the first gear 475 are respectively installed and fixed on the two fourth shafts, and the second gear 474 and the first gear 475 are matched with each other through external engaging. The fourth sprocket 472 is fixed to one end of one fourth shaft. When rotating, the fourth sprocket 472 further drives the fourth shaft on which the fourth sprocket 472 is installed to rotate, which further drives the gear on the fourth shaft to rotate, further drives another engaged gear to rotate, and further drives the other fourth shaft to rotate. The number of teeth of the second gear 474 and the first gear 475 is the same, that is, i=1, and then the two fourth shafts have the same rotational speed but opposite rotation directions. In this way, the two fourth shafts form synchronous movement.

Referring to FIG. 15, two groups of support seats are also installed on both sides of the fixing plate 478, and first shafts are respectively installed and fixed in the two groups of support seats. There are four active rods 43, one end of each active rod 43 is a hinge point such as a spherical bearing, the other end is a fixed connection hole, the fixed connection hole end is connected and fixed to one end of the fourth shaft of the synchronous gear set, and a third shaft is installed on the hinge point side, which forms hinged connection with the third shaft.

There are four passive rods 44, both ends of each passive rod 44 are hinge points, and one end is installed on the first shaft of the synchronous gear set, and forms hinged connection with the first shaft. The third shaft is installed on the other end, which forms hinged connection with the third shaft.

Lengths of the first active rod 43 and the second active rod 43 are equal. Lengths of the two passive rods 44 are the same. All active rods 43 and all passive rods 44 are fixedly installed on the first cover body 31 and the second cover body 32. The distance between the two active rods 43 is equal to the distance between the two passive rods 44. In this way, the fixing plate 478, the active rods 43, the passive rods 44, the first cover body 31, and the second cover body 32 form an equilateral parallelogram bar linkage mechanism.

When moving synchronously, the two fourth shafts of each synchronous gear set drive the active rods 43, the passive rods 44, the first cover body 31 and the second cover body 32 to form synchronous movement, that is, the rotational speeds are the same but the rotation directions are opposite. That is, the synchronous opening and closing of the first cover body 31 and the second cover body 32 are controlled by the rotation of the deceleration motor.

Referring to FIG. 19 to FIG. 21, an implementation of the charge device is described below.

The unmanned aerial vehicle airport 100 also comprises a first charge device 6. The first charge device 6 is installed on the parking apron 2 and comprises a first electrode 61. A second charge device 7 is installed on the unmanned aerial vehicle 200 and comprises a second electrode 71; and the first electrode 61 and the second electrode 71 are matched in a rechargeable manner. The charge devices are installed at the bottom of the center position of the parking apron 2, that is, right below the position after the unmanned aerial vehicle 200 is corrected.

For example, there are a plurality of first electrodes 61 and second electrodes 71, and the metal contacts of the first electrodes 61 and the second electrodes 71 are in contact with each other for conduction and charging; the metal contacts of the two are separated for no longer charging. Both the first electrodes 61 and the second electrodes 71 are arranged in an array or configuration.

Below the unmanned aerial vehicle 200, for example, two second charge devices 7 are disposed, and the two second charge devices 7 are disposed symmetrically with respect to a longitudinal center axis of a fuselage of the unmanned aerial vehicle 200, so that the structure of the unmanned aerial vehicle 200 is more balanced and more stable in flying.

Referring to FIG. 20, in some embodiments, every four first charge devices 6 define a symmetrical rectangular shape. When the unmanned aerial vehicle 200 is corrected on the parking apron 2, the orientation of a nose of the unmanned aerial vehicle 200 is not limited, so that the unmanned aerial vehicle 200 is charged normally no matter which direction the nose of the unmanned aerial vehicle 200 faces.

Referring to FIG. 19 to FIG. 22, a specific implementation of the first charge device 6 is described below.

The first charge device 6 comprises a first insulating member 62, a second insulating member 63 and a lifting and lowering device 64. The first insulating member 62 is fixed below the parking apron 2. The first insulating member 62 is provided with a first through hole 621. The first insulating member 62 plays a role of installation, fixation and limitation, so that during the charging process, the second insulating member 63 is always below the first insulating member 62.

The second insulating member 63 is located below the first insulating member 62, and a first end of the first electrode 61 is installed on the second insulating member 63. A second end of the first electrode 61 is slidably arranged in the first through hole 621. The lifting and lowering device 64 is drivingly connected to the second insulating member 63, and the lifting and lowering device 64 is used for lifting and lowering the second insulating member 63, so that the first electrode 61 protrudes to the top of the parking apron 2 through an installation hole of the parking apron 2. The second insulating member 63 is an installation component of the first electrode 61, and the lifting and lowering of the first electrode 61 is realized through the lifting and lowering device 64. When the first electrode 61 is lifted in place, the first electrode 61 is exposed out of the parking apron 2, and performs charging in this state. When the first electrode 61 is located under the parking apron 2, no charging is performed in this state.

Referring to FIG. 21, the lifting and lowering device 64 is lifted and lowered in a direction perpendicular to the plane of the parking apron 2. The second insulating member 63 described above is disposed on the top of the lifting and lowering device 64, the second insulating member 63 is provided with a second through hole 631, and the first end of the first electrode 61 is installed in the second through hole 631. In addition, the first end of a guide device 8 is installed on the second insulating member 63. The second insulating member 63 and the guide device 8 are lifted and lowered along with the lifting and lowering device 64, so that when the unmanned aerial vehicle 200 needs charging, the second end of the first electrode 61 and a second end of the guide device 8 protrude out of the parking apron 2; when the unmanned aerial vehicle 200 needs no charging, the second end of the first electrode 61 and the second end of the guide device 8 are buried in the parking apron 2. In some embodiments, the first electrode 61 is in contact with the electrode of the second charge device 7 of the unmanned aerial vehicle 200 for charging; during the above charging process, the guide device 8 is inserted into a second guide hole 721 of the second charge device 7 of the unmanned aerial vehicle 200 to play a guidance role. It is understood that the parking apron 2 needs to be provided with an unthreaded hole to lift and lower the first electrode 61 and the guide device 8.

The first insulating member 62 is fixedly connected to the bottom surface of the parking apron 2, and the first insulating member 62 is provided with the first through hole 621 for accommodating the first electrode 61 and first guide holes 622 for accommodating guide members 81 described below. When charging is required, the lifting and lowering device 64 works to lift the second insulating member 63, thereby driving the first electrode 61 to lift to a position protruding out of the top surface of the first insulating member 62. The first electrode 61 in this position is in electrical contact with the second electrode 71 to implement charging. The above first insulating member 62 plays a role of insulating and isolating respective first electrodes 61, and the first insulating member 62 plays a role of supporting the first electrode 61 and the guide member 81.

Figure 22:
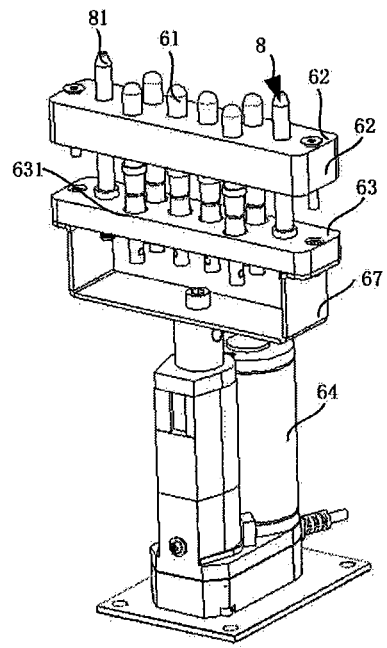
FIG. 22 is a schematic three-dimensional structural diagram of a first charge device of an unmanned aerial vehicle airport in a charging state according to some embodiments of the present disclosure.
Figure 23:
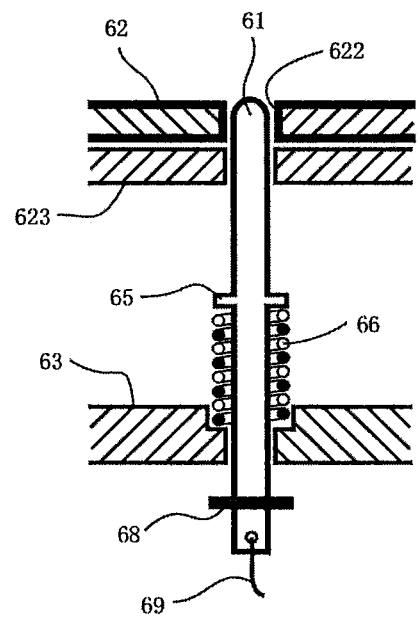
FIG. 23 is a schematic cross-sectional diagram of a connection relationship between a first electrode and a second insulating member of a first charge device of an unmanned aerial vehicle airport according to some embodiments of the present disclosure.
Figure 24:
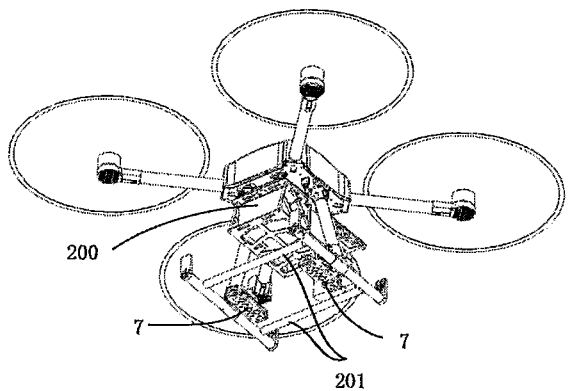
FIG. 24 is a schematic three-dimensional structural diagram of an unmanned aerial vehicle on which a second charge device is installed according to some embodiments of the present disclosure.

Referring to FIGS. 21 to 23, in some embodiments, the outer wall of the first electrode 61 is provided with a protruding portion 65, and an elastic member 66 is arranged between the protruding portion 65 and the second insulating member 63. The elastic member 66 is, for example, a spring, the spring sleeves the outer side of the first electrode 61, the top end of the spring abuts against the convex portion 65, and the bottom end of the spring abuts against the second insulating member 63. When the first electrode 61 is in contact with the second electrode 71, the spring is in a compressed state, and due to an elastic force of the spring, the contact between the first electrode 61 and the second electrode 71 is more closely, and the occurrence of poor contact caused by rigid contact between the first electrode 61 and the second electrode 71 is also reduced.

The second insulating member 63 is provided with the second through hole 631, and the first end of the first electrode 61 penetrates the second through hole 631 and protrudes to one side of the second insulating member 63 away from the first insulating member 62.

Referring to FIG. 21 to FIG. 23, in some embodiments, a separation preventing member 68 is provided on the first end of the first electrode 61, the first end of the first electrode 61 protrudes from one side of the second insulating member 63 away from the first insulating member 62. The separation preventing member 68 is located at the bottom end of the first electrode 61, and is configured to prevent the first electrode 61 from being separated from the second insulating member 63 during the lifting process of the lifting and lowering device 64.

Referring to FIGS. 21 to 23, the guide device 8 is disposed between the first insulating member 62 and the second insulating member 63, and is configured to provide linear guidance for the relative movement of the first insulating member 62 and the second insulating member 63. After the guide device is disposed, the movement of the second insulating member 63 is more reliable, so that the first electrode 61 and the second electrode 71 are aligned, which effectively improves the reliability of charging.

Referring to FIGS. 21 to 23, in some embodiments, the guide device 8 comprises the guide members 81, and the guide members 81 are fixed to the second insulating member 63. The guide members 81 are, for example, rod members. The first insulating member 62 is provided with the first guide holes 622 matched with the guide members 81.

There are two guide members 81, one guide member is disposed at one end of the second insulating member 63 in a length direction, and the other guide member is disposed at the other end of the second insulating member 63 in the length direction. The first insulating member 62 is correspondingly provided with two first guide holes 622, so that the lifting and lowering of the second insulating member 63 is more stable.

First ends of the guide members 81 are fixedly installed on the second insulating member 63, and second ends of the guide members 81 are higher than the second end (i.e., the top end) of the first electrode 61. That is, when the elastic member 66, specifically the spring is in an uncompressed state, the top ends of the guide members 81 are higher than the top end of the first electrode 61. In the lifting process of the lifting and lowering device 64, before the first electrode 61 is in contact with the second electrode 71, the guide members 81 are firstly inserted into the first guide holes 622, and the guide members 81 are inserted into the first guide holes 622 to move to provide guidance for the lifting and lowering of the first electrode 61.

Referring to FIGS. 21 to 23, in some embodiments, the second insulating member 63 is fixed to a connecting frame 67, and the connecting frame 67 is drivingly connected to the lifting and lowering device 64.

Referring to FIGS. 21 to 23, in some embodiments, the connecting frame 67 comprises a bottom plate 671 and side plates 672. The bottom plate 671 is drivingly connected to the lifting and lowering device 64; the side plates 672 are installed on side edges of the bottom plate 671, and the top ends of the side plates 672 are fixedly connected to the second insulating member 63. There is an empty area between the bottom plate 671 and the second insulating member 63, and the height of the area is the same as the heights of the side plates 672. The empty area provides space for the movement of the first electrode 61.

Referring to FIGS. 21 to 23, in some embodiments, there are a plurality of first electrodes 61. The plurality of first electrodes 61 are arranged in a desired array form.

Referring to FIGS. 24 to 27, a specific implementation of the second charge device 7 matched with the first charge device 6 for charging is described below.

Referring to FIGS. 24 to 27, in some embodiments, the second charge device 7 comprises a third insulating member 72, and the second electrode 71 is disposed on the third insulating member 72. The second electrode 71 is, for example, in the form of a concave structure, so that the structure of the second electrode 71 is matched with the structure of the first electrode 61.

Figure 25:
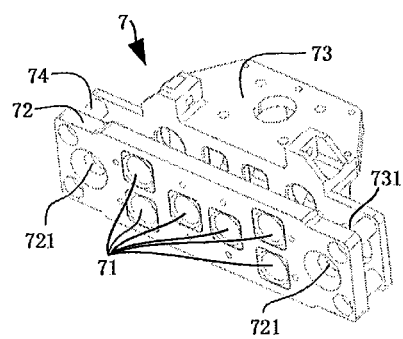
FIG. 25 is a schematic three-dimensional structural diagram of a second charge device according to some embodiments of the present disclosure.

Referring to FIGS. 25 to 27, in some embodiments, the second charge device 7 further comprises an installation frame 73, the third insulating member 72 is installed on the installation frame 73, and the installation frame 73 is used for fixation with the unmanned aerial vehicle 200.

Referring to FIG. 25, a buffer member 74 is disposed between the installation frame 73 and the third insulating member 72. The buffer member 74 is made of, for example, a rubber material or the like. The buffer member 74 is configured to enable the first electrode 61 and the second electrode 71 to be in good contact under a certain offset condition, so as to improve the charging effect.

Referring to FIGS. 21 to 23, in some embodiments, the third insulating member 72 is disposed in the second guide hole 721 matched with the guide member 81.

It has been described above that the parking apron 2 is provided with the guiding device 80. The guiding device 80 also facilitates aligning, plugging, and charging of the first charge device 6 and the second charge device 7.

Returning to FIG. 8, in some embodiments, the unmanned aerial vehicle airport 100 further comprises a fire extinguishing device 9, and the fire extinguishing device 9 is installed on the parking apron 2. The fire extinguishing device 9 is, for example, a fire extinguishing ball. If the unmanned aerial vehicle 200 catches fire due to a charging failure, a high temperature and other reasons, a sensor on the fire extinguishing ball automatically senses the fire, and the fire extinguishing ball bursts to put out the fire.

Referring to FIG. 8, in some embodiments, a fan 13 is installed on the automatic airport parking apron 2. After the protective cover 3 is closed, when the unmanned aerial vehicle 200 is charged, the temperature inside the protective cover 3 is relatively high, and the fan 13 has a cooling effect on the unmanned aerial vehicle 200. Of course, an air conditioner 17 is also disposed separately to achieve cooling during the charging process.

Referring to FIG. 8, in some embodiments, a camera 10 is installed on the automatic airport parking apron 2, and transmits internal pictures of the airport to a central control room in real time.

In some embodiments, the fan 13 is installed on the automatic airport parking apron 2, and enables air inside the airport to form a circulating flow reduce the temperature in the airport.

In some embodiments, a weather station is installed outside the automatic airport, and transmits weather information near the airport, such as wind speed, temperature and humidity, and the existence of rain or snow to a control system in real time.

Some embodiments of the present disclosure also provide an unmanned aerial vehicle system, comprising the unmanned aerial vehicle airport 100 provided by any of the technical solutions of the present disclosure.

In some embodiments, the first charge device 6 is installed on the parking apron 2 of the unmanned aerial vehicle airport 100; the unmanned aerial vehicle system further comprises the unmanned aerial vehicle 200, and the second charge device 7 is installed on the unmanned aerial vehicle 200; and the first electrode 61 and the second electrode 71 are matched in a rechargeable manner. The content introduced above is referred for the specific matching manner.

In some embodiments, two second charge devices 7 are installed on the unmanned aerial vehicle 200, and the two second charge devices 7 are disposed symmetrically, so that the structure of the unmanned aerial vehicle 200 is more stable.

Correspondingly, four first charge devices 6 are disposed, and the four first charge devices 6 define a rectangle, so that the charging is realized no matter which direction a nose of the unmanned aerial vehicle 200 faces. That is to say, after the unmanned aerial vehicle 200 is landed, no matter what heading of the unmanned aerial vehicle 200 is, as long as the unmanned aerial vehicle 200 is correctly corrected, the second charge devices 7 of the unmanned aerial vehicle 200 is mated with one of the first charge devices 6, thereby improving the accuracy of charging.

When the position of the unmanned aerial vehicle 200 is corrected and fixed, the lifting and lowering device 64 moves, the first electrode 61 at the rod end is pushed upward to protrude out of the parking apron 2 through the unthreaded hole of the parking apron 2, and the first electrode 61 and the second electrode 71 at the bottom of the unmanned aerial vehicle 200 are in electrical contact to start charging.

An interaction process between the unmanned aerial vehicle 200 and the unmanned aerial vehicle airport 100 is described below.

The charging operation is firstly described. The first charge device 6 and the second charge device 7 are configured to charge according to the following step: when the unmanned aerial vehicle 200 is corrected in place, moving the first electrode 61 of the first charge device 6 to be exposed out of the top surface of the parking apron 2, and to be in electrical contact with the second electrode 71 of the second charge device 7 of the unmanned aerial vehicle 200 to be corrected, so as to realize the charging of the unmanned aerial vehicle 200.

As described above, if the guiding device 80 comprises the locking portion 810, the unmanned aerial vehicle 200 is locked while the unmanned aerial vehicle 200 is corrected at the same time. After the unmanned aerial vehicle 200 is locked, the first electrode 61 of the first charge device 6 is moved to be exposed out of the top surface of the parking apron 2, even if the first electrode 61 has a certain upward pressing force on the second electrode 71, the unmanned aerial vehicle 200 will not leave the parking apron 2, which increases the reliability of the charging operation.

The following describes the matching of a return operation and the charging operation of the unmanned aerial vehicle 200. Before the introduction, it should be noted that charging operation is not required every time the unmanned aerial vehicle 200 is returned; the charging operation is only performed when the electric quantity of the unmanned aerial vehicle 200 does not meet usage requirements. In order to introduce in detail, the following description is described based on the fact that the unmanned aerial vehicle 200 needs to be charged after returning.

In some embodiments, the unmanned aerial vehicle 200 is configured to execute the charging operation according to the following steps:

Firstly, after receiving a return signal of the unmanned aerial vehicle 200, the unmanned aerial vehicle airport 100 receiving the return signal is locked. After the unmanned aerial vehicle airport 100 is locked, other unmanned aerial vehicles 200 are not parked randomly.

Secondly, the protective cover 3 is opened, and the protective cover 3 is closed after waiting for landing of the unmanned aerial vehicle 200. The protective cover 3 is generally in a closed state, and is only opened when the unmanned aerial vehicle 200 needs to land and take off, which has a better protective effect on the unmanned aerial vehicle airport 100.

Again, after the unmanned aerial vehicle 200 is landed, the guiding device 80 is started to move the unmanned aerial vehicle 200 to a set position and lock the same. In this way, the unmanned aerial vehicle 200 is more stably parked, and the parked unmanned aerial vehicle 200 will not move randomly no matter the charging is required subsequently or not.

Next, after receiving the signal that the unmanned aerial vehicle 200 needs to be charged, the first charge device 6 is started, so that the first charge device 6 and the second charge device 7 are in electrical contact for charging.

Subsequently, at least one of the air conditioner and the fan is started to dissipate heat from the unmanned aerial vehicle 200. The air conditioner and fan dissipate the heat generated during the charging process of the unmanned aerial vehicle 200 in time to increase the reliability of charging.

Finally, after the signal that an electric quantity is full from the unmanned aerial vehicle 200 is received, the charging is completed, and the first charge device 6 is shut off.

The process that the unmanned aerial vehicle 200 is started to fly is described below. In some embodiments, the unmanned aerial vehicle 200 is configured to execute the flying operation according to the following steps:

Firstly, a console sends route information to the unmanned aerial vehicle 200 and the unmanned aerial vehicle airport 100.

The console is configured to control flying parameters of multiple unmanned aerial vehicle airports 100 and unmanned aerial vehicles 200, which comprise but not limited to the route information, charging information, a cargo capacity, and the like.

Secondly, the unmanned aerial vehicle airport 100 controls the guiding device 80 to move to a position of unlocking the unmanned aerial vehicle 200 according to the received route information.

After the unmanned aerial vehicle airport 100 receives the route information, it is indicated that the unmanned aerial vehicle 200 will execute a flying instruction. The unmanned aerial vehicle airport 100 controls the guiding device 80 to move to the position of unlocking the unmanned aerial vehicle 200 in advance according to flying time in the route information, so as to prepare for subsequent flying of the unmanned aerial vehicle 200.

Again, the protective cover 3 is opened.

The unmanned aerial vehicle airport 100 opens the protective cover 3 in advance according to the flying time in the route information, so that the unmanned aerial vehicle 200 flys out of the protective cover 3 subsequently.

Finally, the unmanned aerial vehicle 200 executes a flying task according to the received route information.

The specific charging operation process of the unmanned aerial vehicle 200 adopted in some embodiments is described in detail below.

I. The operation on an unmanned aerial vehicle side is as follows:
1. The unmanned aerial vehicle 200 is subjected to a power-on start operation.
2. The unmanned aerial vehicle 200 is subjected to a power-on self-check operation.
3. If the received signal is that the unmanned aerial vehicle 200 needs to be charged after the unmanned aerial vehicle 200 is powered on and self-checked, the signal that the unmanned aerial vehicle 200 needs to be charged is sent to the unmanned aerial vehicle airport 100.

II. The operation on an unmanned aerial vehicle airport side is as follows:
1. The state of the first charge device 6 is detected. If there is no fault in the detection, it indicates that the subsequent charging operation is started.
2. After waiting for the unmanned aerial vehicle 200 to be parked in place and corrected to a position where it is charged, the charging is prepared and the protective cover 3 is closed.
3. The lifting and lowering device 64 of the first charge device 6 is started to electrically contact the first electrode 61 with the second electrode 62 to realize automatic charging.
4. Whether the air conditioner 17, the fan 13 and the fire extinguishing device 9 are turned on is decided according to the parameters such as temperature and charging duration detected during charging.
5. After the charging ends, the first charge device 6 is restored to the original position.

The inventors also found that: with the rapid development of computer technologies, the unmanned aerial vehicle 200, as a tour inspection apparatus, is widely used in various fields, such as disaster rescue, environmental protection detection, street scene photography, electric power tour inspection and agriculture plant protection. In the related art, during the tour inspection process of the unmanned aerial vehicle 200, a user is often required to manually control the tour inspection of the unmanned aerial vehicle 200 through a wireless remote control apparatus. However, in the process of implementing the present disclosure, the inventors found that there are at least the following problems in the related art: in the existing tour inspection manner, a professional operator is required to control the unmanned aerial vehicle 200, which causes relatively high labor costs, and in the manual operation, the unmanned aerial vehicle 200 crashes due to misoperation.

Referring to FIGS. 30 to 37, in order to improve the technical defects above, the inventors provide the following technical solutions.

FIG. 30 is a schematic structural diagram of a tour inspection system according to some embodiments of the present disclosure, and these embodiments are applicable to the situation of controlling the automatic tour inspection of the unmanned aerial vehicle 200 in the unmanned aerial vehicle airport. As shown in FIG. 30, the tour inspection system comprises: an airport monitor device 2010, an airport control device 2020 and an unmanned aerial vehicle control device 2030.

The airport control device 2020 is configured to: when receiving a start instruction of the unmanned aerial vehicle 200 sent by the airport monitor device 2010, detect whether the unmanned aerial vehicle 200 meets a preset tour inspection condition, and when detecting that the unmanned aerial vehicle 200 meets the preset tour inspection condition, send a tour inspection request message to the airport monitor device 2010; when receiving a tour inspection instruction sent by the airport monitor device 2010 based on the tour inspection request message, trigger the unmanned aerial vehicle control device 2030 to detect whether the unmanned aerial vehicle 200 meets a preset takeoff condition; the unmanned aerial vehicle control device 2030 is configured to: when detecting that the unmanned aerial vehicle 200 meets the preset takeoff condition, send a takeoff request message to the airport control device 2020, and when receiving a takeoff instruction sent by the airport control device 2020 based on the takeoff request message, control the unmanned aerial vehicle 200 to take off and perform tour inspection based on a preset tour inspection route.

The airport monitor device 2010 is configured to monitor and control a tour inspection situation of the unmanned aerial vehicle airport, and generates the start instruction and tour inspection instruction of the unmanned aerial vehicle 200 based on user operation. The airport monitor device 2010 is placed in the unmanned aerial vehicle airport or outside the unmanned aerial vehicle airport, and its specific position is set based on business requirements. The airport control device 2020 is installed in the unmanned aerial vehicle airport and configured to control internal devices of the unmanned aerial vehicle airport. The airport control device 2020 is installed in the unmanned aerial vehicle 200 and configured to control internal devices of the unmanned aerial vehicle 200. These embodiments do not limit the specific installation positions of the airport monitor device 2010, the airport control device 2020 and the unmanned aerial vehicle control device 2030.

The airport monitor device 2010 is connected and signal connected with the airport control device 2020 in advance for data transmission. For example, the airport monitor device 2010 and the airport control device 2020 are signal connected wirelessly through a network. The airport control device 2020 is signal connected with the unmanned aerial vehicle control device 2030 in advance; in some other embodiments, the connection and signal connection state with the unmanned aerial vehicle control device 2030 is also indirectly controlled, for example, when the airport control device 2020 needs to perform data transmission, the signal connection with the unmanned aerial vehicle control device 2030 is established, so that the unmanned aerial vehicle control device enters a dormant state when the tour inspection is not performed, to avoid interference and save energy.

In some embodiments, when the tour inspection of the unmanned aerial vehicle 200 is needed, the user triggers a start instruction generation operation of the unmanned aerial vehicle 200 in the airport monitor device 2010, so that the airport monitor device 2010 generates an unmanned aerial vehicle start instruction based on user operation.

For example, by means of clicking or touching an unmanned aerial vehicle start button on a display interface of the airport monitor device 2010 by the user, the airport monitor device 2010 generates the unmanned aerial vehicle start instruction, and sends the generated unmanned aerial vehicle start instruction to the airport control device 2020, so that the airport control device 2020 performs a detection operation based on the unmanned aerial vehicle start instruction to determine whether the preset tour inspection condition is currently met, and ensure the reliability of the tour inspection. When receiving the unmanned aerial vehicle start instruction, the airport control device 2020 obtains required current unmanned aerial vehicle information based on the preset tour inspection condition, and detects whether the current unmanned aerial vehicle meets the preset tour inspection condition according to the current unmanned aerial vehicle information, and if yes, the tour inspection request message is sent to the airport monitor device 2010 to instruct whether to perform the subsequent tour inspection operation. When receiving the tour inspection request message, the airport monitor device 2010 will display the same on its display interface to prompt the user that the unmanned aerial vehicle meets the preset tour inspection condition and whether the subsequent tour inspection operation needs to be performed, and if the user needs to continue the tour inspection operation, a tour inspection instruction generation operation is triggered in the airport monitor device 2010, so that the airport monitor device 2010 generates the tour inspection instruction based on user operation, and sends the generated tour inspection instruction to the airport control device 2020.

When receiving the tour inspection instruction, the airport control device 2020 triggers the unmanned aerial vehicle control device 2030 to detect whether the unmanned aerial vehicle meets the preset takeoff condition by means of sending the instruction or controlling the unmanned aerial vehicle control device 2030 to supply power. For example, if establishing the signal connection with the unmanned aerial vehicle control device 2030 in advance, the airport control device 2020 will directly send a takeoff detection instruction to the unmanned aerial vehicle control device 2030, so that the unmanned aerial vehicle control device 2030 detects whether the unmanned aerial vehicle meets the preset takeoff condition when receiving the takeoff detection instruction. If the airport control device 2020 does not establish the signal connection with the unmanned aerial vehicle control device 2030, the unmanned aerial vehicle control device 2030 is triggered by means of supplying power, so that the unmanned aerial vehicle control device 2030 detects whether the unmanned aerial vehicle meets the preset takeoff condition after supplying power.

The unmanned aerial vehicle control device 2030 obtains the required current unmanned aerial vehicle information based on the preset takeoff condition, and detects whether the current unmanned aerial vehicle meets the preset takeoff condition according to the current unmanned aerial vehicle information, and if yes, then the takeoff request message is sent to the airport control device 2020 to instruct whether to perform a takeoff operation. When receiving the takeoff request message, the airport control device 2020 detects whether the current unmanned aerial vehicle airport ensures normal takeoff of the unmanned aerial vehicle, and if yes, sends the takeoff instruction to the unmanned aerial vehicle control device 2030, so that when receiving the takeoff instruction, the unmanned aerial vehicle control device 2030 controls the unmanned aerial vehicle placed on a takeoff and landing platform inside the unmanned aerial vehicle airport to take off normally, and perform aerial tour inspection based on the pre-set preset tour inspection route, and the unmanned aerial vehicle needs no manual control during the entire tour inspection process, thereby realizing the automatic tour inspection of the unmanned aerial vehicle, saving labor costs and improving reliability.

The technical solutions of these embodiments realize the automatic tour inspection process of the unmanned aerial vehicle by utilizing the airport monitor device, the airport control device and the unmanned aerial vehicle control device. In some embodiments, the airport control device, when receiving the unmanned aerial vehicle start instruction sent by the airport monitor device, detects whether the unmanned aerial vehicle meets the preset tour inspection condition, and when detecting that the unmanned aerial vehicle meets the preset tour inspection condition, sends the tour inspection request message to the airport monitor device; when receiving the tour inspection instruction sent by the airport monitor device based on the tour inspection request message, the unmanned aerial vehicle control device is triggered to detect whether the unmanned aerial vehicle meets the preset takeoff condition. When detecting that the unmanned aerial vehicle meets the preset takeoff condition, the unmanned aerial vehicle control device sends the takeoff request message to the airport control device, and when receiving the takeoff instruction sent by the airport control device based on the takeoff request message, the unmanned aerial vehicle is controlled to take off and perform tour inspection based on the preset tour inspection route. There is no need to manually control the unmanned aerial vehicle during the entire tour inspection process, thus realizing the automatic tour inspection of the unmanned aerial vehicle, saving labor costs and improving reliability.

Figure 31:
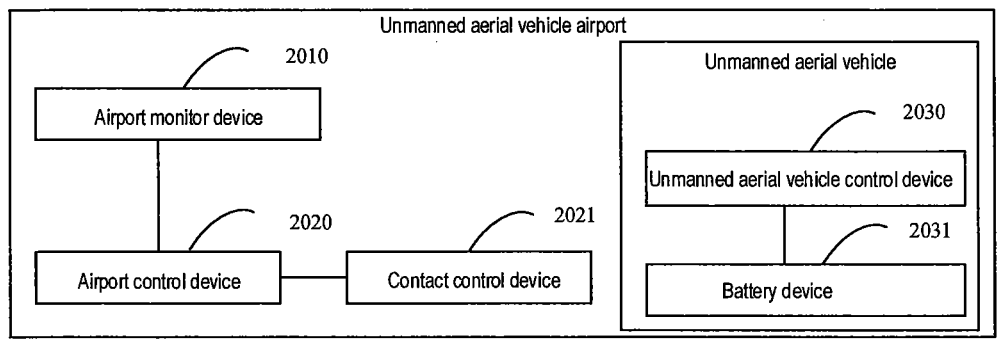
FIG. 31 is a schematic structural diagram of another tour inspection system according to some embodiments of the present disclosure.

On the basis of above technical solution, FIG. 31 provides a schematic structural diagram of another tour inspection system. As shown in FIG. 31, the system further comprises: a contact control device 2021 connected to the airport control device 2020 and a battery device 2031 in the unmanned aerial vehicle connected to the unmanned aerial vehicle control device 2030.

The contact control device 2021 is configured to move when receiving a signal connection control instruction sent by the airport control device 2020 to signal connect the airport control device 2020 and the battery device 2031; accordingly, the airport control device 2020 is configured to: when receiving the tour inspection instruction sent by the airport monitor device 2010 based on the tour inspection request message, send a power-on instruction to the battery device 2031, so that the battery device supplies electric quantity to the unmanned aerial vehicle control device, and the unmanned aerial vehicle control device is triggered to detect whether the unmanned aerial vehicle meets the preset takeoff condition.

In some embodiments, the contact control device 2021 refers to an intermediate device configured to signal connect the airport control device 2020 and the battery device 2031. The contact control device 2021 moves under the signal connection control instruction of the airport control device 2020, so as to signal connect the airport control device 2020 and the battery device 2031 for data transmission. Therefore, the airport control device 2020 indirectly controls a power supply situation of the unmanned aerial vehicle control device 2030 connected to the battery device 2031 by means of controlling the battery device 2031. In some embodiments, the contact control device 2021 enables the airport control device 2020 and the battery device 2031 to be signal connected by means of contact contacting.

In some embodiments, when receiving the unmanned aerial vehicle start instruction sent by the airport monitor device 2010, or when receiving the tour inspection instruction sent by the airport monitor device 2010 based on the tour inspection request message, the airport control device 2020 sends the signal connection control instruction to the contact control device 2021, and the contact control device 2021 moves to the battery device 2031 based on the signal connection control instruction, so that the contact control device 2021 is in contact with the battery device 2031, thereby communicating the airport control device 2020 and the battery device 2031 and facilitating subsequent signal connection. After establishing signal connection with the battery device 2031, the airport control device 2020 sends the power-on instruction to the battery device 2031. After receiving the power-on instruction, the battery device 2031 supplies electric quantity to the connected unmanned aerial vehicle control device 2030, so that the unmanned aerial vehicle control device 2030 is started, thereby triggering the operation that the unmanned aerial vehicle control device 2030 detects whether the unmanned aerial vehicle meets the preset takeoff condition. After started, the unmanned aerial vehicle control device 2030 establishes signal connection with the airport control device 2020 through a wireless signal connection device in the unmanned aerial vehicle for subsequent data transmission.

It should be noted that, the battery device 2031 is connected to all the devices that need power supply in the unmanned aerial vehicle, so that when receiving the power-on instruction, the battery device 2031 supplies power to all the devices to be powered in the unmanned aerial vehicle 200, and the unmanned aerial vehicle is started. For example, before the battery device 2031 receives the power-on instruction, the whole unmanned aerial vehicle 200 is in a power-off state, that is, a dormant state, so as to ensure that the unmanned aerial vehicle is placed in the airport more reliable, and at the same time, energy waste and electromagnetic interference from other apparatuses are avoided.

In some embodiments, the airport control device 2020 is further configured to: after sending the power-on instruction to the battery device, send a disconnection control instruction to the contact control device 2021; the contact control device 2021 is further configured to: move according to the received disconnection control instruction to disconnect the signal connection between the airport control device 2020 and the battery device 2031.

In some embodiments, after the unmanned aerial vehicle is powered on, the unmanned aerial vehicle control device 2030 establishes signal connection with the airport control device 2020, and does not need contact connection any more. At this time, the airport control device 2020 sends the disconnection control instruction to the contact control device 2021, so that the contact control device 2021 moves to disconnect the signal connection between the airport control device 2020 and the battery device 2031, and the unmanned aerial vehicle normally takes off subsequently.

On the basis of above technical solution, the airport control device 202 is also configured to: when receiving the unmanned aerial vehicle start instruction sent by the airport monitor device, obtain first electric quantity information of the unmanned aerial vehicle and current weather information; and according to the first electric quantity information and the current weather information, detect whether the unmanned aerial vehicle meets the preset tour inspection condition.

In some embodiments, the first electric quantity information refers to an electric quantity value in the unmanned aerial vehicle before takeoff. The current weather information refers to current weather information in an area to be subjected to tour inspection. The current weather information comprises, but not limited to, a current wind speed and a current rainfall.

In some embodiments, when the airport control device 2020 receives the unmanned aerial vehicle start instruction sent by the airport monitor device 2010, if the airport control device 2020 establishes signal connection with the unmanned aerial vehicle control device 2030 in advance, the airport control device 2020 sends a first electric quantity information acquisition request to the unmanned aerial vehicle control device 2030, so that the unmanned aerial vehicle control device 2030 obtains the first electric quantity information of the unmanned aerial vehicle based on the first electric quantity information acquisition request, and sends the first electric quantity information to the airport control device 2020, and the airport control device 2020 obtains the first electric quantity information of the unmanned aerial vehicle 200. If the airport control device 2020 establishes signal connection with the unmanned aerial vehicle control device 2030 by means of the battery device 2031, after establishing the signal connection with the battery device 2031, the airport control device 2020 sends the first electric quantity information acquisition request to the battery device 2031, so as to obtain the first electric quantity information of the unmanned aerial vehicle through the battery device 2031. In some embodiments, the battery device 2031 is further configured to: when receiving the first electric quantity information acquisition request sent by the airport control device 2020, collect the first electric quantity information of the unmanned aerial vehicle 200, and send the first electric quantity information to the airport control device 2020.

Figure 32A:
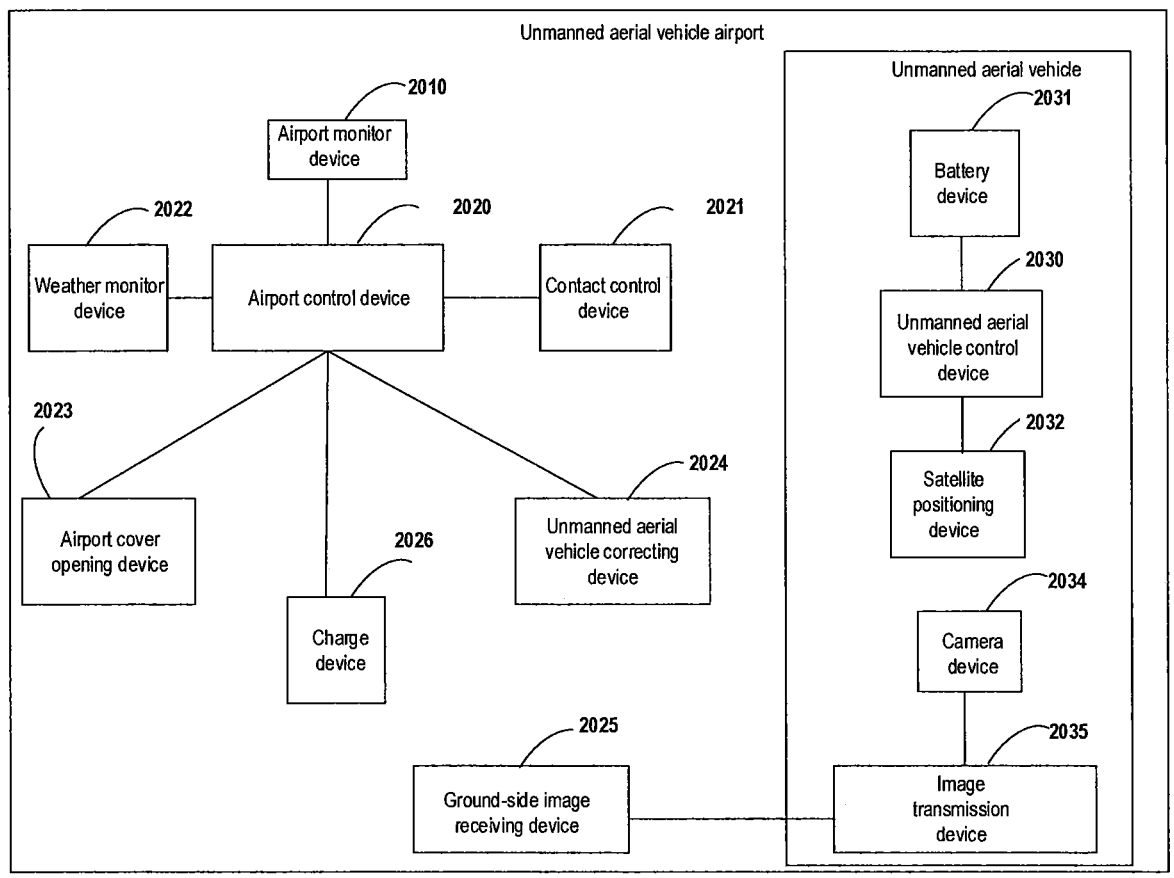
FIG. 32a is a schematic structural diagram of yet another tour inspection system according to some embodiments of the present disclosure.

In some embodiments, as shown in FIG. 32a, the system further comprises: a weather monitor device 2022 connected to the airport control device 2020 and configured to, when receiving a current weather information acquisition request sent by the airport control device 2020, obtain the current weather information, and send the current weather information to the airport control device 2020, so that the airport control device 2020 obtains the current weather information through the weather monitor device 2022.

When obtaining the first electric quantity information of the unmanned aerial vehicle 200 and the current weather information, the airport control device 2020 detects whether the first electric quantity information and the current weather information guarantee the unmanned aerial vehicle to carry out automatic tour inspection, and if yes, determines that the unmanned aerial vehicle meets the preset tour inspection condition. In some embodiments, the airport control device 2020 is configured to: when detecting that the electric quantity value in the first electric quantity information is greater than a first preset electric quantity value, the current wind speed is less than a preset wind speed and the current rainfall is zero, indicating that the electric quantity of the unmanned aerial vehicle and the current weather both ensure normal tour inspection of the unmanned aerial vehicle, determine that the unmanned aerial vehicle meets the preset tour inspection condition.

In some embodiments, when obtaining the first electric quantity information of the unmanned aerial vehicle and the current weather information, the airport control device 2020 sends the obtained first electric quantity information and current weather information to the airport monitor device 2010, so that the airport monitor device 2010 displays the electric quantity information and weather information on the display interface, which is convenient for viewing by the user.

On the basis of the above technical solution, as shown in FIG. 32a, this system also comprises: an airport cover opening device 2023 connected to the airport control device 2020 and configured to open an airport cabin cover 203 of the unmanned aerial vehicle airport when receiving a cover opening control instruction sent by the airport control device 2020; wherein the cover opening control instruction is sent when the airport control device 2020 receives the unmanned aerial vehicle tour inspection instruction sent by the airport monitor device 2010, or receives the takeoff request message sent by the unmanned aerial vehicle control device 2030.

The airport covers opening device 2023 is a device for controlling the opening or closing of the airport cabin cover 203 of the unmanned aerial vehicle airport. When the unmanned aerial vehicle prepares to take off, the airport cabin cover 203 needs to be opened, so that the unmanned aerial vehicle takes off normally from the unmanned aerial vehicle airport.

In some embodiments, when the airport control device 2020 receives the unmanned aerial vehicle tour inspection instruction sent by the airport monitor device 2010, or receives the takeoff request message sent by the unmanned aerial vehicle detection device 2010, i.e., before takeoff of the unmanned aerial vehicle, the cover opening control instruction is sent to the airport cover opening device 2023, so that the airport cabin cover 203 of the unmanned aerial vehicle airport is opened, and the unmanned aerial vehicle 200 takes off normally from the airport.

Figure 32B:
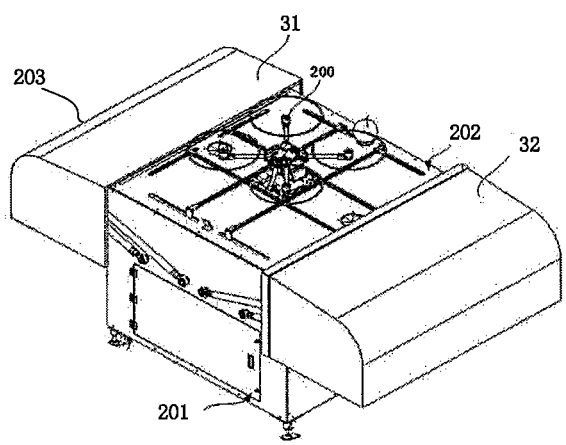
FIG. 32b is a schematic structural diagram of an unmanned aerial vehicle airport according to some embodiments of the present disclosure.

In some embodiments, FIG. 32b shows a schematic structural diagram of an unmanned aerial vehicle airport 100. As shown in FIG. 32 b, the unmanned aerial vehicle airport 100 comprises a support frame 201, a parking apron 202, an airport cabin cover 203 and an airport cover opening device 2023. As shown in FIG. 32b, the airport cabin cover 203 is located on the top of the parking apron 202 and plays a protective role for the unmanned aerial vehicle 200. The airport cabin cover 203 is drivingly connected to the airport cover opening device 2023 for controlling the opening and closing of the airport cabin cover 203. For example, the airport cabin cover 203 comprises a first cover body 31 and a second cover body 32. When receiving the cover opening control instruction, the airport cover opening device 2023 controls the first cover body 31 and the second cover body 32 to relatively move to the farthest position, so that the airport cabin cover 203 is opened. In some embodiments, the airport cover opening device 2023 is controlled by means of a bar linkage structure or a linear moving mechanism. As shown in FIG. 32b, two active rods are disposed on both sides of the first cover body 31 and the second cover body 32, so that the movement of the first cover body 31 and the second cover body 32 is more stable and reliable. When receiving the cover opening control instruction, the airport cover opening device 2023 controls both the active rods on the side of the first cover body 31 and the active rods on the side of the second cover body 32 to move outward, so that the first cover body 31 and the second cover 32 move away from each other, thereby opening the airport cabin cover 203.

On the basis of above technical solution, as shown in FIG. 32a, this system also comprises: an unmanned aerial vehicle guiding device 2024 connected to airport control device 2020, the unmanned aerial vehicle guiding device 2024 is configured to, when receiving a correction unlock instruction sent by the airport control device 2020, release a fixing module for fixing the unmanned aerial vehicle 200 in the unmanned aerial vehicle guiding device 2024. The correction unlock instruction is sent when the airport control device 2020 receives the unmanned aerial vehicle tour inspection instruction sent by the airport monitor device 2010, or receives the takeoff request message sent by the unmanned aerial vehicle control device 2030.

The unmanned aerial vehicle guiding device 2024 uses the internal fixing module to fix the unmanned aerial vehicle, so that the unmanned aerial vehicle 200 is in a corrected state. When the unmanned aerial vehicle prepares to take off, the fixing module for fixing the unmanned aerial vehicle 200 needs to be unlocked, so that the unmanned aerial vehicle 200 takes off normally from the unmanned aerial vehicle airport.

In some embodiments, when the airport control device 2020 receives the unmanned aerial vehicle tour inspection instruction sent by the airport monitor device 2010, or receives the takeoff request message sent by the unmanned aerial vehicle control device 2010, that is, before takeoff of the unmanned aerial vehicle, the correction unlock instruction is sent to the unmanned aerial vehicle guiding device 2024, so that the fixing module for fixing the unmanned aerial vehicle 200 is unlocked, and the unmanned aerial vehicle 200 takes off normally from the airport.

Figure 32C:
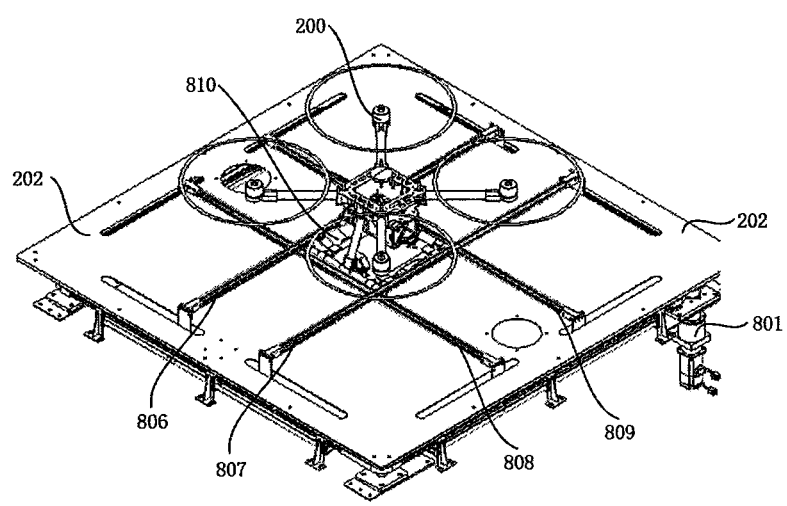
FIG. 32c is a schematic structural diagram of an unmanned aerial vehicle guiding device according to some embodiments of the present disclosure.

In some embodiments, FIG. 32c provides a schematic structural diagram of an unmanned aerial vehicle guiding device. The unmanned aerial vehicle guiding device 2024 is disposed on the top of the parking apron 202 of the unmanned aerial vehicle airport, so that the unmanned aerial vehicle 200 is corrected after parking, and the unmanned aerial vehicle 200 is neatly stacked in a set direction. As shown in FIG. 32c, the unmanned aerial vehicle guiding device 2024 pushes the unmanned aerial vehicle 200 to move to a set position through the linear movement of respective correcting rods. As shown in FIG. 32c, the unmanned aerial vehicle guiding device 2024 comprises the plurality of correcting rods installed on the parking apron 202. The unmanned aerial vehicle 200 is clamped through linearly moving the plurality of correcting rods, so that the unmanned aerial vehicle 200 is landed at the set position of the parking apron 202.

Specifically, as shown in FIG. 32c, the fixing module used for the unmanned aerial vehicle 200 in the unmanned aerial vehicle guiding device 2024 is four correcting rods, which are respectively a first correcting rod 806, a second correcting rod 807, a third correcting rod 808 and a fourth correcting rod 809 in FIG. 32c. The four correcting rods are parallel in pairs and form a rectangular frame. The four correcting rods move toward each other at the same time, so that the side length of the rectangular frame is shortened to a size of clamping the unmanned aerial vehicle 200, and the unmanned aerial vehicle 200 located in the rectangular frame will be moved by the correcting rods subsequently. The four correcting rods move opposite to each other at the same time, so that the side length of the rectangular frame is lengthened to the size of unlocking the unmanned aerial vehicle 200, then the unmanned aerial vehicle 200 located in the rectangular frame will be unlocked, and the unmanned aerial vehicle 200 will take off and fly away subsequently. In some embodiments, when receiving the correction unlock instruction sent by the airport control device 2020, the unmanned aerial vehicle guiding device 2024 controls the four correcting rods to move opposite to each other at the same time, to unlock the clamped unmanned aerial vehicle 200, thereby unlocking the fixing module for fixing the unmanned aerial vehicle 200 in the unmanned aerial vehicle guiding device 2024.

In some embodiments, the airport control device 2020 is further configured to: when receiving the takeoff request message sent by the unmanned aerial vehicle control device 2030, detect whether the airport cabin cover 203 of the unmanned aerial vehicle is opened, and whether the fixing module for fixing the unmanned aerial vehicle 200 in the aircraft guiding device 2024 is unlocked; if the airport cabin cover 203 is opened and the fixing module is unlocked, a takeoff instruction is sent to the unmanned aerial vehicle control device 2030 to enable the unmanned aerial vehicle 200 take off normally from the unmanned aerial vehicle airport.

On the basis of above technical solution, the unmanned aerial vehicle control device 2030 is configured to: based on a preset self-check program, perform self-check on each sensor in the unmanned aerial vehicle 200; if there is no self-check problem, the currently received number of positioning satellites is obtained, and when the currently received number of positioning satellites is greater than a preset number, it is determined that the unmanned aerial vehicle 200 meets the preset takeoff condition.

In some embodiments, the currently received number of positioning satellites refers to the number of positioning satellites currently detected by the unmanned aerial vehicle 200, and when the number is greater than the preset number, accurate positioning of the unmanned aerial vehicle 200 during the tour inspection process is realized, which facilitates automatic tour inspection.

In some embodiments, as shown in FIG. 32a, the system further comprises: a satellite positioning device 2032 connected to the unmanned aerial vehicle control device 2030. The satellite positioning device 2032 is configured to: when receiving a satellite number detection instruction sent by the unmanned aerial vehicle control device 2030, perform satellite positioning detection, obtain the currently received number of positioning satellites, and send the currently received number of positioning satellites to the unmanned aerial vehicle control device 2030, so that the unmanned aerial vehicle control device 2030 obtains the currently received number of positioning satellites in real time. The satellite number detection instruction is sent by the unmanned aerial vehicle control device 2030 when no self-checking problem is detected. In some embodiments, the satellite positioning device 2032 is a device for satellite positioning measurement set by a real-time kinematic (RTK) technology.

On the basis of the above technical solution, as shown in FIG. 32a, the system further comprises: a camera device 2034, an image transmission device 2035 connected to the camera device 2034, and a ground-side image receiving device 2025; wherein the camera device 2034 is configured to collect a tour inspection image and send the tour inspection image to the image transmission device 2035; the image transmission device 2035 is configured to send the received tour inspection image to the ground-side image receiving device 2025; the ground-side image receiving device 2025 is configured to store the received tour inspection image.

Specific installation positions of the camera device 2034 and the image transmission device 2035 in the unmanned aerial vehicle are determined based on business requirements. The ground-side image receiving device 2025 is installed in the unmanned aerial vehicle airport, or installed outside the unmanned aerial vehicle airport. In some embodiments, the specific installation positions of the camera device 2034, the image transmission device 2035 and the ground-side image receiving device 2025 are not limited.

In some embodiments, the camera device 2034 is connected to the unmanned aerial vehicle control device 2030, so as to collect the tour inspection image when receiving a collection instruction from the unmanned aerial vehicle control device 2030. In some embodiments, the camera device 2034 is not connected to the unmanned aerial vehicle control device 2030, so that the tour inspection image is collected in real time after the camera device 2034 is powered on. After collecting the tour inspection image, the camera device 2034 sends the tour inspection image to the ground-side image receiving device 2025 through the image transmission device 2035. The ground-side image receiving device 2025 sends the received tour inspection image to a cloud side for storage, or sends to the airport monitor device 2010 for storage, so that the airport monitor device 2010 displays the tour inspection image in real time on the display interface to realize visualization of the tour inspection.

On the basis of the above technical solution, the airport control device 2020 is configured to: when detecting that the unmanned aerial vehicle is landed after the tour inspection, send a signal connection control instruction to the contact control device 2021, so that the contact control device 2021 moves based on the signal connection control instruction, to signal connect the airport control device 2020 and the battery device 2031; and a power-off instruction is sent to the battery device 2031 to stop the battery device 2031 from supplying power to the unmanned aerial vehicle control device 2030.

In some embodiments, when the unmanned aerial vehicle is landed on a takeoff and landing platform of the unmanned aerial vehicle airport after the tour inspection based on the preset tour inspection route is completed, the airport control device 2020 sends the signal connection control instruction to the contact control device 2021 when detecting that the unmanned aerial vehicle 200 is landed on the takeoff and landing platform, to enable the contact control device 2021 and the battery device 2031 to be in contact, thereby communicating the airport control device 2020 and the battery device 2031. The airport control device 2020 stops the battery device 2031 from supplying power to the unmanned aerial vehicle control device 2030 by means of sending the power-off instruction to the battery device 2031, and also stops the battery device 2031 from supplying power to other power supply apparatuses in the unmanned aerial vehicle 200, so that the unmanned aerial vehicle 200 is in a power-off state.

On the basis of the above technical solution, the system also comprises a charge device 2026 connected to the airport control device 2020, and the charge device 2026 is configured to charge the unmanned aerial vehicle. Correspondingly, the airport control device 2020 is configured to: send a second electric quantity information acquisition request to the battery device 2031 to obtain second electric quantity information of the unmanned aerial vehicle 200 collected by the battery device 2031;

when detecting an electric quantity value in the second electric quantity information is less than a second preset electric quantity value, the charge device 2026 is controlled to charge the unmanned aerial vehicle 200, and the charging is completed until the electric quantity value of the unmanned aerial vehicle 200 is equal to a third preset electric quantity value. After the charging is completed, the disconnection control instruction is sent to the contact control device 2021 to disconnect the signal connection between the airport control device 2020 and the battery device 2031.

The second electric quantity information is electric quantity information after the unmanned aerial vehicle completes the tour inspection, or is collected by the battery device 2031. When the airport control device 2020 detects that the electric quantity value of the second electric quantity information is less than the second preset electric quantity value, it indicates that the unmanned aerial vehicle 200 needs to be charged for subsequent tour inspection tasks, and at this time, the charge device 2026 and the battery device 2031 are controlled to be in contact, so that the charge device 2026 charges the unmanned aerial vehicle 200. When the electric quantity value of the unmanned aerial vehicle 200 is equal to the third preset electric quantity value, the charge device 2026 is controlled to complete charging. When the charging is completed, the disconnection control instruction is sent to the contact control device 2021 to disconnect the signal connection between the airport control device 2020 and the battery device 2031. In some embodiments, the charge device 2026 is integrated into the contact control device 2021, so that when charging is required, in some other embodiments, the contact control device 2021 integrated with the charge device 2026 is directly controlled for charging to simplify the tour inspection operation.

It should be noted that, after the airport control device 2020 sends the power-off instruction to the battery device 2031, the entire unmanned aerial vehicle 200 is in a power-off state, and the airport control device 2020 controls the charge device 2026 to charge the unmanned aerial vehicle 200 at this time, so that there is no electromagnetic interference during the charging process, which further ensures the reliability of the unmanned aerial vehicle 200.

Figure 32D:
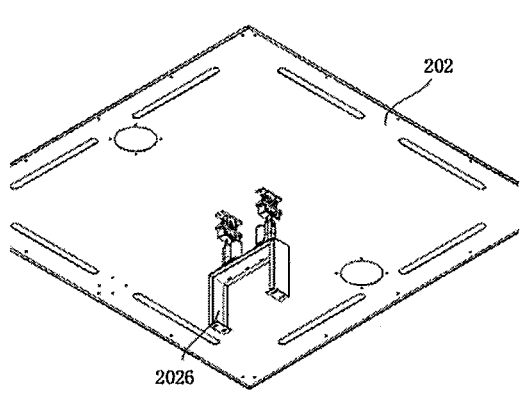
FIG. 32d is a schematic structural diagram of a charge device according to some embodiments of the present disclosure.
Figure 32E:
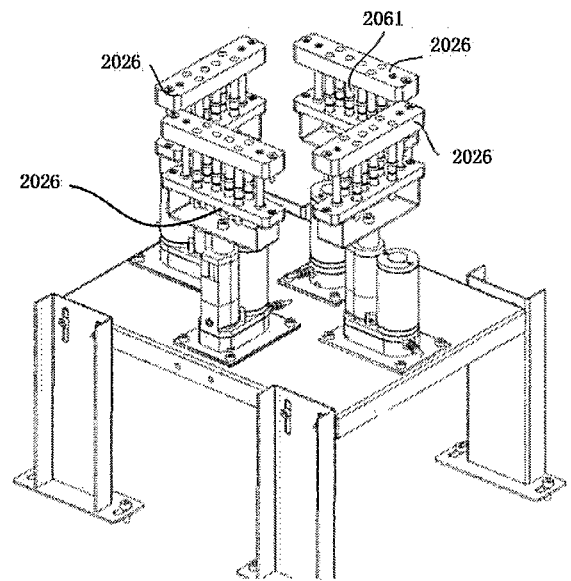
FIG. 32e is a schematic three-dimensional structural diagram of four charge devices defining a rectangle in an unmanned aerial vehicle airport according to some embodiments of the present disclosure.
Figure 32F:
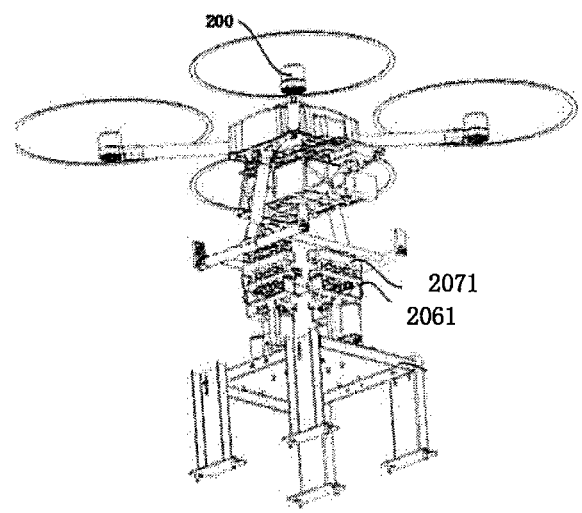
FIG. 32f is a schematic structural diagram of an unmanned aerial vehicle in a charging state according to some embodiments of the present disclosure.

In some embodiments, FIG. 32d shows a schematic structural diagram of a charge device 2026; FIG. 32e shows a schematic three-dimensional structural diagram of four charge devices 2026 defining a rectangle in the unmanned aerial vehicle airport. Referring to FIGS. 32d and 32e, the charge device 2026 is installed on the parking apron 202 and comprises a first electrode 2061. Accordingly, as shown in FIG. 32f, the battery device 2031 comprises a second electrode 2071, so that the first electrode 2061 and the second electrode 2071 are matched in a rechargeable manner. For example, there are one or more first electrodes 2061 and second electrodes 2071, metal contacts of the first electrode 2061 and the second electrode 2071 are in contact with each other for conduction and charging; and the metal contacts of the two are separated for no charging. Both the first electrodes 2061 and the second electrodes 2071 are arranged in an array or configuration. As shown in FIG. 32e, the charge device 2026 is configured to define a symmetrical rectangular shape, so that the charging is realized no matter which direction a nose of the unmanned aerial vehicle 200 faces. That is to say, after the unmanned aerial vehicle 200 is landed, no matter what the heading of the unmanned aerial vehicle 200 is, as long as the unmanned aerial vehicle 200 is correctly corrected, it is ensured that the second electrode 2071 in the battery device 2031 of the unmanned aerial vehicle is mated with the first electrode 2061 in one of the charge devices 2026, thereby ensuring the accuracy of charging.

In some embodiments, when detecting that the electric quantity value in the second electric quantity information is less than the second preset electric quantity value, the airport control device 2020 controls the charge device 2026 to move to the battery device 2031, so that the first electrode 2061 in the charge device 2026 is in contact with the second electrode 2071 in the battery device 2031 in the unmanned aerial vehicle, and the metal contacts of the two are in contact with each other to charge the unmanned aerial vehicle. When the electric quantity value of the unmanned aerial vehicle is equal to the third preset electric quantity value, the airport control device 2020 controls the charge device 2026 to move away from the battery device 2031, to disconnect the contact between the first electrode 2061 in the charge device 2026 and the second electrode 2071 in the battery device 2031 in the unmanned aerial vehicle, thereby completing charging the unmanned aerial vehicle 200.

In some embodiments, the airport control device 2020, before sending the signal connection control instruction to the contact control device 2021, also sends a correction instruction to the unmanned aerial vehicle guiding device 2024, so that the unmanned aerial vehicle guiding device 2024 adopts the fixing module to fix the unmanned aerial vehicle 200 when receiving the correction instruction, and corrects the unmanned aerial vehicle 200, the contact control device 2021 is moved to the position of the battery device 2031, and the contact between the contact control device 2021 and the battery device 2031 is realized.

In some embodiments, as shown in FIG. 32c, when receiving the correction instruction sent by the airport control device 2020, the unmanned aerial vehicle guiding device 2024 controls the four correcting rods to move toward each other at the same time, so that the side length of the rectangular frame is shortened to a size of clamping the unmanned aerial vehicle 200, thereby enabling the unmanned aerial vehicle 200 to be in place.

In some embodiments, the airport control device 2020 sends a cover closing control instruction to the airport cover opening device 2023 after detecting that the unmanned aerial vehicle is landed after tour inspection, so that the airport cover opening device 2023 closes the opened airport cabin cover 203 when receiving the cover closing control instruction. Therefore, after the tour inspection is completed, the airport cabin cover 203 is automatically closed, so that the entire tour inspection process is completed automatically without manual control, and the reliability of the unmanned aerial vehicle 200 is ensured.

For example, as shown in FIG. 32b, when receiving the cover closing control instruction, the airport cover opening device 2023 controls the active rods on the side of the first cover body 31 and the active rods on the side of the second cover body 32 to move toward each other to the positions of being in contact with each other, so that the first cover body 31 and the second cover body 32 move relative to each other, thereby closing the airport cabin cover 203 to protect the unmanned aerial vehicle 200 and prevent the unmanned aerial vehicle 200 from the damage and pollution of external rainwater, impurities, etc.

Figure 33:
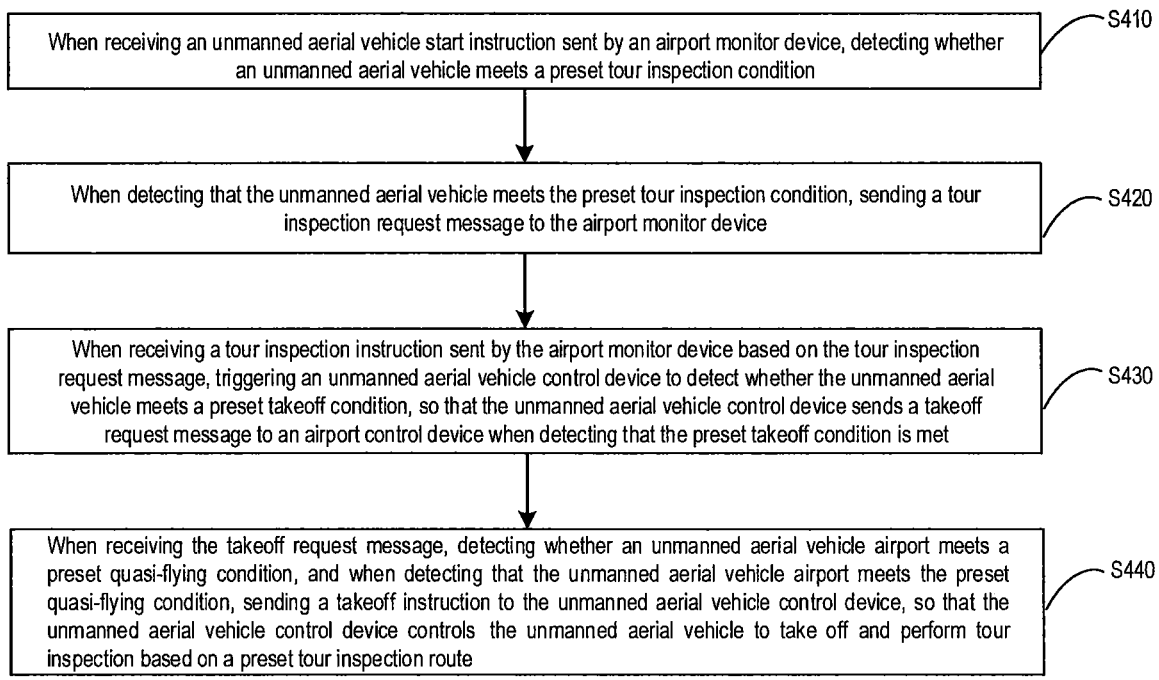
FIG. 33 is a flowchart of a tour inspection method according to some other embodiments of the present disclosure.

FIG. 33 is a flowchart of a tour inspection method according to some other embodiments of the present disclosure, and these embodiments are applicable to the situation of controlling the unmanned aerial vehicle 200 in the unmanned aerial vehicle airport to perform automatic tour inspection. The method is executed by the airport control device in the above embodiment, and the device is implemented by means of software and/or hardware, and is integrated into an apparatus with a data processing function. The explanations of the terms that are the same as or correspond to the above embodiments are not repeated here.

As shown in FIG. 33, the tour inspection method according to these embodiments specifically comprises the following steps:

S410, when receiving an unmanned aerial vehicle start instruction sent by an airport monitor device, whether an unmanned aerial vehicle meets a preset tour inspection condition is detected.

In some embodiments, S410 comprises: when receiving the unmanned aerial vehicle start instruction sent by the airport monitor device, obtaining first electric quantity information of the unmanned aerial vehicle and current weather information; and according to the first electric quantity information and the current weather information, detecting whether the unmanned aerial vehicle meets the preset tour inspection condition.

The first electric quantity information is obtained through a battery device of the unmanned aerial vehicle 200. For example, when receiving the unmanned aerial vehicle start instruction sent by the airport monitor device 2010, the airport control device 2030 sends a first electric quantity information acquisition request to the battery device 2031, so that the battery device collects the first electric quantity information of the unmanned aerial vehicle 200, and returns the first electric quantity information, and the airport control device 2030 obtains the first electric quantity information of the unmanned aerial vehicle 200. The current weather information is obtained through a weather monitor device 2022. For example, when receiving the unmanned aerial vehicle start instruction sent by the airport monitor device 2010, the airport control device 2030 sends a current weather information acquisition request to the weather monitor device 2022, so that the weather monitor device 2022 obtains the current weather information and returns the current weather information, and the airport control device 2030 obtains the current weather information.

In some embodiments, the current weather information comprises, but not limited to, a current wind speed and a current rainfall. Correspondingly, according to the first electric quantity information and the current weather information, detecting whether the unmanned aerial vehicle 200 meets the preset tour inspection condition comprises: when detecting that an electric quantity value in the first electric quantity information is greater than a first preset electric quantity value, the current wind speed is less than a preset wind speed and the current rainfall is zero, determining that the unmanned aerial vehicle 200 meets the preset tour inspection condition.

S420, when detecting that the unmanned aerial vehicle meets the preset tour inspection condition, a tour inspection request message is sent to the airport monitor device 2010.

S430, when receiving a tour inspection instruction sent by the airport monitor device 2010 based on the tour inspection request message, the unmanned aerial vehicle control device 2020 is triggered to detect whether the unmanned aerial vehicle 200 meets the preset takeoff condition, so that the unmanned aerial vehicle control device 2020 sends a takeoff request message to the airport control device 2020 when detecting that the preset takeoff condition is met.

In some embodiments, when receiving the tour inspection instruction sent by the airport monitor device 2010 based on the tour inspection request message, triggering the unmanned aerial vehicle control device 2030 to detect whether the unmanned aerial vehicle 200 meets the preset takeoff condition comprises:

When receiving the tour inspection instruction sent by the airport monitor device 2010 based on the tour inspection request message, a signal connection control instruction is sent to the contact control device 2021, so that the contact control device 2021 moves based on the signal connection control instruction, to signal connect the airport control device 2030 and the battery device 2031; a power-on instruction is sent to the battery device 2031, so that the battery device 2031 supplies power to the unmanned aerial vehicle control device 2030, and the unmanned aerial vehicle control device 2030 is triggered to detect whether the unmanned aerial vehicle 00 meets the preset takeoff condition.

It should be noted that, if whether the unmanned aerial vehicle 200 meets the preset tour inspection condition is detected based on the first electric quantity information, then when receiving the unmanned aerial vehicle start instruction sent by the airport monitor device 2010, the signal connection control instruction is sent to the contact control device 2021, so that the contact control device 2021 moves based on the signal connection control instruction, to signal connect the airport control device 2020 and the battery device 2031, and the airport control device 2020 obtains the first electric quantity information through the battery device 2031. Correspondingly, when receiving the tour inspection instruction sent by the airport monitor device 2010 based on the tour inspection request message, since the airport control device 2020 has established signal connection with the battery device 2031, the power-on instruction is directly sent to the battery device 2031, so that the battery device 2031 supplies electric quantity to the unmanned aerial vehicle control device 2030, and the unmanned aerial vehicle control device 2030 is triggered to detect whether the unmanned aerial vehicle meets the preset takeoff condition.

In some embodiments, after sending the power-on instruction to the battery device 2031, the method further comprises: sending a disconnection control instruction to the contact control device 2021, so that the contact control device 2021 moves based on the disconnection control instruction, and disconnects the signal connection between the airport control device 2030 and the battery device 2031.

S440, when receiving the takeoff request message, whether the unmanned aerial vehicle airport meets a preset quasi-flying condition is detected, and when detecting that the unmanned aerial vehicle airport meets the preset quasi-flying condition, a takeoff instruction is sent to the unmanned aerial vehicle control device 2030, so that the unmanned aerial vehicle control device 2030 controls the unmanned aerial vehicle to take off and perform tour inspection based on a preset tour inspection route.

In the technical solutions of these embodiments, the airport control device 2030, when receiving the unmanned aerial vehicle start instruction sent by the airport monitor device 2010, detects whether the unmanned aerial vehicle meets the preset tour inspection condition, and when detecting the unmanned aerial vehicle meets the preset tour inspection condition, sends the tour inspection request message to the airport monitor device 2010; when receiving the tour inspection instruction sent by the airport monitor device 2010 based on the tour inspection request message, the unmanned aerial vehicle control device 2030 is triggered to detect whether the unmanned aerial vehicle meets the preset takeoff condition. When receiving the takeoff request message sent by the airport control device 2030, whether the unmanned aerial vehicle airport meets the preset quasi-flying condition is detected, and when detecting that the unmanned aerial vehicle airport meets the preset quasi-flying condition, the takeoff instruction is sent to the unmanned aerial vehicle control device 2030, so that the unmanned aerial vehicle control device 2030 controls the unmanned aerial vehicle to take off and perform tour inspection based on the preset tour inspection route. There is no need to manually control the unmanned aerial vehicle 200 during the entire tour inspection process, thereby realizing the automatic tour inspection of the unmanned aerial vehicle 200, saving labor costs and improving reliability.

On the basis of above technical solution, when receiving the unmanned aerial vehicle tour inspection instruction sent by the airport monitor device 2010, or when receiving the takeoff request message sent by unmanned aerial vehicle control device 2030, the method also comprises: sending a cover opening control instruction to the airport cover opening device 2023, so that the airport cover opening device 2023 opens the airport cabin cover 203 of the unmanned aerial vehicle airport.

On the basis of above technical solution, when receiving the unmanned aerial vehicle tour inspection instruction sent by the airport monitor device 2010, or when receiving the takeoff request message sent by unmanned aerial vehicle control device 2030, the method also comprises: sending a correction unlock instruction to the unmanned aerial vehicle guiding device 2024, so that the unmanned aerial vehicle guiding device 2024 unlocks a fixing module for fixing the unmanned aerial vehicle 200 in the unmanned aerial vehicle guiding device 2024.

In some embodiments, when receiving the takeoff request message in S440, detecting whether the unmanned aerial vehicle airport meets the preset quasi-flying condition comprises: when receiving the takeoff request message sent by the unmanned aerial vehicle control device 2030, detecting whether the airport cabin cover 203 of the unmanned aerial vehicle 200 is opened, and whether the fixing module for fixing the unmanned aerial vehicle 200 in the unmanned aerial vehicle guiding device 2024 is unlocked; if the airport cabin cover 203 is opened, and the fixing module is unlocked, determining that the unmanned aerial vehicle airport meets the preset quasi-flying condition.

On the basis of the above technical solution, when detecting that unmanned aerial vehicle is landed after the tour inspection, the signal connection control instruction is sent to the contact control device 2021, so that the contact control device 2021 moves based on the signal connection control instruction, to signal connect the airport control device 2030 and the battery device 2031; the power-off instruction is sent to the battery device 2031 to stop the battery device 2031 from supplying electric quantity to the unmanned aerial vehicle control device 2030.

In some embodiments, after sending the power-off instruction to the battery device 2031, the method also comprises: sending a second electric quantity information acquisition request to the battery device 2031 to obtain second electric quantity information of the unmanned aerial vehicle collected by the battery device 2031; when detecting that an electric quantity value in the second electric quantity information is less than a second preset electric quantity value, controlling the charge device to charge the unmanned aerial vehicle, and completing the charging until the electric quantity value of the unmanned aerial vehicle is equal to a third preset electric quantity value; after the charging is completed, sending the disconnection control instruction to the contact control device 2021 to disconnect the signal connection between the airport control device 2030 and the battery device 2031.

It should be noted that, after the airport control device 2030 sends the power-off instruction to the battery device 2031, the entire unmanned aerial vehicle is in a power-off state, and the airport control device 2030 controls the charge device to charge the unmanned aerial vehicle 200 at this time, so that there is no electromagnetic interference during the charging process, which further ensures the reliability of the unmanned aerial vehicle 200.

In some embodiments, the airport control device 2030, before sending the signal connection control instruction to the contact control device 2021, also sends the correction instruction to the unmanned aerial vehicle guiding device, so that the unmanned aerial vehicle guiding device 2024 fixes the unmanned aerial vehicle 200 with the fixing module when receiving the correction instruction, and corrects the unmanned aerial vehicle 200, so as to move the contact control device 2021 to the position of the battery device 2031, and realize the contact between the contact control device 2021 and the battery device 2031.

In some embodiments, when the airport control device 2030 sends a cover closing control instruction to the airport cover opening device after detecting that the unmanned aerial vehicle is landed after tour inspection, the airport cover opening device 2023 closes the opened airport cabin cover 203 when receiving the cover closing control instruction. Therefore, after the tour inspection is completed, the airport cabin cover 203 is automatically closed, so that the entire tour inspection process is automatically completed without manual control, and the reliability of the unmanned aerial vehicle 200 is guaranteed.

Figure 34:
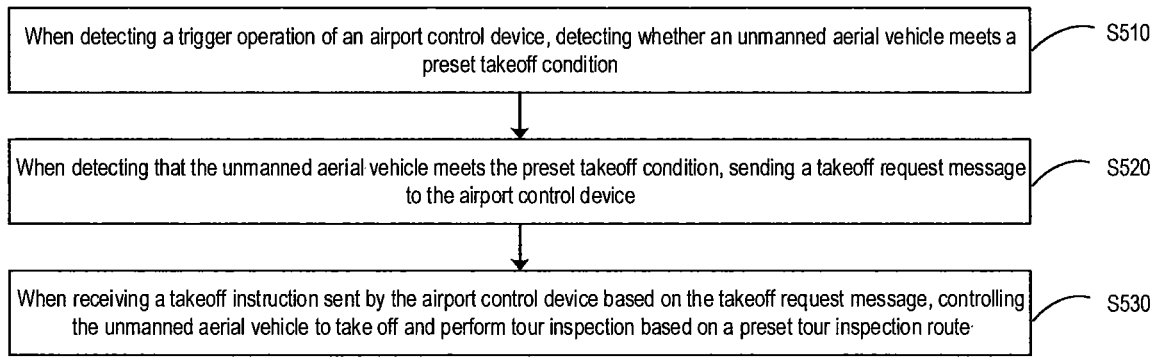
FIG. 34 is a flowchart of a tour inspection method according to some more embodiments of the present disclosure.

FIG. 34 is a flowchart of a tour inspection method according to some more embodiments of the present disclosure, and these embodiments are applicable to the situation of controlling the unmanned aerial vehicle in the unmanned aerial vehicle airport to perform automatic tour inspection. The method is executed by the unmanned aerial vehicle control device 2030 in some above embodiments, and the device is implemented by means of software and/or hardware, and is integrated into an apparatus with a data processing function. The explanations of terms that are the same as or correspond to some above embodiments are not repeated here.

As shown in FIG. 34, the tour inspection method according to these embodiments specifically comprises the following steps:

S510, when detecting a trigger operation of the airport control device 2030, whether the unmanned aerial vehicle meets a preset takeoff condition is detected.

In some embodiments, S510 comprises: when detecting the trigger operation of the airport control device 2030, based on a preset self-check program, performing self-check on each sensor in the unmanned aerial vehicle; if there is no self-check problem, obtaining the currently received number of positioning satellites, and when the currently received number of positioning satellites is greater than a preset number, determining that the unmanned aerial vehicle meets the preset takeoff condition.

The currently received number of positioning satellites is obtained by a satellite positioning device. For example, when detecting that there is no self-checking problem, a satellite number detection instruction is sent to the satellite positioning device, so that the satellite positioning device performs satellite positioning detection based on the satellite number detection instruction, and returns the obtained currently received number of positioning satellites, and the unmanned aerial vehicle control device 2030 obtains the currently received number of positioning satellites in real time.

S520, when detecting that the unmanned aerial vehicle meets the preset takeoff condition, a takeoff request message is sent to the airport control device 2030.

S530, when receiving a takeoff instruction sent by the airport control device 2030 based on the takeoff request message, the unmanned aerial vehicle is controlled to take off and perform tour inspection based on a preset tour inspection route.

In the technical solutions of these embodiments, the unmanned aerial vehicle control device 2030 detects whether the unmanned aerial vehicle meets the preset takeoff condition when detecting the trigger operation of the airport control device 2030, and if yes, sends the takeoff request message to the airport control device 2030;

when receiving the takeoff instruction sent by the airport control device 2030 based on the takeoff request message, the unmanned aerial vehicle is controlled to take off and perform tour inspection based on the preset tour inspection route, so that there is no need to manually control the unmanned aerial vehicle during the entire tour inspection process, thereby realizing the automatic tour inspection of the unmanned aerial vehicle, saving labor costs and improving reliability.

Figure 35:
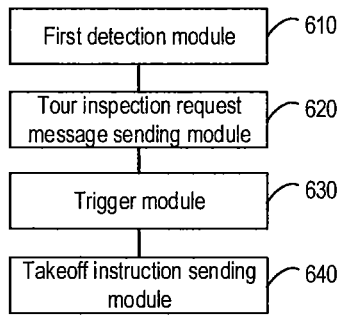
FIG. 35 is a schematic structural diagram of an airport control device according to some further embodiments of the present disclosure.

FIG. 35 is a schematic structural diagram of an airport control device 2030 according to some further embodiments of the present disclosure, these embodiments are applied to the situation of controlling the unmanned aerial vehicle in an unmanned aerial vehicle airport to perform automatic tour inspection, the device specifically comprises: a first detection module 610, a tour inspection request message sending module 620, a Trigger module 630 and a takeoff instruction sending module 640.

The first detection module 610 is configured to detect whether the unmanned aerial vehicle meets a preset tour inspection condition when receiving an unmanned aerial vehicle start instruction sent by an airport monitor device 2010. The tour inspection request message sending module 620 is configured to send a tour inspection request message to the airport monitor device 2010 when detecting that the unmanned aerial vehicle meets the preset tour inspection condition. The Trigger module 630 is configured to trigger the unmanned aerial vehicle control device 2030 to detect whether the unmanned aerial vehicle meets a preset takeoff condition when receiving the tour inspection instruction sent by the airport monitor device 2010 based on the tour inspection request message, so that the unmanned aerial vehicle control device 2030 sends a takeoff request message to the airport control device 2030 when detecting that the preset takeoff condition is met. The takeoff instruction sending module 640 is configured to detect whether the unmanned aerial vehicle airport meets a preset quasi-flying condition when receiving the takeoff request message, and send a takeoff instruction to the airport control device 2030 when detecting that the unmanned aerial vehicle airport meets the preset quasi-flying condition, so that the unmanned aerial vehicle control device 2030 controls the unmanned aerial vehicle to take off and perform tour inspection based on a preset tour inspection route.

In some embodiments, the first detection module 610 comprises:

an information acquisition unit configured to, when receiving the unmanned aerial vehicle start instruction sent by the airport monitor device 2010, obtain first electric quantity information of the unmanned aerial vehicle and current weather information; and a first detection unit configured to detect whether the unmanned aerial vehicle 200 meets the preset tour inspection condition according to the first electric quantity information and the current weather information.

In some embodiments, the information acquisition unit comprises: a first electric quantity information acquisition subunit configured to, when receiving the unmanned aerial vehicle start instruction sent by the airport monitor device 2010, send a first electric quantity information acquisition request to the battery device 2031, so that the battery device 2031 collects the first electric quantity information of the unmanned aerial vehicle, and returns the first electric quantity information.

In some embodiments, the information acquisition unit also comprises: a current weather information acquisition subunit configured to, when receiving the unmanned aerial vehicle start instruction sent by the airport monitor device 2010, send a current weather information acquisition request to the weather monitor device 2022, so that the weather monitor device 2022 obtains the current weather information and returns the current weather information.

In some embodiments, the first detection unit is configured to: when detecting that an electric quantity value in the first electric quantity information is greater than a first preset electric quantity value, the current wind speed is less than a preset wind speed and the current rainfall is zero, determine that the unmanned aerial vehicle meets the preset tour inspection condition.

In some embodiments, the trigger module 630 is configured to: when receiving the tour inspection instruction sent by the airport monitor device 2010 based on the tour inspection request message, send a signal connection control instruction to the contact control device 2021, so that the contact control device 2021 moves based on the signal connection control instruction, and signal connects the airport control device 2030 and the battery device 2031; send a power-on instruction to the battery device 2031, so that the battery device 2031 supplies electric quantity to the unmanned aerial vehicle control device 2030, and the unmanned aerial vehicle control device 2030 is triggered to detect whether the unmanned aerial vehicle meets the preset takeoff condition.

In some embodiments, the device further comprises a disconnection control instruction sending module, and the disconnection control instruction sending module is configured to, after sending the power-on instruction to the battery device 2031, send a disconnection control instruction to the contact control device 2021, so that the contact control device 2021 moves based on the disconnection control instruction, to disconnect the signal connection between the airport control device 2030 and the battery device 2031.

In some embodiments, the device also comprises a cover opening control instruction sending module, and the cover opening control instruction sending module is configured to, when receiving the unmanned aerial vehicle tour inspection instruction sent by the airport monitor device 2010, or receiving the takeoff request message sent by the unmanned aerial vehicle control device 2030, send a cover opening control instruction to an airport cover opening device, so that the airport cover opening device opens an airport cabin cover of the unmanned aerial vehicle airport.

In some embodiments, this device also comprises a correction unlock instruction sending module, and the correction unlock instruction sending module is configured to, when receiving the unmanned aerial vehicle tour inspection instruction sent by the airport monitor device 2010, or receiving the takeoff request message sent by the unmanned aerial vehicle control device 2030, send a correction unlock instruction to an unmanned aerial vehicle guiding device, so that the unmanned aerial vehicle guiding device unlocks a fixing module for fixing the unmanned aerial vehicle in the unmanned aerial vehicle guiding device.

In some embodiments, the takeoff instruction sending module 640 is configured to: when receiving the takeoff request message sent by the unmanned aerial vehicle control device 2030, detect whether the airport cabin cover of the unmanned aerial vehicle is opened, and whether the fixing module for fixing the unmanned aerial vehicle in the unmanned aerial vehicle guiding device is unlocked; if the airport cabin cover is opened and the fixing module is unlocked, determine that the unmanned aerial vehicle airport meets the preset quasi-flying condition.

In some embodiments, the device further comprises a signal connection control instruction sending module and a power-off instruction sending module. The signal connection control instruction sending module is configured to, when detecting that the unmanned aerial vehicle is landed after tour inspection, send the signal connection control instruction to the contact control device 2021, so that the contact control device 2021 moves based on the signal connection control instruction, to signal connect the airport control device 2030 and the battery device 2031. The power-off instruction sending module is configured to send a power-off instruction to the battery device 2031 to stop the battery device 2031 from supplying the electric quantity to the unmanned aerial vehicle control device 2030.

In some embodiments, the device further comprises a second electric quantity information acquisition module, a charge control module, and a disconnection control instruction sending module.

The second electric quantity information acquisition module is configured to, after sending the power-off instruction to the battery device 2031, send a second electric quantity information acquisition request to the battery device 2031 to obtain second electric quantity information of the unmanned aerial vehicle collected by the battery device 2031.

The charge control module is configured to, when detecting that an electric quantity value in the second electric quantity information is less than a second preset electric quantity value, control the charge device 2026 to charge the unmanned aerial vehicle 200, and complete charging until the electric quantity value of the unmanned aerial vehicle 200 is equal to a third preset electric quantity value.

The disconnection control instruction sending module is also configured to send the disconnection control instruction to the contact control device 2021 after the charging is completed, so as to disconnect the signal connection between the airport control device 2030 and the battery device 2031.

The airport control device 2030 according to some embodiments of the present disclosure executes the tour inspection methods according to some other embodiments of the present disclosure, and has corresponding functional modules and beneficial effects of executing the tour inspection methods.

Figure 36:
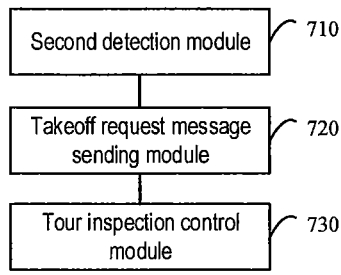
FIG. 36 is a schematic structural diagram of an unmanned aerial vehicle control device according to some more embodiments of the present disclosure.

FIG. 36 is a schematic structural diagram of an airport control device 2030 according to some more embodiments of the present disclosure, these embodiments are applicable to the situation of controlling the unmanned aerial vehicle in an unmanned aerial vehicle airport to perform automatic tour inspection, and this device specifically comprises a second detection module 710, a takeoff request message sending module 720 and a tour inspection control module 730.

The second detection module 710 is configured to detect whether the unmanned aerial vehicle meets a preset takeoff condition when detecting a trigger operation of the airport control device 2030; the takeoff request message sending module 720 is configured to send a takeoff request message to the airport control device 2030 when detecting that the unmanned aerial vehicle meets the preset takeoff condition; the tour inspection control module 730 is configured to control the unmanned aerial vehicle to take off and perform tour inspection based on a preset tour inspection route when receiving a takeoff instruction sent by the airport control device 2030 based on the takeoff request message.

In some embodiments, the second detection module 710 is configured to: when detecting the trigger operation of the airport control device 2030, perform self-check on each sensor in the unmanned aerial vehicle based on a preset self-check program; if there is no self-checking problem, obtain a currently received number of positioning satellites, and when the currently received number of positioning satellites is greater than a preset number, determine that the unmanned aerial vehicle meets the preset takeoff condition.

In some embodiments, the second detection module 710 comprises a positioning satellite number acquisition unit, and the positioning satellite number acquisition unit is configured to, when detecting that there is no self-checking problem, send a satellite number detection instruction to a satellite positioning device, so that the satellite positioning device performs satellite positioning detection based on the satellite number detection instruction, and returns the obtained currently received number of positioning satellites.

The unmanned aerial vehicle control device 2030 according to some embodiments of the present disclosure executes the tour inspection methods according to some more embodiments of the present disclosure, and has corresponding functional modules and beneficial effects of executing the tour inspection methods.

Figure 37:
FIG. 37 is a schematic structural diagram of an apparatus according to some further embodiments of the present disclosure.

FIG. 37 is a schematic structural diagram of an apparatus according to some further embodiments of the present disclosure. Referring to FIG. 37, the apparatus comprises one or more processors 810 and a memory 820. The memory 820 is configured to store one or more programs. The one or more programs, when executed by one or more processors 810, enable the one or more processors 810 to implement the tour inspection methods according to some other embodiments or implementation 3 of the present disclosure.

In FIG. 37, one processor 810 is taken as an example, and the processor 810 and the memory 820 in the apparatus are connected by a bus or in other ways. In FIG. 37, the connection by a bus is taken as an example.

The memory 820, as a computer-readable storage medium, is configured to store software programs, computer-executable programs, and modules, such as program instructions/modules corresponding to the tour inspection methods in some embodiments of the present disclosure. The processor 810 executes various functional applications and data processing of the apparatus by running the software programs, instructions, and modules stored in the memory 820, i.e., implements the tour inspection methods according to some other embodiments or implementation 3 of the present disclosure.

The memory 820 mainly comprises a stored program area and a stored data area, wherein the stored program area store an operating system, and an application program required by at least one function; the stored data area stores data and the like created according to the use of the apparatus. In addition, the memory 820 comprises a high-speed random access memory, and also comprises a non-volatile memory, such as at least one magnetic disk storage device, a flash memory device, or other non-volatile solid-state storage devices. In some examples, the memory 820 further comprises memories disposed remotely relative to the processor 810, and these remote memories are connected to the apparatus through a network. Examples of the above network comprise, but not limited to, the Internet, an intranet, a local area network, a mobile signal connection network, and combinations thereof.

The apparatus according to some embodiments of the present disclosure executes the tour inspection methods according to some other embodiments or implementation 3 of the present disclosure, and has the corresponding beneficial effects of executing the tour inspection methods.

Some more embodiments of the present disclosure provide a computer-readable storage medium on which a computer program is stored, and the program, when executed by a processor, implements the tour inspection methods according to some other embodiments of the present disclosure.

The computer storage medium according to some embodiments of the present disclosure adopts any combination of one or more computer-readable mediums. The computer-readable medium is a computer-readable signal medium or a computer-readable storage medium. The computer-readable storage medium is, but not limited to, electrical, magnetic, optical, electromagnetic, infrared, or semiconductor systems, apparatuses or devices, or any combinations of the above. More specific examples (non-exhaustive list) of the computer-readable storage medium comprise: electrical connections having one or more wires, portable computer disks, hard disks, random access memories (RAM), read only memories (ROM), erasable programmable read only memories (EPROM or flash memories), optical fiber, portable compact disk read only memories (CD-ROM), optical storage devices, magnetic storage devices, or any suitable combinations of the above. Herein, the computer-readable storage medium is any tangible medium that contains or stores a program for use by or in connection with an instruction execution system, apparatus, or device.

The computer-readable signal medium comprises data signals propagated in a baseband or as part of a carrier wave and carrying computer-readable program codes therein. Such propagated data signals take a variety of forms, comprising but not limited to electromagnetic signals, optical signals, or any suitable combinations of the above. The computer-readable signal medium is also any computer-readable medium, other than the computer-readable storage medium, that transmits, propagates, or transmits a program for use by or in connection with the instruction execution system, apparatus, or device.

The program code contained on the computer-readable medium is transmitted by any suitable medium, comprising, but not limited to, wireless, wire, optical cable, RF, etc., or any suitable combinations of the above.

The computer program code for executing operations of the present disclosure is written in one or more programming languages or combinations thereof, comprising object-oriented programming languages, such as Java, Smalltalk and C++, and conventional procedural programming languages, such as "C" language or similar programming languages. The program code is executed entirely on a user's computer, partly on the user's computer, as a stand-alone software package, partly on the user's computer and partly on a remote computer, or entirely on the remote computer or server.

In the case involving the remote computer, the remote computer is connected to the user's computer through any type of network, comprising a local area network (LAN) or a wide area network (WAN), or connected to an external computer (for example, connected through the Internet through an Internet service provider).

It should be understood by those of ordinary skill in the art that various modules or steps above of the present disclosure are implemented with a general-purpose computing device, and they are concentrated on a single computing device, or distributed on a network formed by a plurality of computing devices, and are implemented with the program codes executable by a computer device in some embodiments, so as to be stored in a storage device and executed by the computing device, or separately fabricated into various integrated circuit modules, or a plurality of modules or steps therein are fabricated as a single integrated circuit module for implementation. That is, the present disclosure is not limited to any specific combination of hardware and software.

The inventors also found in some embodiments that: with the continuous development of unmanned aerial vehicle technologies, unmanned aerial vehicles are widely used in aerial photography, agriculture, express transportation, disaster rescue, wildlife observation, infectious disease monitoring, surveying and mapping, news reporting, electric power tour inspection, disaster relief, film and television shooting and many other fields. In practical application scenarios, due to the limitation of battery technologies, a cruise continuing time of the unmanned aerial vehicle is very limited. In order to enable the unmanned aerial vehicle to cruise automatically for a long time, an automatic charge apparatus is usually disposed at a fixed position. When low in electric quantity, the unmanned aerial vehicle will return back to the automatic charge apparatus for charging, and continue the cruise after completing the charging, which extends the working time of the unmanned aerial vehicle. However, in the prior art, since the unmanned aerial vehicle needs to return back to the automatic charge apparatus for charging, the unmanned aerial vehicle only cruises within a range centered on the automatic charge apparatus, which limits a cruise range of the unmanned aerial vehicle. In order to solve the above technical defects, the following technical solutions are provided in some embodiments.

As an unmanned aircraft controlled by a radio remote control device and a self-provided program, the unmanned aerial vehicle is often used for cruising in a certain area to complete tour inspection work, and an image collection device of the unmanned aerial vehicle is configured to collect and store video data during the cruise. For the automatic cruising unmanned aerial vehicle, the automatic charge apparatus is usually disposed at a fixed position and reserves the electric quantity for the unmanned aerial vehicle to return when the electric quantity is insufficient, and the unmanned aerial vehicle returns back to the automatic charge apparatus for charging, and continues the cruise after completing the charging. Then, due to the limitation of a battery capacity and the limitation of a storage space of the unmanned aerial vehicle, the cruise range of the unmanned aerial vehicle is also limited. In actual usage scenarios, the unmanned aerial vehicle is often required to cruise at a longer distance. If the longer-distance cruise exceeds the farthest flying distance of the unmanned aerial vehicle supported by the electric quantity of the battery, the unmanned aerial vehicle does not return back to the automatic charge apparatus, then manual operation is required to complete the charging of the unmanned aerial vehicle and transfer the stored data, so as to meet the electric quantity required for continuing the cruise and the storage space required for continuing the cruise.

Figure 38:
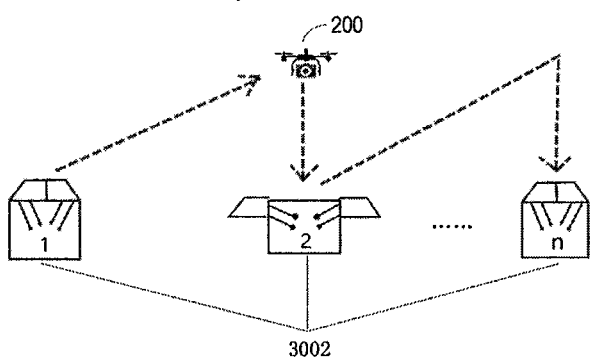
FIG. 38 is a schematic diagram of an unmanned aerial vehicle cruise system according to some embodiments of the present disclosure.

Referring to FIGS. 38 to 54, in some embodiments of the present disclosure, in order to expand the cruise range of automatic cruise of the unmanned aerial vehicle 200 without the need of manual charging, a plurality of cruise control apparatuses are disposed in a cruise route of the unmanned aerial vehicle, and the unmanned aerial vehicle is connected to each cruise control apparatus during the cruise, so that the cruise control apparatus provides the unmanned aerial vehicle with a cruise continuing operation, to assist the unmanned aerial vehicle to continuously complete the long-distance automatic cruise. FIG. 38 is a schematic diagram of an unmanned aerial vehicle cruise system according to some embodiments of the present disclosure. As shown in FIG. 38, the unmanned aerial vehicle cruise system 30100 comprises: the unmanned aerial vehicle 200 and a plurality of cruise control apparatuses 3002. The unmanned aerial vehicle 200 establishes a wired or wireless connection with the cruise control apparatus 3002, so that the cruise control apparatus 3002 performs cruise continuing operation on the unmanned aerial vehicle 200, such as charging the unmanned aerial vehicle, or storing the cruise video data sent by the unmanned aerial vehicle 200, and the unmanned aerial vehicle 200 exports the cruise video data stored per se, and sort out a storage space required for continuing the cruise. The unmanned aerial vehicle 200 needs to complete the cruise from the cruise control apparatus 3002 to the cruise control apparatus n with the assistance of the plurality of cruise control apparatuses 3002, n cruise control apparatuses are disposed in the entire cruise route, the unmanned aerial vehicle 200 takes off from the cruise control apparatus 1 and cruises to the cruise control apparatus 3002, then takes off from the cruise control apparatus 3002 and cruises to the cruise control apparatus 3, and so on until the unmanned aerial vehicle 200 cruises to the cruise control apparatus n at the end point.

An image collection device, such as a camera, is installed in the unmanned aerial vehicle 200, and is configured to collect cruise video data during the cruise.

In some embodiments, each cruise control apparatus 3002 is also called an unmanned aerial vehicle airport, at least comprising a takeoff and landing platform and a charge device, and a correcting mechanism is installed on the takeoff and landing platform for correcting and locking the landed unmanned aerial vehicle. The correcting mechanism is a retractable structure, which automatically retracts under the control of the cruise control apparatus to correct the unmanned aerial vehicle to a fixed position. In some embodiments, the takeoff and landing platform is disposed in a parking cabin, and a cabin cover is disposed above the cabin. When the unmanned aerial vehicle needs to land or is about to take off, the cruise control apparatus 3002 controls the cabin cover to be opened. When the unmanned aerial vehicle is landed inside the cabin, the cabin cover is controlled to be closed.

In some embodiments, the unmanned aerial vehicle cruise system 30100 further comprises a server (not shown in the figure), the server establishes a signal connection with each cruise control apparatus 3002, receives state information of the unmanned aerial vehicle sent by the cruise control apparatus 3002, such as one or more of the state of each sensor and a battery electric quantity, as well as cruise evaluation information, determines whether to control the unmanned aerial vehicle to continue the cruise according to the state information and/or cruise evaluation information of the unmanned aerial vehicle, and sends a confirmation result to the cruise control apparatus 3002 connected to the unmanned aerial vehicle 200, and the cruise control apparatus 3002 controls the unmanned aerial vehicle 200 to continue the cruise or temporarily stop the cruise according to the confirmation result. In some embodiments, the unmanned aerial vehicle cruise system 30100 does not comprise the server, and the cruise control apparatus 3002 determines whether to control the unmanned aerial vehicle 200 to continue the cruise according to the state information and cruise evaluation information of the unmanned aerial vehicle.

Figure 39:
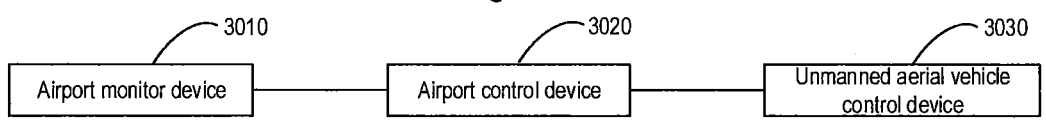
FIG. 39 is a schematic structural diagram of an unmanned aerial vehicle cruise system according to some embodiments of the present disclosure.

FIG. 39 is a schematic structural diagram of an unmanned aerial vehicle cruise system 30100 according to some embodiments of the present disclosure, and these embodiments are applied to the situation of controlling the unmanned aerial vehicle in an unmanned aerial vehicle airport to perform automatic cruise. As shown in FIG. 39, the unmanned aerial vehicle cruise system comprises: an airport monitor device 3010, an airport control device 3020 and an unmanned aerial vehicle control device 3030.

The airport control device 3020 is configured to: perform a cruise continuing operation on the unmanned aerial vehicle, and detect whether the unmanned aerial vehicle meets a preset cruise condition in real time, and when detecting that the unmanned aerial vehicle meets the preset cruise condition, send a cruise request message to the airport monitor device 3010; when receiving a cruise instruction sent by the airport monitor device 3010 based on the cruise request message, trigger the unmanned aerial vehicle control device 3030 to detect whether the unmanned aerial vehicle 200 meets a preset takeoff condition; the unmanned aerial vehicle control device 3030 is configured to: after receiving a cruise start instruction sent by the airport control device 3020 and when detecting that the unmanned aerial vehicle meets the preset takeoff condition, send a takeoff request message to the airport control device 3020, and control the unmanned aerial vehicle to take off and perform cruise based on a preset cruise route.

The airport monitor device 3010 is configured to monitor and control a cruise situation of the unmanned aerial vehicle airport. The airport monitor device 3010 is placed in the unmanned aerial vehicle airport or outside the unmanned aerial vehicle airport, and a specific position thereof is set based on business requirements. The airport control device 3020 is installed in the unmanned aerial vehicle airport and configured to control internal devices of the unmanned aerial vehicle airport. The unmanned aerial vehicle control device 3030 is installed in the unmanned aerial vehicle and configured to control internal devices of the unmanned aerial vehicle. These embodiments do not limit the specific installation positions of the airport monitor device 3010, the airport control device 3020 and the unmanned aerial vehicle control device 3030.

The airport monitor device 3010 connects and signal connects with the airport control device 3020 in advance for data transmission. For example, the airport monitor device 3010 signal connects wirelessly with the airport control device 3020 through a network. In some embodiments, the airport control device 3020 connects and signal connects with the unmanned aerial vehicle control device 3030 in advance. In some other embodiments, the connection and signal connection state with the unmanned aerial vehicle control device 3030 is indirectly controlled. For example, the airport control device 3020 establishes the signal connection with the unmanned aerial vehicle control device 3030 when data transmission is required, so that when not in cruise, the unmanned aerial vehicle control device enters a dormant state to avoid interference and save energy.

In some embodiments, in the process that the unmanned aerial vehicle prepares to start the cruise from the first cruise control apparatus in the cruise route, a user triggers an unmanned aerial vehicle start instruction generation operation in the airport monitor device 3010, so that the airport monitor device 3010 generates an unmanned aerial vehicle start instruction based on user operation. For example, by means of clicking or touching an unmanned aerial vehicle start button on a display interface of the airport monitor device 3010 by the user, so that the airport monitor device 3010 generates the unmanned aerial vehicle start instruction, and sends the generated unmanned aerial vehicle start instruction to the airport control device 3020, and the airport control device 3020 performs a detection operation based on the unmanned aerial vehicle start instruction to determine whether the preset cruise condition is currently met, to ensure the reliability of the cruise. When receiving the unmanned aerial vehicle start instruction, the airport control device 3020 obtains required current cruise evaluation information based on the preset cruise condition, and detects whether the current unmanned aerial vehicle meets the preset cruise condition according to the current cruise evaluation information, and if yes, the cruise request message is sent to the airport monitor device 3010 to instruct whether to perform a subsequent cruise operation. When receiving the cruise request message, the airport monitor device 3010 will display the same on its display interface to prompt the user that the unmanned aerial vehicle meets the preset cruise condition and whether the subsequent cruise operation needs to be performed, and if the user needs to continue the cruise operation, a cruise instruction generation operation is triggered in the airport monitor device 3010, so that the airport monitor device 3010 generates the cruise instruction based on user operation, and sends the generated cruise instruction to the airport control device 3020.

When receiving the cruise instruction, the airport control device 3030 triggers the unmanned aerial vehicle control device 3030 to detect whether the unmanned aerial vehicle meets the preset takeoff condition by means of sending the instruction or controlling the unmanned aerial vehicle control device 3030 to supply power. For example, if establishing the signal connection with the unmanned aerial vehicle control device 3030 in advance, the airport control device 3030 will directly send a takeoff detection instruction to the unmanned aerial vehicle control device 3030, so that the unmanned aerial vehicle control device 3030 detects whether the unmanned aerial vehicle meets the preset takeoff condition when receiving the takeoff detection instruction. If the airport control device 3030 does not establish the signal connection with the unmanned aerial vehicle control device 3030, the unmanned aerial vehicle control device 3030 is triggered by means of supplying power, so that the unmanned aerial vehicle control device 3030 detects whether the unmanned aerial vehicle meets the preset takeoff condition after power supply.

The unmanned aerial vehicle control device 3030 obtains the required unmanned aerial vehicle information based on the preset takeoff condition, and detects whether the current unmanned aerial vehicle meets the preset takeoff condition according to the current unmanned aerial vehicle information, for example, detects whether the sensor is normal, and if yes, then the takeoff request message is sent to the airport control device 3020 to instruct whether to perform a takeoff operation. When receiving the takeoff request message, the airport control device 3020 detects whether the current unmanned aerial vehicle airport ensures normal takeoff of the unmanned aerial vehicle, and if yes, sends the cruise start instruction to the unmanned aerial vehicle control device 3030, so that when receiving the cruise start instruction, the unmanned aerial vehicle control device 3030 controls the unmanned aerial vehicle placed on a takeoff and landing platform inside the unmanned aerial vehicle airport to take off normally and cruise to the next cruise control apparatus based on the pre-set preset cruise route, and the unmanned aerial vehicle 200 needs no manual control during the entire cruise process, thereby realizing the automatic cruise of the unmanned aerial vehicle 200, saving labor costs and improving reliability.

The technical solutions of these embodiments realize the automatic cruise process of the unmanned aerial vehicle by the airport monitor device, the airport control device and the unmanned aerial vehicle control device.

Figure 40:
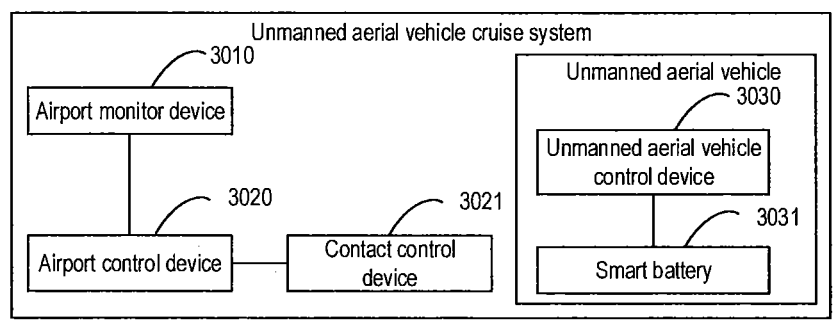
FIG. 40 is a schematic structural diagram of an unmanned aerial vehicle cruise system according to some embodiments of the present disclosure.

On the basis of the above technical solution, FIG. 40 is a schematic structural diagram of an unmanned aerial vehicle cruise system according to some embodiments of the present disclosure. As shown in FIG. 40, the system further comprises: a contact control device 3021 connected to the airport control device 3020 and a smart battery 3031 in the unmanned aerial vehicle 200 connected to the unmanned aerial vehicle control device 3030.

The contact control device 3021 is configured to control a charge contact to move to be connected to the smart battery 3031 according to the instruction of the airport control device 3020, so that the airport control device 3020 is signal connected with the smart battery 3031. Correspondingly, the airport control device 3020 is configured to: obtain a remaining electric quantity of the smart battery 3031 and charge the smart battery 3031; in some embodiments, when receiving the cruise instruction sent by the airport monitor device 3010 based on the cruise request message, a power-on instruction is sent to the smart battery 3031, so that the smart battery supplies power to the unmanned aerial vehicle control device, and triggers the unmanned aerial vehicle control device to detect whether the unmanned aerial vehicle 200 meets the preset takeoff condition.

The contact control device 3021 refers to an intermediate device configured to signal connect the airport control device 3020 and the smart battery 3031. The contact control device 3021 controls the charge contact to move under a signal connection control instruction of the airport control device 3020, to signal connect the airport control device 3020 and the smart battery 3031 for data transmission, so that the airport control device 3020 indirectly controls a power supply situation of the unmanned aerial vehicle control device 3030 connected to the smart battery 3031 by means of controlling the smart battery 3031.

In some embodiments, when receiving the unmanned aerial vehicle start instruction sent by the airport monitor device 3010, or receiving the cruise instruction sent by the airport monitor device 3010 based on the cruise request message, the airport control device 3020 sends the signal connection control instruction to the contact control device 3021, and the contact control device 3021 controls the charge contact to move to the smart battery 3031 based on the signal connection control instruction, thereby communicating the airport control device 3020 and the smart battery 3031 for subsequent signal connection. After establishing signal connection with the smart battery 3031, the airport control device 3020 sends the power-on instruction to the smart battery 3031. After receiving the power-on instruction, the smart battery 3031 supplies power to the connected unmanned aerial vehicle control device 3030, so that the unmanned aerial vehicle control device 3030 is started, thereby triggering the operation that the unmanned aerial vehicle control device 3030 detects whether the unmanned aerial vehicle meets the preset takeoff condition. After started, the unmanned aerial vehicle control device 3030 establishes signal connection with the airport control device 3020 through a wireless signal connection device in the unmanned aerial vehicle 200 for subsequent data transmission.

It should be noted that the smart battery 3031 is connected to all the devices that need power supply in the unmanned aerial vehicle 200, so that when receiving the power-on instruction, the smart battery 3031 supplies power to all the devices to be powered in the unmanned aerial vehicle, and the unmanned aerial vehicle is started. For example, before the smart battery 3031 receives the power-on instruction, the whole entire unmanned aerial vehicle 200 is in a power-off state, that is, a dormant state, so as to ensure that the unmanned aerial vehicle 200 is placed in the airport more reliable, and at the same time, energy waste and electromagnetic interference of other apparatuses are avoided.

In some embodiments, the airport control device 3020 is further configured to: after sending the power-on instruction to the smart battery 3031, send a disconnection control instruction to the contact control device 3021; the contact control device 3021 is further configured to: according to the received disconnection control instruction, control the charge contact to move to disconnect the signal connection between the airport control device 3020 and the smart battery 3031.

In some embodiments, after the unmanned aerial vehicle 200 is powered on, the unmanned aerial vehicle control device 3030 establishes signal connection with the airport control device 3020, and does not need contact connection any more, and at this time, the airport control device 3020 sends the disconnection control instruction to the contact control device 3021, so that the contact control device 3021 controls the charge contact to move to disconnect the contact with the smart battery 3031, thereby disconnecting the signal connection between the airport control device 3020 and the smart battery 3031 for subsequent normal takeoff of the unmanned aerial vehicle.

On the basis of above technical solution, the airport control device 3020 is also configured to: when receiving the unmanned aerial vehicle start instruction sent by the airport monitor device, obtain electric quantity information and cruise evaluation information of the unmanned aerial vehicle 200, the cruise evaluation information comprising real-time weather information and/or the number of GPS satellites; and based on the electric quantity information and cruise evaluation information, detect whether the unmanned aerial vehicle meets the preset cruise condition.

The electric quantity information refers to remaining electric quantity in the unmanned aerial vehicle before takeoff. The weather information refers to the current weather information in the area to be cruised. The current weather information comprises, but not limited to, temperature, humidity, wind speed, and rainfall.

In some embodiments, when the airport control device 3020 receives the unmanned aerial vehicle start instruction sent by the airport monitor device 3010, if the airport control device 3020 establishes signal connection with the unmanned aerial vehicle control device 3030 in advance, the airport control device 3020 sends an electric quantity information acquisition request to the unmanned aerial vehicle control device 3030, so that the unmanned aerial vehicle control device 3030 obtains the electric quantity information of the unmanned aerial vehicle 200 based on the electric quantity information acquisition request, and sends the electric quantity information to the airport control device 3020, and the airport control device 3020 obtains the electric quantity information of the unmanned aerial vehicle 200. If the airport control device 3020 establishes signal connection with the unmanned aerial vehicle control device 3030 through the smart battery 3031, after establishing the signal connection with the smart battery 3031, the airport control device 3020 sends the electric quantity information acquisition request to the smart battery 3031, so as to obtain the electric quantity information of the unmanned aerial vehicle through the smart battery 3031. In some embodiments, the smart battery 3031 is further configured to, when receiving the electric quantity information acquisition request sent by the airport control device 3020, collect the electric quantity information of the unmanned aerial vehicle and send the electric quantity information to the airport control device 3020.

Figure 41:
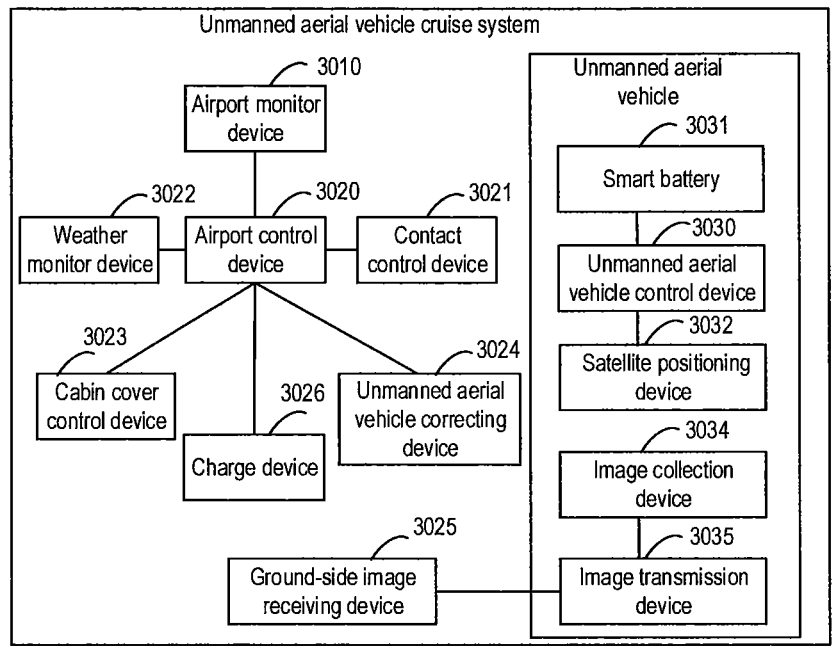
FIG. 41 is a schematic structural diagram of an unmanned aerial vehicle cruise system according to some embodiments of the present disclosure.

FIG. 41 is a schematic structural diagram of an unmanned aerial vehicle cruise system according to some embodiments of the present disclosure. In some embodiments, as shown in FIG. 41, the system further comprises: a weather monitor device 3022 connected to the airport control device 3020 and configured to obtain current weather information when receiving a current weather information acquisition request sent by the airport control device 3020, and send the current weather information to the airport control device 3020, so that the airport control device 3020 obtains the current weather information through the weather monitor device 3022.

When obtaining the electric quantity information of the unmanned aerial vehicle and the current weather information, the airport control device 3020 detects whether the electric quantity information and the current weather information ensure automatic cruise of the unmanned aerial vehicle, and if yes, determines that the unmanned aerial vehicle meets the preset cruise condition. In some embodiments, the airport control device 3020 is configured to: when detecting that an electric quantity value in the electric quantity information is greater than a preset electric quantity value, the current wind speed is less than a preset wind speed and the current rainfall is zero, indicating that the electric quantity of the unmanned aerial vehicle and the current weather both ensure normal cruise of the unmanned aerial vehicle, determine that the unmanned aerial vehicle meets the preset cruise condition.

In some embodiments, when obtaining the electric quantity information of the unmanned aerial vehicle and current weather information, the airport control device 3020 sends the obtained electric quantity information and current weather information to the airport monitor device 3010, so that the airport monitor device 3010 displays the electric quantity information and weather information on the display interface for viewing by the user.

On the basis of above technical solution, as shown in FIG. 41, the system also comprises: a cabin cover control device 3023 connected to the airport control device 3020 and configured to open a cabin cover of the unmanned aerial vehicle airport when receiving a cover opening control instruction sent by the airport control device 3020; wherein the cover opening control instruction is sent when the airport control device 3020 receives the unmanned aerial vehicle cruise instruction sent by the airport monitor device 3010, or receives the takeoff request message sent by the unmanned aerial vehicle control device 3030.

The cabin cover control device 3023 controls the cabin cover of the unmanned aerial vehicle airport to be opened or closed. When the unmanned aerial vehicle 200 prepares to take off, the cabin cover needs to be opened, so that the unmanned aerial vehicle 200 takes off normally from the unmanned aerial vehicle airport.

In some embodiments, when the airport control device 3020 receives the unmanned aerial vehicle cruise instruction sent by the airport monitor device 3010, or receives the takeoff request message sent by the unmanned aerial vehicle control device 10, that is, before takeoff of the unmanned aerial vehicle, the cover opening control instruction is sent to the cabin cover control device 3023, so that the cabin cover of the unmanned aerial vehicle airport is opened, and the unmanned aerial vehicle takes off normally from the airport.

Figure 42:
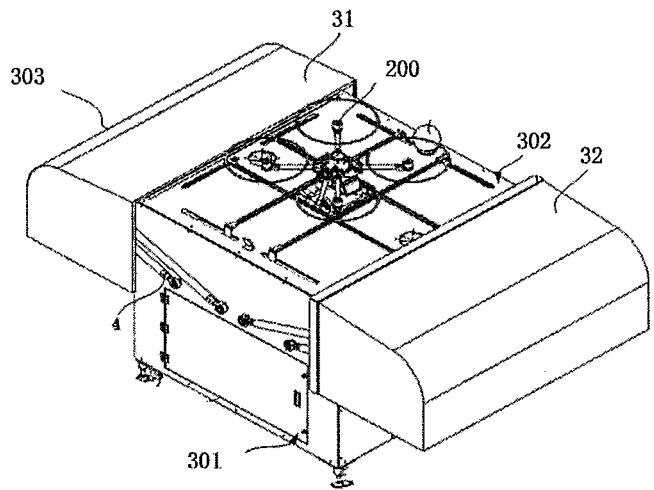
FIG. 42 is a schematic structural diagram of an unmanned aerial vehicle airport 100 according to some embodiments of the present disclosure.

In some embodiments, FIG. 42 is a schematic structural diagram of an unmanned aerial vehicle airport 100 according to some embodiments of the present disclosure. As shown in FIG. 42, the unmanned aerial vehicle airport 100 comprises a support frame 301, a parking apron 302, a cabin cover 303, a cabin cover control device 4 and a cabin cover control device 304. As shown in FIG. 42, the cabin cover 303 is located on the top of the parking apron 302 to protect the unmanned aerial vehicle 200. The cabin cover 303 is drivingly connected to the cabin cover control device 3023 and configured to control the opening and closing of the cabin cover 303. For example, the bin cover 3 comprises a first cover body 31 and a second cover body 32. When receiving the cover opening control instruction, the cabin cover control device 3023 controls the first cover body 31 and the second cover body 32 to relatively move to the farthest positions, so that the cabin cover 303 is opened. In some embodiments, the cabin cover control device 3023 is controlled by means of a bar linkage structure or a linear moving mechanism. As shown in FIG. 42, two active rods are disposed on both sides of the first cover body 31 and the second cover body 32, so that the movement of the cover body is more stable and reliable. When receiving the cover opening control instruction, the cabin cover control device 3023 controls both the active rods on the side of the first cover body 31 and the active rods on the side of the second cover body 32 to move outward, so that the first cover body 31 and the second cover body 32 move away from each other, thereby opening the cabin cover 303.

On the basis of the above technical solution, as shown in FIG. 41, this system also comprises a correcting mechanism 3024 connected to the airport control device 3020, and the correcting mechanism 3024 is configured to unlock a fixing module for fixing the unmanned aerial vehicle in the correcting mechanism 3024 when receiving a correction unlock instruction sent by the airport control device 3020. The correction unlock instruction is sent when the airport control device 3020 receives the unmanned aerial vehicle cruise instruction sent by the airport monitor device 3010, or receives the takeoff request message sent by the unmanned aerial vehicle control device 3030.

The correcting mechanism 3024 uses the internal fixing module to fix the unmanned aerial vehicle 200, so that the unmanned aerial vehicle 200 is in a corrected state. When the unmanned aerial vehicle 200 prepares to take off, the fixing module for fixing the unmanned aerial vehicle 200 needs to be unlocked, so that the unmanned aerial vehicle 200 takes off normally from the unmanned aerial vehicle airport.

In some embodiments, when the airport control device 3020 receives the unmanned aerial vehicle cruise instruction sent by the airport monitor device 3010, or receives the takeoff request message sent by the unmanned aerial vehicle control device 10, that is, before takeoff of the unmanned aerial vehicle, the correction unlock instruction is sent to the correcting mechanism 3024, so that the fixing module for fixing the unmanned aerial vehicle is unlocked, and the unmanned aerial vehicle takes off normally from the airport.

Figure 43:
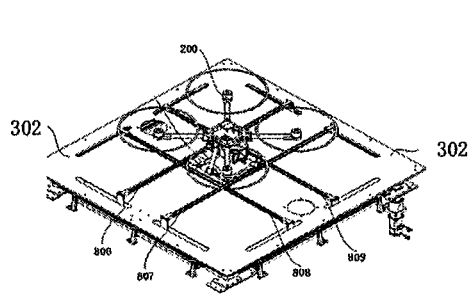
FIG. 43 is a schematic structural diagram of a correcting mechanism according to some embodiments of the present disclosure.

In some embodiments, FIG. 43 is a schematic structural diagram of a correcting mechanism according to some embodiments of the present disclosure. The correcting mechanism 3024 is disposed on the top of the parking apron 302 of the unmanned aerial vehicle airport, so that the unmanned aerial vehicle 200 is in place after parking, and the unmanned aerial vehicle 200 is neatly stacked in a set direction. As shown in FIG. 43, the correcting mechanism 3024 pushes the unmanned aerial vehicle 200 to move to a set position through the linear movement of respective correcting rods. As shown in FIG. 43, the correcting mechanism 3024 comprises a plurality of correcting rods installed on the parking apron 302. The unmanned aerial vehicle 200 is clamped by linearly moving the plurality of correcting rods, so that the unmanned aerial vehicle 200 is landed at the set position of the parking apron 302.

Specifically, as shown in FIG. 43, the fixing module used for the unmanned aerial vehicle in the correcting mechanism 3024 is four correcting rods, which are respectively a first correcting rod 806, a second correcting rod 807, a third correcting rod 808 and a fourth correcting rod 809 in FIG. 43. The four correcting rods are parallel in pairs and form a rectangular frame. The four correcting rods move toward each other at the same time, so that the side length of the rectangular frame is shortened to a size of clamping the unmanned aerial vehicle 200, and the unmanned aerial vehicle 200 located in the rectangular frame will be moved by the correcting rods subsequently. The four correcting rods move opposite to each other at the same time, so that the side length of the rectangular frame is lengthened to a size of unlocking the unmanned aerial vehicle 200, then the unmanned aerial vehicle 200 located in the rectangular frame will be unlocked, and the subsequent unmanned aerial vehicle 200 flies away subsequently.

In some embodiments, when receiving the correction unlock instruction sent by the airport control device 3020, the correcting mechanism 3024 controls the four correcting rods to move opposite to each other at the same time, to unlock the clamped unmanned aerial vehicle 200, thereby unlocking the fixing module for fixing the unmanned aerial vehicle 200 in the correcting mechanism 3024.

In some embodiments, the airport control device 3020 is also configured to: when receiving the takeoff request message sent by the unmanned aerial vehicle control device 3030, detect whether the cabin cover of the unmanned aerial vehicle is opened, and detect whether the fixing module for fixing the unmanned aerial vehicle in the correcting mechanism is unlocked; if the cabin cover is opened and the fixing module is unlocked, send the cruise start instruction to the unmanned aerial vehicle control device, so that the unmanned aerial vehicle takes off normally from the unmanned aerial vehicle airport.

On the basis of above technical solution, the unmanned aerial vehicle control device 3030 is configured to: based on a preset self-check program, perform self-check to each sensor in the unmanned aerial vehicle; if there is no self-check problem, obtain a currently received number of positioning satellites, and when the currently received number of positioning satellites is greater than a preset number, determine that the unmanned aerial vehicle meets the preset takeoff condition.

The currently received number of positioning satellites refers to the number of positioning satellites currently detected by the unmanned aerial vehicle, and when the number quantity is greater than the preset number, it is ensured that unmanned aerial vehicle is accurately positioned in the cruising process, which is convenient for automatic cruise.

In some embodiments, as shown in FIG. 41, the system further comprises: a satellite positioning device 3032 connected to the unmanned aerial vehicle control device 3030 and configured to: when receiving a satellite number detection instruction sent by the unmanned aerial vehicle control device 3030, perform satellite positioning detection, obtain the currently received number of positioning satellites, and send the currently received number of positioning satellites to the unmanned aerial vehicle control device 3030, so that the unmanned aerial vehicle control device 3030 obtains the currently received number of positioning satellites in real time. The satellite number detection instruction is sent by the unmanned aerial vehicle control device 3030 when detecting that there is no self-checking problem. The satellite positioning device 3032 is an apparatus for satellite positioning measurement set by using a real-time kinematic (RTK) technology.

On the basis of the above technical solution, as shown in FIG. 41, the system also comprises an image collection device 3034, an image transmission device 3035 connected to the image collection device 3034, and a ground-side image receiving device 35. The image collection device 3034 is configured to collect a cruise image and send the cruise image to the image transmission device 3035; the image transmission device 3035 is configured to send the received cruise image to the ground-side image receiving device 3025; the ground-side image receiving device 3025 is configured to store the received cruise image.

Specific installation positions of the image collection device 3034 and the image transmission device 3035 in the unmanned aerial vehicle 200 are determined based on business requirements. The ground-side image receiving device 3025 is installed in the unmanned aerial vehicle airport, or is installed outside the unmanned aerial vehicle airport. These embodiments do not limit the specific installation positions of the image collection device 3034, the image transmission device 3035 and the ground-side image receiving device 3025.

In some embodiments, the image collection device 3034 is connected to the unmanned aerial vehicle control device 3030 to collect the cruise image when receiving a collection instruction from the unmanned aerial vehicle control device 3030. The image collection device 3034 is also not connected to the unmanned aerial vehicle control device 3030, so that the cruise image is collected in real time after the image collection device 3034 is powered on. After collecting the cruise image, the image collection device 3034 sends the cruise image to the ground-side image receiving device 3025 through the image transmission device 3035. The ground-side image receiving device 3025 sends the received cruise image to a cloud side for storage, and also sends to the airport monitor device 3010 for storage, so that the airport monitor device 3010 displays the cruise image on the display interface in real time to realize visualization of the cruise.

On the basis of the above technical solution, the airport control device 3020 is also configured to: when detecting landing of the unmanned aerial vehicle, send a signal connection control instruction to the contact control device 3021, so that the contact control device 3021 moves based on the signal connection control instruction to signal connect the airport control device 3020 and the smart battery 3031; and send a power-off instruction to the smart battery 3031 to stop the smart battery 3031 from supplying power to the unmanned aerial vehicle control device 3030.

In some embodiments, when the unmanned aerial vehicle is landed on the takeoff and landing platform of the unmanned aerial vehicle airport after the cruise based on the preset cruise route is completed, the airport control device 3020, when detecting that the unmanned aerial vehicle has landed on the takeoff and landing platform, sends the signal connection control instruction to the contact control device 3021 to enable the charge contact and the smart battery 3031 to be in contact, thereby communicating the airport control device 3020 and the smart battery 3031. The airport control device 3020 stops the smart battery 3031 from supplying power to the unmanned aerial vehicle control device 3030 by means of sending the power-off instruction to the smart battery 3031 and from supplying power to other power supply apparatuses in the unmanned aerial vehicle, so that the unmanned aerial vehicle is in a power-off state.

On the basis of the above technical solution, the system also comprises a charge device 3026 connected to the airport control device 3020 and configured to charge the unmanned aerial vehicle. Correspondingly, the airport control device 3020 is further configured to: send an electric quantity information acquisition request to the smart battery 3031 to obtain the remaining electric quantity of the smart battery 3031; when detecting that an electric quantity value in the electric quantity information is less than a first preset electric quantity value, control the charge device 3026 to charge the unmanned aerial vehicle and complete charging until the electric quantity value of the unmanned aerial vehicle is equal to a second preset electric quantity value; and after the charging is completed, send a disconnection control instruction to the contact control device 3021 to disconnect the signal connection between the airport control device 3020 and the smart battery 3031.

The electric quantity information is also collected and obtained by the smart battery 3031. When the airport control device 3020 detects that the electric quantity value of the electric quantity information is less than the first preset electric quantity value, indicating that the unmanned aerial vehicle needs to be charged for subsequent cruise tasks, at this time, the charge device 3026 is controlled to be in contact with the smart battery 3031, so that the charge device 3026 charges the unmanned aerial vehicle. When the electric quantity value of the unmanned aerial vehicle is greater than or equal to the second preset electric quantity value, the charge device 3026 is controlled to complete charging. After the charging is completed, the disconnection control instruction is sent to the contact control device 3021 to disconnect the signal connection between the airport control device 3020 and the smart battery 3031. In some embodiments, the contact control device 3021 is integrated in the charge device 3026, so that when charging is required, the charge device 3026 integrated with the contact control device 3021 is directly controlled for charging, which simplifies the cruise operation.

It should be noted that, after the airport control device 3020 sends the power-off instruction to the intelligent battery 3031, the entire unmanned aerial vehicle is in a power-off state, and the airport control device 3020 controls the charge device 3026 to charge the unmanned aerial vehicle at this time, so that there is no electromagnetic interference during the charging process, which further ensures the reliability of the unmanned aerial vehicle.

Figure 44:
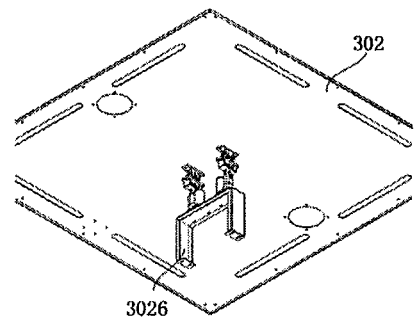
FIG. 44 is a schematic structural diagram of a charge device according to some embodiments of the present disclosure.
Figure 45:
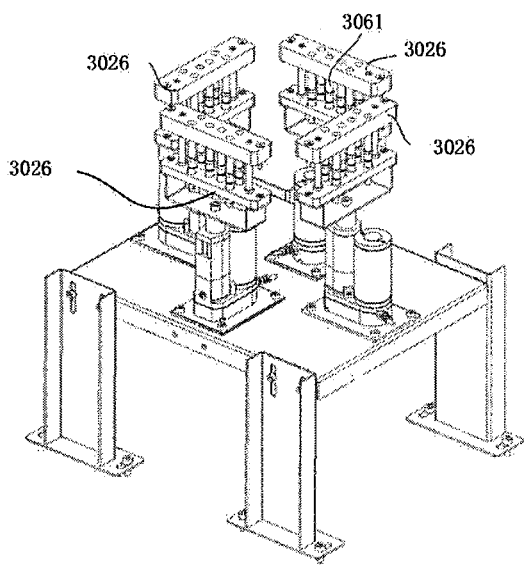
FIG. 45 is a schematic three-dimensional structural diagram of four charge devices defining a rectangle in an unmanned aerial vehicle airport according to some embodiments of the present disclosure.
Figure 46:
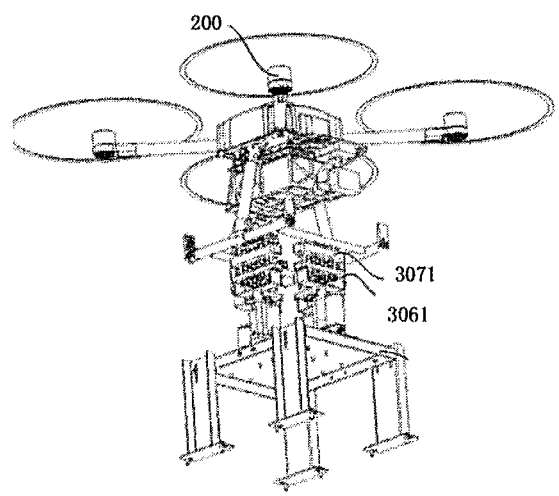
FIG. 46 is a schematic diagram of charging connection according to some embodiments of the present disclosure.

In some embodiments, FIG. 44 is a schematic structural diagram of a charge device 3026 according to some embodiments of the present disclosure, and FIG. 45 a schematic three-dimensional structural diagram of four charge devices 3026 defining a rectangle in an unmanned aerial vehicle airport according to some embodiments of the present disclosure. As shown in FIGS. 44 and 45, the charge device 306 is installed on the parking apron 302 and comprises a first electrode 3061. FIG. 46 is a schematic diagram of charging connection according to some embodiments of the present disclosure. Correspondingly, as shown in FIG. 46, the smart battery 3031 comprises a second electrode 3071, so that the first electrode 3061 and the second electrode 3071 are matched in a rechargeable manner. For example, there are one or more first electrodes 3061 and second electrodes 3071, and metal contacts of the first electrode 3061 and the second electrode 3071 are in contact with each other for conduction and charging; and the metal contacts of the two are separated for no charging any more. Both the first electrodes 3061 and the second electrodes 3071 are arranged in an array or configuration. As shown in FIG. 45, the charge device 306 is configured to define a symmetrical rectangular shape, so that charging is realized no matter which direction a nose of the unmanned aerial vehicle 200 faces. That is to say, after the unmanned aerial vehicle 200 is landed, no matter what the heading of the unmanned aerial vehicle 200 is, as long as the unmanned aerial vehicle 200 is correctly corrected, it is guaranteed that the second electrode 3071 in the smart battery 3031 of the unmanned aerial vehicle is mated with the first electrode 3061 in one of the charge devices 3026, thereby ensuring the accuracy of charging.

In some embodiments, when detecting that the electric quantity value in the electric quantity information is less than the first preset electric quantity value, the airport control device 3020 controls the charge contact of the charge device 3026 to move to the smart battery 3031, so that the first electrode 3061 in the charge device 3026 is in contact with the second electrode 3071 in the smart battery 3031 in the unmanned aerial vehicle, and the metal contacts of the two are in contact with each other, thereby charging the unmanned aerial vehicle. When the electric quantity value of the unmanned aerial vehicle is equal to the third preset electric quantity value, the airport control device 3020 controls the charge device 3026 to move away from the smart battery 3031 and disconnect the contact between the first electrode 3061 in the charge device 3026 and the second electrode 3071 in the smart battery 3031 in the unmanned aerial vehicle, thereby completing charging the unmanned aerial vehicle.

In some embodiments, before sending the signal connection control instruction to the contact control device 3021, the airport control device 3020 also sends a correction instruction to the correcting mechanism 3024, so that the correcting mechanism 3024 fixes the unmanned aerial vehicle 200 with the fixing module when receiving the correction instruction, and corrects the unmanned aerial vehicle 200, so as to move the contact control device 3021 to the position of the smart battery 3031, so that the contact control device 3021 controls the contact between the charge contact and the smart battery 3031.

For example, as shown in FIG. 43, when receiving the correction instruction sent by the airport control device 3020, the correcting mechanism 3024 controls four correcting rods to move toward each other at the same time, so that the side length of the rectangular frame is shortened to a size of clamping the unmanned aerial vehicle 200 to enable the unmanned aerial vehicle to be in place.

In some embodiments, the airport control device 3020 also sends a cover closing control instruction to the cabin cover control device 3023 after detecting that the unmanned aerial vehicle is landed after the cruise, so that the cabin cover control device 3023 closes the opened cabin cover when receiving the cover closing control instruction. Therefore, after the cruise ends, the cabin cover is automatically closed, so that the entire cruise process is completed automatically without manual control, and the reliability of the unmanned aerial vehicle is ensured.

For example, as shown in FIG. 42, when receiving the cover closing control instruction, the cabin cover control device 3023 controls the active rods on the side of the first cover body 31 and the active rods on the side of the second cover body 32 to move toward each other to the positions of being in contact with each other, so that the first cover body 31 and the second cover body 32 move relative to each other, thereby closing the cabin cover 303 to protect the unmanned aerial vehicle and prevent the unmanned aerial vehicle from the damage and pollution of external rainwater, impurities, etc.

In the application of the above unmanned aerial vehicle cruise system, in the cruise process of the unmanned aerial vehicle, the unmanned aerial vehicle and the cruise control apparatus respectively implement the cruise control method for an unmanned aerial vehicle according to any of the following embodiments.

Figure 47:
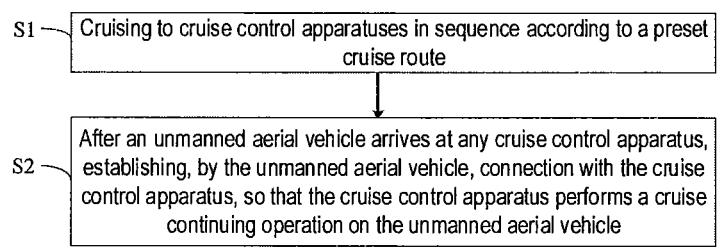
FIG. 47 is a schematic flowchart of a cruise control method for an unmanned aerial vehicle according to some embodiments of the present disclosure.

FIG. 47 is a schematic flowchart of a cruise control method for an unmanned aerial vehicle according to some embodiments of the present disclosure. In order to enable the unmanned aerial vehicle to perform a long-distance automatic tour inspection work, in some embodiments of the present disclosure, a plurality of cruise control apparatuses are disposed on a preset cruise route of the unmanned aerial vehicle, so that the unmanned aerial vehicle performs continuous cruise flying. Specifically, each cruise control apparatus provides a cruise continuing operation for the unmanned aerial vehicle, so that the unmanned aerial vehicle obtains the electric quantity and storage space required for continuing the cruise, or whether the unmanned aerial vehicle is suitable for continuing the cruise is confirmed according to the state of the unmanned aerial vehicle or the surrounding environment. In some embodiments, the method comprises:

S1, the unmanned aerial vehicle cruises to the cruise control apparatuses in sequence according to the preset cruise route.

It should be understood that in this solution, the plurality of cruise control apparatuses are deployed according to the cruise route, and a plurality of cruise control apparatuses are also selected from the pre-deployed cruise control apparatuses to form the cruise route of the unmanned aerial vehicle, which is not required by the solution.

In this step, an unmanned aerial vehicle control device of the unmanned aerial vehicle controls the unmanned aerial vehicle to take one cruise control apparatus as a takeoff point, the takeoff point is not the first takeoff point in the cruise route, and the unmanned aerial vehicle flies to the cruise control apparatus adjacent to this cruise control apparatus, and so on, until the cruise is completed.

S2, after the unmanned aerial vehicle arrives at any cruise control apparatus, the unmanned aerial vehicle establishes connection with the cruise control apparatus, so that the cruise control apparatus performs the cruise continuing operation on the unmanned aerial vehicle.

In this step, the unmanned aerial vehicle is controlled to establish connection with the cruise control apparatus, the connection comprises signal connection and/or charging connection, and after the connection is established, the cruise control apparatus performs the cruise operation on the unmanned aerial vehicle by, for example, charging the unmanned aerial vehicle through the cruise control apparatus, or transferring cruise video data stored in the unmanned aerial vehicle to the cruise control apparatus, or checking the state of the unmanned aerial vehicle, or determining whether environmental conditions are suitable for the unmanned aerial vehicle to continue the cruise, etc.

In some embodiments, after the cruise control apparatus completes the cruise continuing operation on the unmanned aerial vehicle, the unmanned aerial vehicle continues to cruise to the next cruise control apparatus adjacent to the current cruise control apparatus.

In some embodiments, each cruise control apparatus has the same cruise continuing operation function.

In some embodiments of the present disclosure, the cruise control apparatus in the cruise route provides the cruise continuing operation to the unmanned aerial vehicle during flying of the unmanned aerial vehicle, so that the unmanned aerial vehicle does not need to return to the first cruise control apparatus for charging or other cruise continuing operations, and further the unmanned aerial vehicle continues the tour inspection work to further cruise destinations, which expands an automatic cruise range of the unmanned aerial vehicle.

Figure 48:
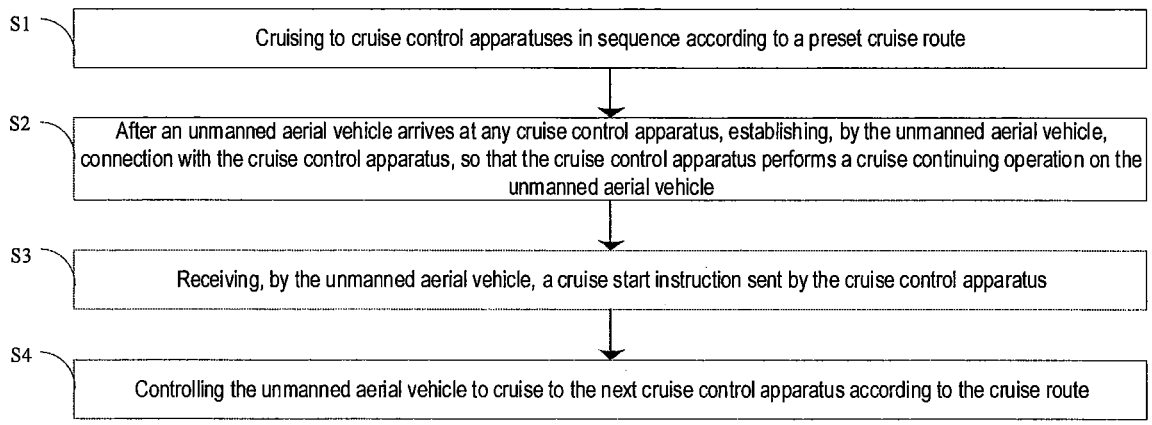
FIG. 48 is a schematic flowchart of a cruise control method for an unmanned aerial vehicle according to some embodiments of the present disclosure.

FIG. 48 is a schematic flowchart of a cruise control method for an unmanned aerial vehicle according to some embodiments of the present disclosure. In order to realize the long-distance automatic cruise of the unmanned aerial vehicle, after the second cruise control apparatus performs the cruise continuing operation on the unmanned aerial vehicle, the unmanned aerial vehicle needs to continue to start the cruise. In some embodiments, the method comprises steps S3 and S4 as shown in FIG. 48.

S3, the unmanned aerial vehicle receives a cruise start instruction sent by the cruise control apparatus.

The cruise control apparatus determines the moment of continuing to start the cruise of the unmanned aerial vehicle, and the moment is a moment comprehensively determined after the cruise continuing operation is completed, or when the time required for continuing the cruise arrives, or in combination with the weather state of the cruise, the state of the unmanned aerial vehicle, and the state of satellites (for example, the detectable number of Global Positioning System (GPS) satellites) according to different cruise tasks of the unmanned aerial vehicle. At the moment of continuing to start the cruise, the cruise control apparatus sends the cruise start instruction to the unmanned aerial vehicle, and accordingly, the unmanned aerial vehicle receives the cruise start instruction.

S4, the unmanned aerial vehicle is controlled to cruise to the next cruise control apparatus according to the cruise route.

In response to the received cruise start instruction, the unmanned aerial vehicle continues to cruise according to the preset cruise route and arrives at the next cruise control apparatus.

In these embodiments, according to the cruise start instruction sent by the cruise control apparatus, the unmanned aerial vehicle continues to fly to the next cruise control apparatus, and continues the inspect work, which realizes continuous cruise and expands the automatic cruise range. Simultaneously, the moment of continuing the cruise is controlled by the second cruise control apparatus, thereby providing personalized cruise control that is applied to different scenarios.

Based on the above embodiment, the unmanned aerial vehicle and the cruise control apparatus establish connection, and the cruise control apparatus provides cruise continuing operation for the unmanned aerial vehicle, which comprises following several possible implementation manners:

Manner 1, the cruise video data in the unmanned aerial vehicle is transferred to the cruise control apparatus, so that the unmanned aerial vehicle has enough storage space and continues to collect new cruise video data in the process of continuing the cruise.

Figure 49:
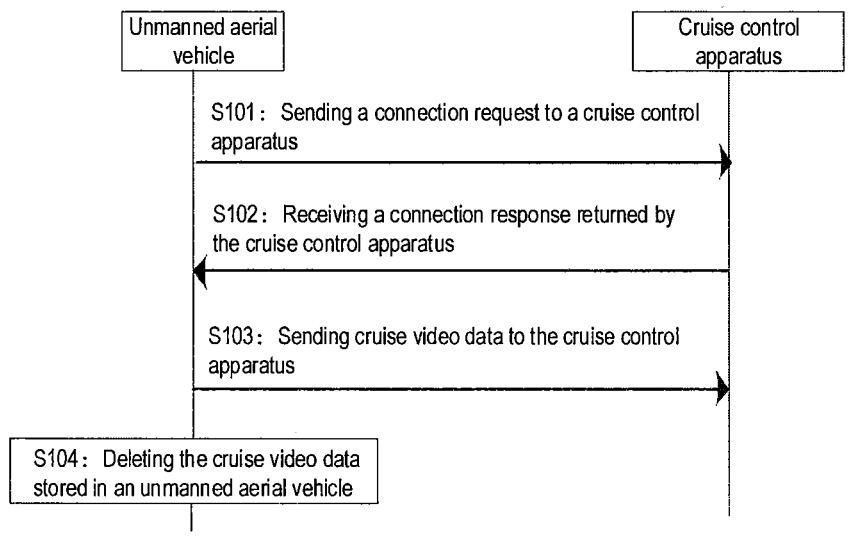
FIG. 49 is a schematic diagram of an interaction flow of a cruise control method for an unmanned aerial vehicle according to some embodiments of the present disclosure.

FIG. 49 is a schematic diagram of an interaction flow of a cruise control method for an unmanned aerial vehicle according to some embodiments of the present disclosure. When cruising to a preset area around the cruise control apparatus, the unmanned aerial vehicle requests to establish signal connection with the second cruise control apparatus. In some embodiments, the process of establishing the signal connection comprises:

S101, a connection request is sent to the cruise control apparatus.

S102, a connection response returned by the cruise control apparatus is received.

After the signal connection is established, transferring, by the unmanned aerial vehicle, the cruise video data to the cruise control apparatus comprises:

S103, the cruise video data is sent to the cruise control apparatus.

S104, the cruise video data stored in the unmanned aerial vehicle is deleted.

The unmanned aerial vehicle transfers the cruise video data to the cruise control apparatus, the cruise control apparatus stores the received cruise video data, and the unmanned aerial vehicle deletes the cruise video data stored per se.

In some embodiments, before the unmanned aerial vehicle sends the cruise video data to the cruise control apparatus, the remaining storage space in the unmanned aerial vehicle is confirmed by the cruise apparatus at first, if the size of the remaining storage space is less than a preset value, the process of transferring the cruise video data to the cruise control apparatus is executed. Alternatively, after the unmanned aerial vehicle sends the cruise video data to the cruise control apparatus, the size of the remaining storage space is determined. If the size of the remaining storage space is greater than the preset value, the cruise video data stored per se does not need to be deleted.

Manner 2, the unmanned aerial vehicle is charged, so that the unmanned aerial vehicle has enough electric quantity to cruise to the next cruise control apparatus.

Figure 50:
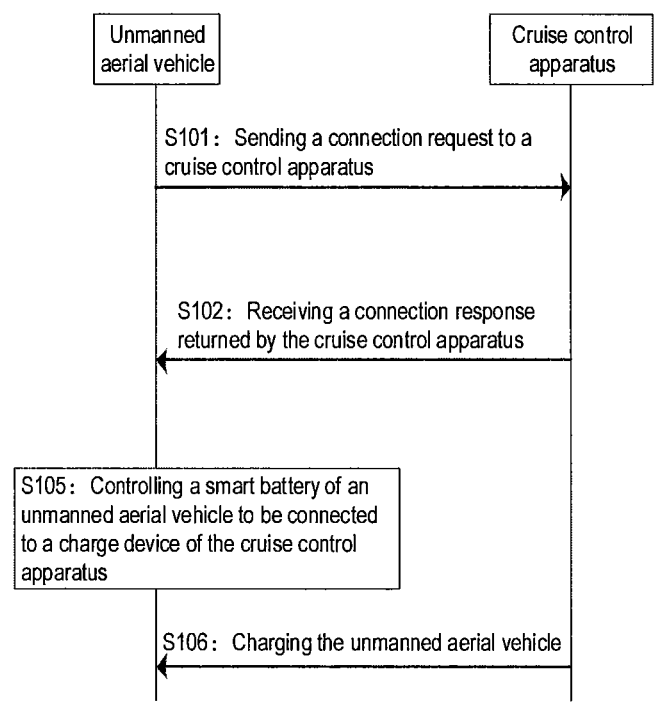
FIG. 50 is a schematic diagram of an interaction flow of a cruise control method for an unmanned aerial vehicle according to some embodiments of the present disclosure.

FIG. 50 is a schematic diagram of an interaction flow of a cruise control method for an unmanned aerial vehicle according to some embodiments of the present disclosure. When cruising to a preset area around the cruise control apparatus, the unmanned aerial vehicle requests to establish signal connection with the cruise control apparatus. In some embodiments, the process of establishing the signal connection comprises:

S101, a connection request is sent to the cruise control apparatus.

S102, a connection response returned by the cruise control apparatus is received.

After the signal connection is established, the unmanned aerial vehicle signal connects with the cruise control apparatus to complete the charging connection with the cruise control apparatus, so that the cruise control apparatus charges the unmanned aerial vehicle, which comprises:

S105, a smart battery of the unmanned aerial vehicle is controlled to be connected to the charge device of the cruise control apparatus.

The unmanned aerial vehicle signal connects with the cruise control apparatus to transmit positioning information in real time, and the unmanned aerial vehicle is accurately landed on a takeoff and landing platform of the cruise control apparatus, so that a correcting mechanism on the takeoff and landing platform performs position correction and fixation on the unmanned aerial vehicle. Correspondingly, in the process that the unmanned aerial vehicle is landed on the takeoff and landing platform, the cruise control apparatus controls a cabin cover to be opened, so that the unmanned aerial vehicle is landed on the takeoff and landing platform in the cabin, and the unmanned aerial vehicle is subjected to position correction and fixation through the correcting mechanism, and then the cabin cover is controlled to be closed.

In some embodiments, the cruise control apparatus controls the charge contact of a charge device to raise to be connected to a charge contact of the smart battery of the unmanned aerial vehicle.

S106, the unmanned aerial vehicle is charged.

In this step, the cruise control apparatus charges the smart battery of the unmanned aerial vehicle through the charge device.

As an example, before the cruise control apparatus charges the smart battery through the charge device, the remaining electric quantity of the smart battery is firstly obtained, whether charging is required is determined according to the remaining electric quantity of the smart battery, if the remaining electric quantity is less than the preset value, the smart battery is charged, otherwise the smart battery is not charged.

It should be understood that the smart battery utilizes an internal electronic circuit to measure, calculate and store battery data, so that the use and management of a power supply are more predictable, after the charge contact is connected to the smart battery, the battery information, comprising the remaining electric quantity, is read by the cruise control apparatus.

Manner III, the unmanned aerial vehicle is charged, and the cruise video data of the unmanned aerial vehicle is also transferred. As shown in FIG. 49 and FIG. 50, in these embodiments, when the unmanned aerial vehicle arrives at any cruise control apparatus indicated by the cruise route, the unmanned aerial vehicle is charged by the cruise control apparatus and the cruise video data of the unmanned aerial vehicle is also transferred. Firstly, the signal connection between the unmanned aerial vehicle and the cruise control apparatus still needs to be established, which is similar to the above steps S101 and S102, and will not be repeated here. In addition, this solution does not require the sequence of transferring the cruise video data and charging, and the two are performed at the same time.

In some embodiments, the cruise control apparatus sends the cruise video data to a server for storage.

In addition to above three manners, the cruise control apparatus also detects a running state of the unmanned aerial vehicle, such as the state of each sensor and an appearance state by the detection device. If there is abnormality, alarm and maintenance are performed to avoid a fault of the unmanned aerial vehicle after continuing the cruise.

Figure 51:
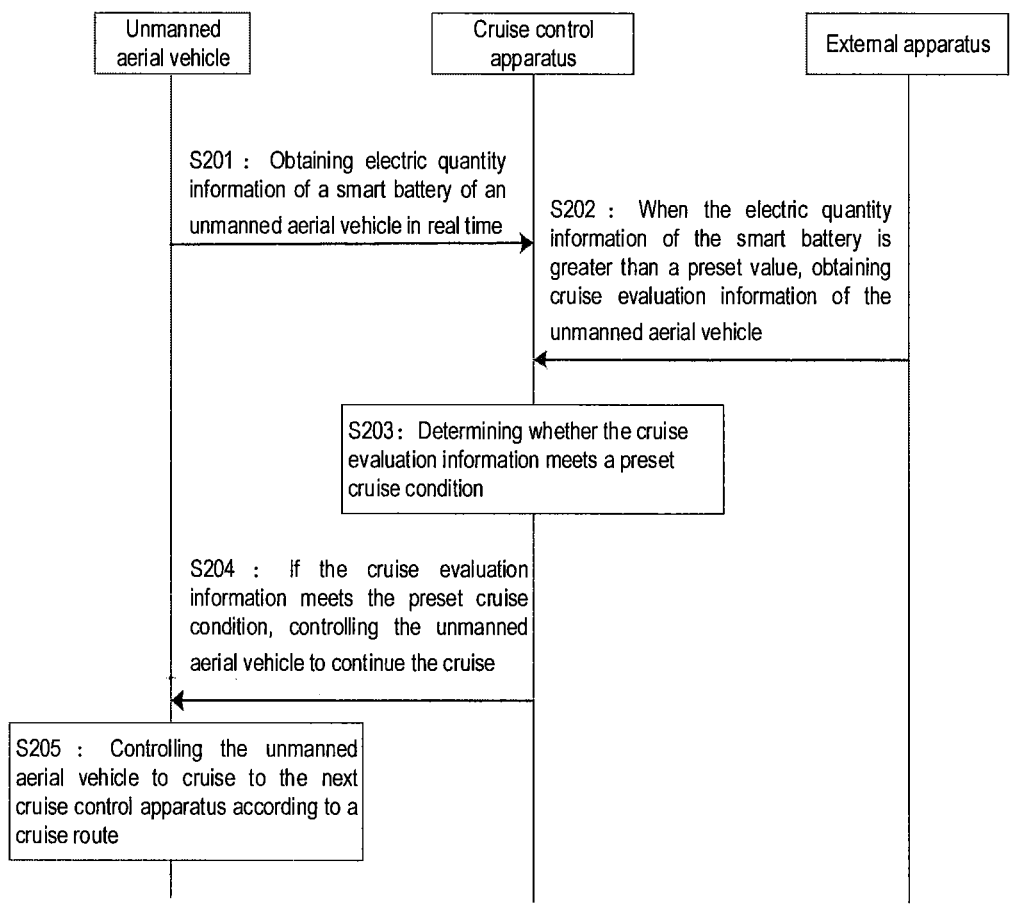
FIG. 51 is a schematic diagram of an interaction flow of a cruise control method for an unmanned aerial vehicle according to some embodiments of the present disclosure.

FIG. 51 is a schematic diagram of an interaction flow of a cruise control method for an unmanned aerial vehicle according to some embodiments of the present disclosure. On the basis of the above embodiment, after performing the cruise continuing operation on the unmanned aerial vehicle, the cruise control apparatus determines a start moment for the unmanned aerial vehicle to continue the cruise, and controls the unmanned aerial vehicle to continue the cruise at this moment, so as to realize the automatic start of continuing the cruise.

As shown in FIG. 51, this process comprises:

S201, an electric quantity of the smart battery of the unmanned aerial vehicle is obtained in real time.

After establishing charging connection with the unmanned aerial vehicle, the cruise control apparatus reads or receives the electric quantity information sent by the smart battery of the unmanned aerial vehicle in real time, and the electric quantity information is an electric quantity value or electric quantity percentage of the smart battery.

S202, when the electric quantity information of the smart battery is greater than a preset value, cruise evaluation information of the unmanned aerial vehicle is obtained.

In this solution, after determining that the electric quantity information of the smart battery is greater than the preset value, whether the unmanned aerial vehicle is suitable for continuing the cruise needs to be further determined according to the cruise evaluation information of the unmanned aerial vehicle.

In this step, the cruise control apparatus obtains the cruise evaluation information by communicating with an external device.

In some embodiments, the cruise evaluation information comprises weather information and/or the number of GPS satellites, and the weather information comprises at least one of temperature, humidity, wind speed, and rainfall. For the weather information, the cruise control apparatus obtains real-time weather information by communicating with an automatic weather station; for the number of GPS satellites, the cruise control apparatus obtains the number of GPS satellites sent by an RTK base station.

S203, whether the cruise evaluation information meets a preset cruise condition is determined.

By the preset cruise condition, whether the current weather, environment, GPS state are suitable for the cruise of the unmanned aerial vehicle is determined, for example, the cruise condition is set to that the unmanned aerial vehicle is started to continue the cruise if the rainfall is less than a preset value, or the unmanned aerial vehicle is started to continue the cruise if the wind speed less than a preset value, to avoid the impact of abnormal weather on the cruise of the unmanned aerial vehicle. The number of GPS satellites determines the positioning accuracy. Therefore, this solution determines whether the unmanned aerial vehicle is started to continue the cruise in combination with the number of GPS satellites, so as to avoid the impact on the cruise of the unmanned aerial vehicle due to reduction of the positioning accuracy.

S204, if the cruise evaluation information meets the preset cruise condition, the unmanned aerial vehicle is controlled to continue the cruise.

If the cruise evaluation information meets one or more preset cruise conditions, the cruise control apparatus controls the unmanned aerial vehicle to continue the cruise.

S205, the unmanned aerial vehicle is controlled to cruise to the next cruise control apparatus according to the cruise route.

The unmanned aerial vehicle is controlled to continue the cruise to the next cruise control apparatus adjacent to the current cruise control apparatus according to the received cruise start instruction.

Figure 52:
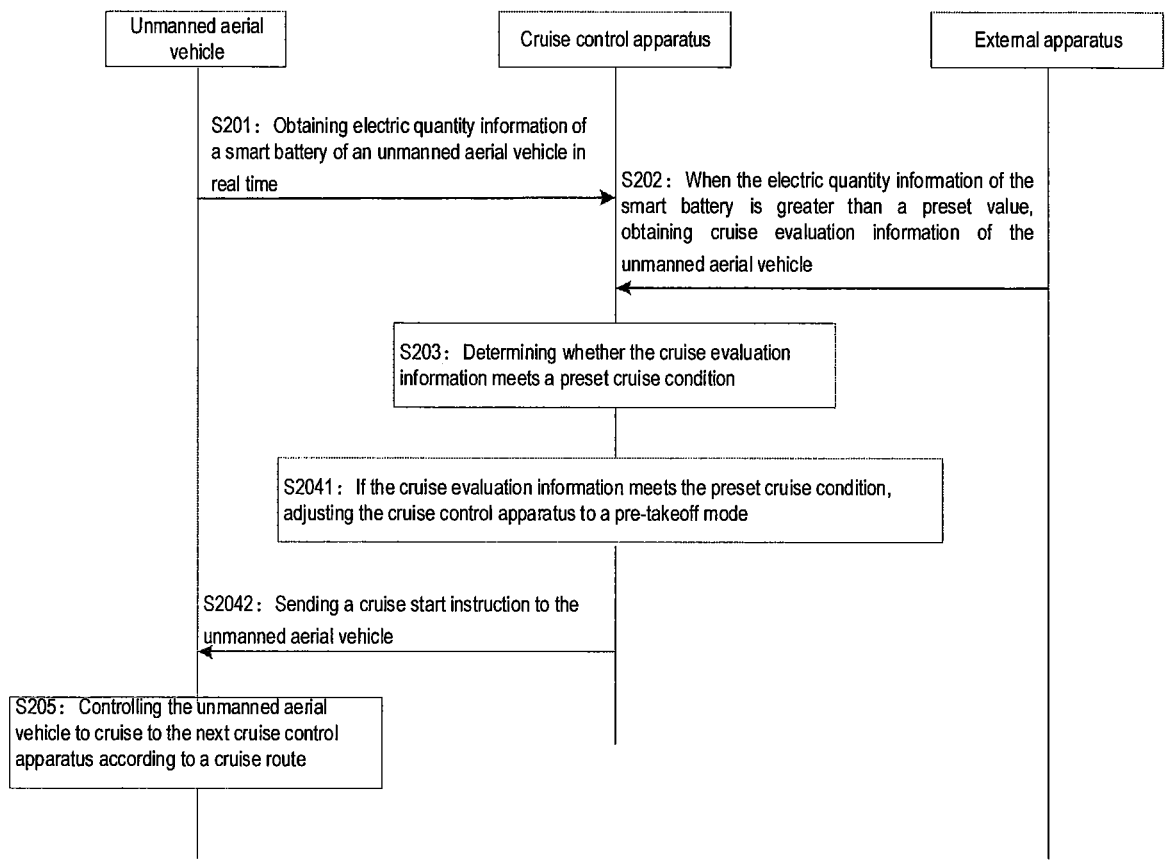
FIG. 52 is a schematic diagram of an interaction flow of a cruise control method for an unmanned aerial vehicle according to some embodiments of the present disclosure.

FIG. 52 is a schematic diagram of an interaction flow of a cruise control method for an unmanned aerial vehicle according to some embodiments of the present disclosure. On the basis of the embodiment shown in FIG. 51, some embodiments of the present disclosure provide steps S2041 and S2042 as shown in FIG. 52 for how to control the unmanned aerial vehicle to continue the cruise after the cruise evaluation information meets the preset cruise condition.

S2041, the cruise control apparatus is adjusted to a pre-takeoff mode.

In this step, the cruise control apparatus controls the cabin cover to be opened, and controls the charge contact of the charge device to descend, which provides necessary conditions for the unmanned aerial vehicle to continue the cruise, and prevents the cabin cover and the charge contact from interfering the takeoff of the unmanned aerial vehicle.

In some embodiments, adjusting the cruise control apparatus to the pre-takeoff mode further comprises sending a power-on instruction to the unmanned aerial vehicle. In response to the power-on instruction, the smart battery of the unmanned aerial vehicle supplies power to the unmanned aerial vehicle; in some embodiments, adjusting the cruise control apparatus to the pre-takeoff mode also comprises turning on a correcting mechanism.

S2042, the cruise start instruction is sent to the unmanned aerial vehicle.

The cruise start instruction is configured to instruct the unmanned aerial vehicle to continue the cruise to the next cruise control apparatus according to the preset cruise route.

Correspondingly, the unmanned aerial vehicle receives the cruise start instruction, and in response to the cruise start instruction, the unmanned aerial vehicle is controlled to take off.

In some embodiments, before takeoff of the unmanned aerial vehicle, the unmanned aerial vehicle runs a self-check program to perform self-check on each sensor per se, and after the self-check result indicates that the state of each sensor is normal, the unmanned aerial vehicle is started to continue the cruise.

Figure 53:
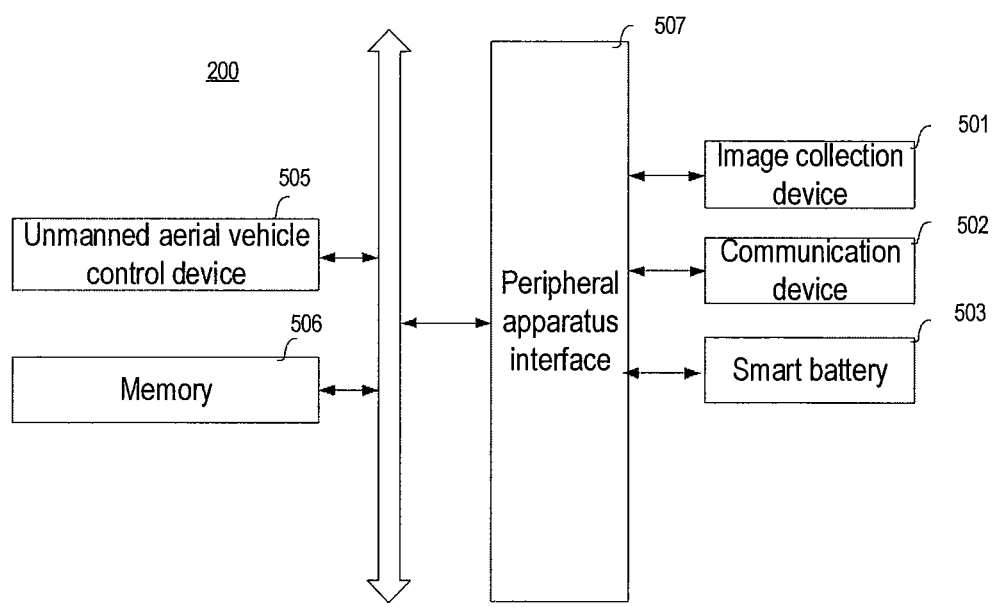
FIG. 53 is a structural block diagram of an unmanned aerial vehicle according to some embodiments of the present disclosure.

FIG. 53 is a structural block diagram of an unmanned aerial vehicle according to some embodiments of the present disclosure. Generally, the unmanned aerial vehicle 200 comprises: an unmanned aerial vehicle control device 505 and a memory 506; and also comprises a peripheral apparatus interface 507 in some embodiments. The processor 505, the memory 506 and the peripheral apparatus interface 507 are connected through a bus or a signal line. Each peripheral apparatus is connected to the peripheral apparatus interface 507 through a bus, a signal line or a circuit board. In some embodiments, the peripheral apparatus comprises at least one of an image collection device 501, a signal connection device 502, and a smart battery 503.

The image collection device 501 collects video data in the cruise process of the unmanned aerial vehicle.

Signal connection is established with the cruise control apparatus through the signal connection device 502.

The smart battery 503 supplies power to the unmanned aerial vehicle and sends the battery electric quantity to the cruise control device.

The unmanned aerial vehicle control device 505 comprises one or more processing cores, such as a 4-core processor and an 8-core processor. The unmanned aerial vehicle control device 505 is implemented by at least one hardware of a digital signal processing (DSP), a field-programmable gate array (FPGA), and a programmable logic array (PLA). The unmanned aerial vehicle control device 505 also comprises a main processor and a coprocessor. The main processor is a processor for processing the data in an awake state, and is also called a central processing unit (CPU). The coprocessor is a low-power-consumption processor for processing the data in a standby state. In some embodiments, the unmanned aerial vehicle control device 505 is integrated with a graphics processing unit (GPU), which is configured to render and draw the content that needs to be displayed by a display screen. In some embodiments, the unmanned aerial vehicle control device 505 also comprises an artificial intelligence (AI) processor configured to process computational operations related to machine learning.

The memory 506 comprises one or more computer-readable storage mediums, which is non-transitory. The memory 506 also comprises a high-speed random-access memory, as well as a non-volatile memory, such as one or more disk storage apparatuses and flash storage apparatuses. In some embodiments, the non-transitory computer-readable storage medium in the memory 506 is configured to store at least one program code. The at least one program code is configured to be executed by the unmanned aerial vehicle control device 505 to implement the cruise control methods for an unmanned aerial vehicle applied to an unmanned aerial vehicle side according to the method embodiments of the present disclosure.

It will be understood by those skilled in the art that the structure shown in FIG. 53 does not constitute a limitation to the unmanned aerial vehicle 200, and comprises more or less components than those illustrated, or combines some components or adopts different component arrangements.

Figure 54:
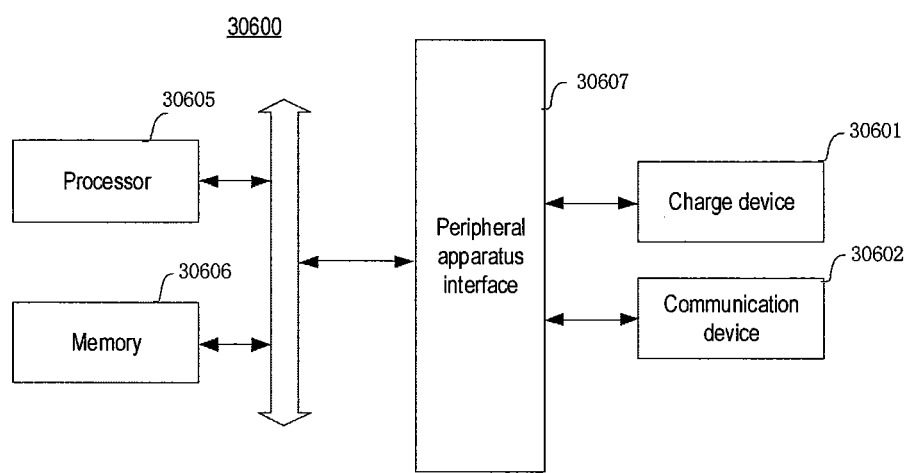
FIG. 54 is a structural block diagram of a cruise control apparatus according to some embodiments of the present disclosure.

FIG. 54 is a structural block diagram of a cruise control apparatus according to some embodiments of the present disclosure. Generally, the cruise control apparatus 30600 comprises: a processor 30605 and a memory 30606; and also comprises a peripheral apparatus interface 30607 in some embodiments. The processor 30605, the memory 30606 and the peripheral apparatus interface 30607 are connected through a bus or a signal line. Each peripheral apparatus is connected to the peripheral apparatus interface 30607 through a bus, a signal line or a circuit board. In some embodiments, the peripheral apparatus comprises at least one of a charge apparatus 30601 and a signal connection device 30602.

The charge apparatus 30601 is connected to the smart battery of an unmanned aerial vehicle to charge the unmanned aerial vehicle according to the control of the processor 30605.

Signal connection is established with the unmanned aerial vehicle through the signal connection device 30602.

The processor 30605 comprises one or more processing cores, such as a 4-core processor and an 8-core processor. The processor 30605 is implemented by at least one hardware of a digital signal processing (DSP), a field-programmable gate array (FPGA), and a programmable logic array (PLA). The processor 30605 also comprises a main processor and a coprocessor. The main processor is a processor for processing the data in an awake state, and is also called a central processing unit (CPU). The coprocessor is a low-power-consumption processor for processing the data in a standby state. In some embodiments, the processor 30605 is integrated with a graphics processing unit (GPU), which is configured to render and draw the content that needs to be displayed by a display screen. In some embodiments, the processor 30605 also comprises an artificial intelligence (AI) processor configured to process computational operations related to machine learning.

The memory 30606 comprises one or more computer-readable storage mediums, which is non-transitory. The memory 30606 also comprises a high-speed random-access memory, as well as a non-volatile memory, such as one or more disk storage apparatuses and flash storage apparatuses. In some embodiments, the non-transitory computer-readable storage medium in the memory 30606 is configured to store at least one program code. The at least one program code is configured to be executed by the processor 30605 to implement the cruise control methods for an unmanned aerial vehicle applied to a cruise control apparatus side according to the method embodiments of the present disclosure.

It will be understood by those skilled in the art that the structure shown in FIG. 54 does not constitute a limitation to the cruise control apparatus 30600, and comprises more or less components than those illustrated, or combines some components or adopts different component arrangements.

Some embodiments of the present disclosure also provide a non-transitory computer-readable storage medium, and the instructions in the storage medium, when executed by an unmanned aerial vehicle control device of an unmanned aerial vehicle, enable the unmanned aerial vehicle to execute the cruise control methods for an unmanned aerial vehicle according to the above embodiments.

Some embodiments of the present disclosure also provide a non-transitory computer-readable storage medium, and the instructions in the storage medium, when executed by a processor of a cruise control apparatus, enable the cruise control apparatus to execute the cruise control methods for an unmanned aerial vehicle according to the above embodiments.

In the description of the present disclosure, it is to be understood that the orientation or positional relationship indicated by the terms "center", "longitudinal", "transverse", "front", "rear", "left", "right", "vertical", "horizontal", "top", "bottom", "inner" and "outer", etc., is based on the orientation or positional relationship shown in the drawings, and is only for the convenience of describing the present disclosure and simplifying the description, rather than indicating or implying that the referred device or element must have a particular orientation and be constructed and operated in a particular orientation, and therefore should not be construed as limiting the scope of protection of the present disclosure.

It should be noted at last that the above embodiments are only for illustrating the technical solutions of the present disclosure rather than limiting the same. Although the present disclosure has been described in detail with reference to the preferred embodiments, those of ordinary skill in the art should understand that the specific embodiments of the present disclosure can still be modified or part of technical features can be equivalently replaced, without departing from the spirit of the technical solutions of the present disclosure, and they all should be in the scope of the technical solutions claimed to be protected by the present disclosure.

The invention claimed is:

1. An unmanned aerial vehicle airport, comprising:
a support base;
a parking apron installed on the top of the support base;
a protective cover covering the top of the parking apron; and
a protective cover opening and closing driving device installed between the support base and the protective cover, the protective cover opening and closing driving device being configured to cause a bar linkage mechanism to drive the protective cover to switch between an open position and a closed position;
wherein the protective cover opening and closing driving device comprises:
a driving source for providing rotational power;
a synchronous transmission mechanism, an input end of the synchronous transmission mechanism being drivingly connected to an output end of the driving source; and
a plurality of active rods, wherein a first end of each active rod is rotatably connected to the synchronous transmission mechanism; and a second end of each active rod is rotatably connected to the protective cover.

2. The unmanned aerial vehicle airport according to claim 1, wherein the synchronous transmission mechanism comprises:
a first driving assembly drivingly connected to the driving source; and
a second driving assembly drivingly connected to the first driving assembly to drive the active rod.

3. The unmanned aerial vehicle airport according to claim 2, wherein the first driving assembly comprises:
a first sprocket, the first sprocket being drivingly connected to the driving source;
a second sprocket drivingly connected to the second driving assembly; and
a first chain wound on the outer sides of the first sprocket and the second sprocket;
wherein the first sprocket is configured to drive the second sprocket through the first chain.

4. The unmanned aerial vehicle airport according to claim 3, wherein the second driving assembly comprises:
a third sprocket drivingly connected to the second sprocket;
a fourth sprocket;
a first gear, wherein the first gear and the fourth sprocket are coaxially installed and coaxially rotate; the first gear is drivingly connected to the first end of one active rod, and the second end of the active rod is drivingly connected to a first cover body; and
a second chain wound on the outer sides of the third sprocket and the fourth sprocket;
wherein the third sprocket is configured to drive the fourth sprocket through the second chain.

5. The unmanned aerial vehicle airport according to claim 4, wherein the second driving assembly further comprises:
a second gear engaged with the first gear, the second gear being drivingly connected to one active rod, and the second end of the active rod being drivingly connected to a second cover body.

6. The unmanned aerial vehicle airport according to claim 2, wherein there are two second driving assemblies, and both the second driving assemblies are drivingly connected to the first driving assembly.

7. The unmanned aerial vehicle airport according to claim 6, wherein the two groups of second driving assemblies are both drivingly connected to the second sprocket of the first driving assembly by connecting shafts.

8. The unmanned aerial vehicle airport according to claim 1, further comprising:
a first charge device installed on the parking apron and comprising a first electrode; the first electrode of the first charge device being configured to be matched with a second electrode of a second charge device installed on an unmanned aerial vehicle in a rechargeable manner.

9. The unmanned aerial vehicle airport according to claim 8, wherein every four first charge devices define a symmetrical rectangular shape.

10. The unmanned aerial vehicle airport according to claim 8, wherein the first charge device further comprises:
a first insulating member fixed below the parking apron; the first insulating member being provided with a first through hole;
a second insulating member located below the first insulating member, a first end of the first electrode being installed on the second insulating member; and a second end of the first electrode being slidably arranged in the first through hole; and
a lifting and lowering device drivingly connected to the second insulating member, wherein the lifting and lowering device is configured to lift and lower the second insulating member, so that the first electrode protrudes to the top of the parking apron through an installation hole of the parking apron.

11. The unmanned aerial vehicle airport according to claim 10, wherein a protruding portion is installed on the outer wall of the first electrode, and an elastic member is arranged between the protruding portion and the second insulating member;
the second insulating member is provided with a second through hole, and the first end of the first electrode protrudes to one side of the second insulating member away from the first insulating member.

12. The unmanned aerial vehicle airport according to claim 11, wherein a separation preventing member is provided on the first end of the first electrode, the first end of the first electrode protrudes from one side of the second insulating member away from the first insulating member.

13. The unmanned aerial vehicle airport according to claim 11, wherein the first charge device further comprises:
a guide device disposed between the first insulating member and the second insulating member, and configured to provide linear guidance for relative movement between the first insulating member and the second insulating member.

14. The unmanned aerial vehicle airport according to claim 13, wherein the guide device comprises:
a guide member fixed to the second insulating member; the first insulating member being provided with a first guide hole matched with the guide member.

15. The unmanned aerial vehicle airport according to claim 10, wherein the second insulating member is fixed to a connecting frame, and the connecting frame is drivingly connected to the lifting and lowering device.

16. The unmanned aerial vehicle airport according to claim 15, wherein the connecting frame comprises:
a bottom plate drivingly connected to the lifting and lowering device; and
side plates installed on the side edge of the bottom plate, the top ends of the side plates being fixedly connected to the second insulating member.

17. The unmanned aerial vehicle airport according to claim 1, further comprising:
a guiding device comprising a plurality of correcting rods; wherein the correcting rods are installed on the parking apron, and the guiding device is configured to clamp the unmanned aerial vehicle by linearly moving the plurality of correcting rods, so as to cause the unmanned aerial vehicle to reach at a set position of the parking apron.

18. An unmanned aerial vehicle system, comprising the unmanned aerial vehicle airport according to claim 1;
wherein a first charge device is installed on a parking apron of the unmanned aerial vehicle airport, and the unmanned aerial vehicle system further comprises:
an unmanned aerial vehicle on which a second charge device is installed; a first electrode of the first charge device and a second electrode of the second charge device being matched in a rechargeable manner.

* * * * *